(12) United States Patent
Whiting et al.

(10) Patent No.: US 11,203,702 B1
(45) Date of Patent: Dec. 21, 2021

(54) FUNCTIONALIZED COATING POLYMERS AND USES THEREOF

(71) Applicant: National Technology & Engineering Solutions of Sandia, LLC, Albuquerque, NM (US)

(72) Inventors: Joshua J. Whiting, Albuquerque, NM (US); David R. Wheeler, Albuquerque, NM (US); Robert J. Simonson, Cedar Crest, NM (US); Douglas Read, Bosque Farms, NM (US); Leah Appelhans, Tijeras, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 196 days.

(21) Appl. No.: 16/656,228

(22) Filed: Oct. 17, 2019

(51) Int. Cl.
| | |
|---|---|
| *B05D 7/22* | (2006.01) |
| *C09D 183/06* | (2006.01) |
| *G01N 30/56* | (2006.01) |
| *C09D 7/63* | (2018.01) |
| *G01N 30/02* | (2006.01) |
| *G01N 30/14* | (2006.01) |
| *C08K 5/23* | (2006.01) |

(52) U.S. Cl.
CPC .............. *C09D 183/06* (2013.01); *B05D 7/22* (2013.01); *C09D 7/63* (2018.01); *G01N 30/56* (2013.01); *C08K 5/23* (2013.01); *G01N 2030/025* (2013.01); *G01N 2030/143* (2013.01); *G01N 2030/567* (2013.01)

(58) Field of Classification Search
None
See application file for complete search history.

(56) References Cited

U.S. PATENT DOCUMENTS

| | | | |
|---|---|---|---|
| 5,487,967 A | 1/1996 | Hutton et al. | |
| 5,550,007 A | 8/1996 | Taylor et al. | |
| 5,668,186 A | 9/1997 | Whinnery et al. | |
| 5,939,577 A | 8/1999 | Wheeler et al. | |
| 6,015,869 A | 1/2000 | Grate et al. | |
| 6,271,335 B1 | 8/2001 | Small et al. | |
| 6,337,384 B1 | 1/2002 | Loy et al. | |
| 6,403,753 B1 | 6/2002 | Loy et al. | |
| 6,471,886 B1 | 10/2002 | Buffleben et al. | |
| 6,593,062 B1 | 7/2003 | Potter, Jr. et al. | |
| 6,617,591 B1 | 9/2003 | Simonson et al. | |
| 6,673,525 B1 | 1/2004 | Wheeler | |
| 7,022,861 B1 | 4/2006 | McElhanon et al. | |

(Continued)

OTHER PUBLICATIONS

Achyuthan KE et al., "Design considerations for high-throughput screening and in vitro diagnostic assays," *Comb. Chem. High Throughput Screen.* 2007;10:399-412.

(Continued)

*Primary Examiner* — Shamim Ahmed
*Assistant Examiner* — Bradford M Gates
(74) *Attorney, Agent, or Firm* — Helen S. Baca; Madelynne J. Farber

(57) ABSTRACT

The present invention relates to functionalized polymers useful for coating surfaces, such as the internal bore of a column. In particular embodiments, such functionalized polymers provide a selective stationary phase useful for separating and detecting organophosphorous agents. Methods of using such polymers are also described herein.

16 Claims, 18 Drawing Sheets

(56) References Cited

U.S. PATENT DOCUMENTS

| | | | |
|---|---|---|---|
| 7,045,170 | B1 | 5/2006 | Hankins et al. |
| 7,273,517 | B1 | 9/2007 | Lewis et al. |
| 7,314,505 | B1 | 1/2008 | Wheeler et al. |
| 7,351,837 | B1 | 4/2008 | McElhanon et al. |
| 7,358,221 | B1 | 4/2008 | Jamison et al. |
| 7,378,533 | B1 | 5/2008 | McElhanon et al. |
| 7,550,071 | B1 | 6/2009 | Dirk et al. |
| 7,595,349 | B1 | 9/2009 | McElhanon et al. |
| 7,622,596 | B1 | 11/2009 | McElhanon et al. |
| 7,799,280 | B1 | 9/2010 | Manginell et al. |
| 7,913,534 | B1 | 3/2011 | Robinson et al. |
| 7,955,945 | B1 | 6/2011 | Dirk et al. |
| 8,223,472 | B1 | 7/2012 | Dirk et al. |
| 8,298,488 | B1 | 10/2012 | Lewis et al. |
| 8,349,547 | B1 | 1/2013 | Burckel et al. |
| 8,426,321 | B1 | 4/2013 | Dirk et al. |
| 8,562,878 | B1 | 10/2013 | Martin et al. |
| 8,709,791 | B2 | 4/2014 | Larson et al. |
| 8,736,000 | B1 | 5/2014 | Manginell et al. |
| 8,846,406 | B1 | 9/2014 | Martin et al. |
| 8,859,190 | B1 | 10/2014 | Dirk et al. |
| 9,102,801 | B1 | 8/2015 | Dirk et al. |
| 9,157,161 | B1 | 10/2015 | Brozik et al. |
| 9,212,430 | B1 | 12/2015 | Harper et al. |
| 9,291,508 | B1 | 3/2016 | Biedermann et al. |
| 9,387,444 | B2 | 7/2016 | Small et al. |
| 9,513,554 | B1 | 12/2016 | Burckel et al. |
| 9,533,887 | B1 | 1/2017 | Polsky et al. |
| 9,721,867 | B1 | 8/2017 | Washburn et al. |
| 9,847,149 | B2 | 12/2017 | Spoerke et al. |
| 9,862,608 | B1 | 1/2018 | Polsky et al. |
| 10,031,135 | B2 | 7/2018 | Larson et al. |
| 10,096,536 | B1 | 10/2018 | Washburn et al. |
| 10,151,732 | B1 | 12/2018 | Moorman et al. |
| 2001/0004510 | A1 | 6/2001 | Wheeler |
| 2009/0176905 | A1* | 7/2009 | Matsuzawa ............ C08F 290/14 522/46 |
| 2011/0053139 | A1 | 3/2011 | Larson et al. |
| 2014/0249042 | A1 | 9/2014 | Larson et al. |
| 2015/0148436 | A1 | 5/2015 | Small et al. |
| 2015/0267316 | A1 | 9/2015 | Spoerke et al. |
| 2016/0046529 | A1* | 2/2016 | Bricco ................ C04B 35/80 166/367 |
| 2016/0196888 | A1 | 7/2016 | Spoerke et al. |
| 2017/0174901 | A1* | 6/2017 | Okumura ................ C09K 3/00 |
| 2017/0184581 | A1 | 6/2017 | Larson et al. |
| 2017/0216840 | A1 | 8/2017 | Branch et al. |
| 2017/0275208 | A1 | 9/2017 | Spoerke et al. |
| 2018/0338713 | A1 | 11/2018 | Polsky et al. |
| 2019/0242888 | A1 | 8/2019 | Larson et al. |

OTHER PUBLICATIONS

Du X et al., "A new polysiloxane coating on QCM sensor for DMMP vapor detection," *J. Mater. Sci.* 2009;44:5872-6.

Grate JW, "Acoustic wave microsensor arrays for vapor sensing," *Chem. Rev.* 2000;100:2627-48.

Grate JW et al., "Carbosiloxane polymers for sensors," *Chem. Innovation* 2000;30:29-37.

Grate JW, "Hydrogen-bond acidic polymers for chemical vapor sensing," *Chem. Rev.* 2008;108:726-45.

Holmes MA et al., "Nanoparticles for dewetting suppression of thin polymer films used in chemical sensors," *J. Nanoparticle Res.* 2007;9:753-63.

Lam SC et al., "Recent advances in open tubular capillary liquid chromatography," *Analyst* 2019;144:3464-82.

Lee HJ et al., "Chemical vapor detection using a capacitive micromachined ultrasonic transducer," *Anal. Chem.* 2011;83:9314-20.

Lewis PR et al., "Recent advancements in the gas-phase MicroChemLab," *IEEE Sensors J.* 2006;6:784-95.

Li M et al., "Nanoelectromechanical resonator arrays for ultrafast, gas-phase chromatographic chemical analysis," *Nano Lett.* 2010;10:3899-903.

Long Y et al., "Hydrogen-bonded acidic polymers coated SAW sensors for 2,4-dinitrololuene detection," *RSC Adv.* 2014;4:59643-9.

Long Y et al., "The different sensitive behaviors of a hydrogen-bond acidic polymer-coated SAW sensor for chemical warfare agents and their simulants," *Sensors* 2015;15:18302-14.

Manginell RP et al., "A hydrogen bonded acidic polymer (DKAP) as a gas chromatography stationary phase for organophoshonates and organophosphates," *Sandia Report No. SAND2019-7658C*, presented at the International Symposium on Capillary Chromatography and GCxGC held May 13-17, 2019 in Ft. Worth, TX (1 p.).

Manginell RP et al., "A monolithically-integrated μGC chemical sensor system," *Sensors* 2011;11:6517-32.

Manginell RP et al., "Development of a mesoscale pulsed discharge helium ionization detector for portable gas chromatography," *Anal. Sci.* 2015;31:1183-8.

Manginell RP et al., "Field portable micro GC and micro GCxGC system development for chemicals and biogenic VOCs," *Sandia Report No. SAND2018-4986C* (1 p.).

Manginell RP et al., "Mass-sensitive microfabricated preconcentrator," *J. Microelectromech. Syst.* 2008;17:1396-407.

Miyabe K, "Thermodynamic interpretation of retention equilibrium in reversed-phase liquid chromatography," *Anal. Sci.* 2009;25:219-27.

Murakami T et al., "Highly sensitive detection of organophosphorus pesticides using 5,10,15,20-tetrakis(4-hydroxyphenyl)porphyrin," *Anal. Sci.* 2015;31:1325-8.

Nakane K et al., "High-temperature separations on a polymer-coated fibrous stationary phase in microcolumn liquid chromatography," *Anal. Sci.* 2011;27:811-6.

Rahimian K et al., "Sandia National Laboratories Micro Chemical Analysis System for Detection of Chemical Warfare Agents," *Sandia Report No. SAND2009-2473* (18 pp.).

Read DH et al., "Thermodynamic studies on a hydrogen bonded acidic 3.5-bis(trifluoromethyl)phenol-funcionalized polymer as a gas chromatography stationary phase for selectively speciating chemical warfare agents," *Anal. Sci.* 2019;35:671-7.

Regmi BP et al., "Micro gas chromatography: an overview of critical components and their integration," *Anal. Chem.* 2018;90:13133-50.

Reid VR et al., "Characterization and utilization of a novel triflate ionic liquid stationary phase for use in comprehensive two-dimensional gas chromatography," *J. Sep. Sci.* 2008;31:3429-36.

Reidy S et al., "High-performance, static-coated silicon microfabricated columns for gas chromatography," *Anal. Chem.* 2006;78:2623-30.

Serrano G et al., "Assessing the reliability of wall-coated microfabricated gas chromatographic separation columns," *Sens. Actuat. B* 2009;141:217-26.

Siegal MP et al., "Nanoporous-carbon coatings for gas-phase chemical microsensors," *Adv. Sci. Technol.* 2006;48:161-8.

Simonson RJ, "Chemical analysis systems and gas chromatography: progress problems and opportunities," *Sandie Report No. SAND2016-4460C* (27 pp.).

Tu AT, "Basic information on nerve gas and the use of sarin by Aum Shinrikyo," *J. Mass Spectrom. Soc. Jpn.* 1996;44:293-320.

Venkatesha TG et al., "Kinetics and thermodynamics of reactive and vat dyes adsorption on MgO nanoparticles," *Chem. Eng. J.* 2012;198-199:1-10.

Wang J et al., "Microfluidic device for coulometric detection of organophosphate pesticides," *Anal. Sci.* 2015;31:591-5.

Wang Y et al., "The response comparison of a hydrogen-bond acidic polymer to sarin, soman and dimethyl methyl phoshonate based on a surface acoustic wave sensor," *Anal. Methods* 2014;6:1951-5.

Whiting JJ et al., "A high-speed, high-performance, microfabricated comprehensive two-dimensional has chromatograph," *Lab Chip* 2019;19:1633-43.

\* cited by examiner

FUNCTIONALIZED COATING POLYMERS AND USES THEREOF

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to functionalized polymers useful for coating surfaces, such as the internal bore of a column. In particular embodiments, such functionalized polymers provide a selective stationary phase useful for separating and detecting organophosphorous agents. Methods of using such polymers are also described herein.

BACKGROUND OF THE INVENTION

Rapid and sensitive detection of organophosphorous agents remains a challenge. There is a need for advanced materials that can be implemented in portable analytical instruments to facilitate on-site detection. In particular, reusable and stable materials would greatly contribute to this need.

SUMMARY OF THE INVENTION

The present invention relates to a functionalized polymer capable of detecting an organophosphorous agent. In addition, the polymer can be employed within a coating solution to treat a column, which can be implemented within an analytical instrument. In particular, beneficial coatings are obtained by using static deposition and in situ cross-linking by employing a thermally activated initiator.

Accordingly, a first aspect of the invention features methods and compositions (e.g., a coating solution) including a polymer comprising a structure having formula (I):

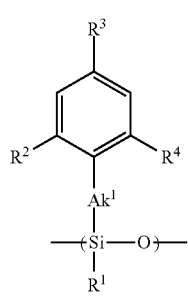

(I)

or a salt thereof, wherein:

$R^1$ is H, optionally substituted alkyl, optionally substituted alkoxy, optionally substituted alkoxyalkyl, optionally substituted aryl, optionally substituted alkaryl, optionally substituted alkenyl, halo, or optionally substituted haloalkyl;

$Ak^1$ is a bond, optionally substituted alkylene, oxy, or optionally substituted heteroalkylene; and each of $R^2$, $R^3$, and $R^4$ is, independently, H, optionally substituted alkyl, optionally substituted alkoxy, optionally substituted alkoxyalkyl, optionally substituted aryl, hydroxyl, optionally substituted hydroxyalkyl, optionally substituted hydroxyaryl, halo, or optionally substituted haloalkyl.

In some embodiments, the methods and compositions (e.g., a coating solution) including a polymer comprising a structure having formula (VI):

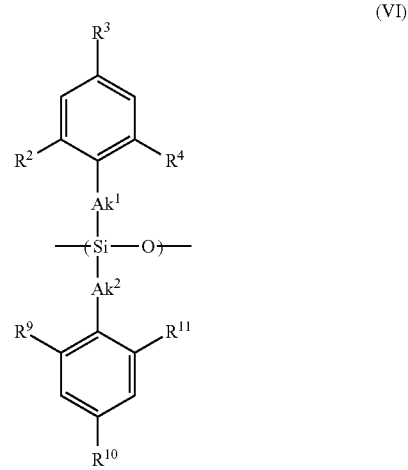

(VI)

or a salt thereof, wherein:

each $Ak^1$ and $Ak^2$ is, independently, a bond, optionally substituted alkylene, optionally substituted arylene, oxy, or optionally substituted heteroalkylene; and each of $R^2$, $R^3$, $R^4$, $R^9$, $R^{10}$ and $R^{11}$ is, independently, H, optionally substituted alkyl, optionally substituted alkoxy, optionally substituted alkoxyalkyl, optionally substituted aryl, hydroxyl, optionally substituted hydroxyalkyl, optionally substituted hydroxyaryl, halo, or optionally substituted haloalkyl, wherein at least one of $R^2$, $R^3$, $R^4$, $R^9$, $R^{10}$, and $R^{11}$ comprises a hydroxyl.

In other embodiments, the methods and compositions (e.g., a coating solution) including a polymer comprising a structure having formula (VII):

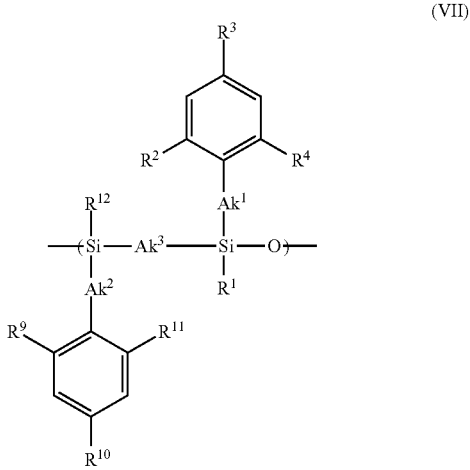

(VII)

a salt thereof, wherein:

each of $R^1$ and $R^{12}$ is, independently, H, optionally substituted alkyl, optionally substituted alkoxy, optionally substituted alkoxyalkyl, optionally substituted aryl, optionally substituted alkaryl, optionally substituted alkenyl, halo, or optionally substituted haloalkyl;

each $Ak^1$, $Ak^2$, and $Ak^3$ is, independently, a bond, optionally substituted alkylene, optionally substituted arylene, oxy, or optionally substituted heteroalkylene; and each of $R^2$, $R^3$, $R^4$, $R^9$, $R^{10}$ and $R^{11}$ is, independently, H, optionally substituted alkyl, optionally substituted alkoxy, optionally substituted alkoxyalkyl, optionally substituted aryl, hydroxyl, optionally substituted hydroxyalkyl, optionally substituted hydroxyaryl, halo, or optionally substituted haloalkyl, wherein at least one of $R^2$, $R^3$, $R^4$, $R^9$, $R^{10}$ and $R^{11}$ comprises a hydroxyl.

In a second aspect, the present invention features methods and compositions (e.g., a coating solution) including a polymer comprising a structure having formula (II):

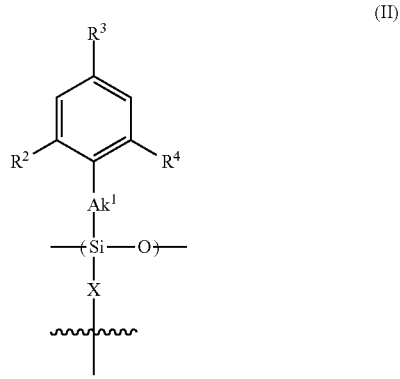

(II)

or a salt thereof, wherein:

each of $Ak^1$ and X is, independently, a bond, optionally substituted alkylene, oxy, or optionally substituted heteroalkylene; and each of $R^2$, $R^3$, and $R^4$ is, independently, H, optionally substituted alkyl, optionally substituted alkoxy, optionally substituted alkoxyalkyl, optionally substituted aryl, hydroxyl, optionally substituted hydroxyalkyl, optionally substituted hydroxyaryl, halo, or optionally substituted haloalkyl, wherein at least one of $R^2$, $R^3$, and $R^4$ comprises a hydroxyl.

In some embodiments, X is a siloxane, a polysiloxane, a silicone, a polysilicone, a silanol, —Si($R^{S1}$, $R^{S2}$)O—, —[Si($R^{S1}$, $R^{S2}$)O]$_n$—, —OSi($R^{S1}$, $R^{S2}$)—, —[OSi($R^{S1}$, $R^{S2}$)]$_n$—, -AkSi($R^{S1}$, $R^{S2}$)O—, —[AkSi($R^{S1}$, $R^{S2}$)O]$_n$—, —OSi($R^{S1}$, $R^{S2}$)Ak-, or —[OSi($R^{S1}$, $R^{S2}$)Ak]$_n$-, in which each of $R^{S1}$ and $R^{S2}$ is, independently, is any substituent disclosed herein for $R^1$, $R^2$, $R^3$, $R^4$, $R^5$, and $R^6$, such as H, optionally substituted alkyl (e.g., $C_{1-6}$ alkyl), optionally substituted alkenyl (e.g., $C_{2-7}$ alkenyl), optionally substituted aryl (e.g., $C_{4-18}$ aryl), optionally substituted alkaryl (e.g., $C_{1-6}$ alk-$C_{4-18}$ aryl), optionally substituted alkoxy (e.g., $C_{1-6}$ alkoxy), amino, optionally substituted aminoalkyl (e.g., amino-$C_{1-6}$ alkyl), etc.; in which each Ak is, independently, a bond, optionally substituted alkylene (e.g., $C_{1-6}$ alkylene), optionally substituted arylene (e.g., $C_{4-24}$ arylene), or optionally substituted heteroalkylene (e.g., $C_{1-6}$ heteroalkylene); and in which n is any useful integer (e.g., of from about 1 to 50).

In a third aspect, the present invention features methods and compositions (e.g., a coating solution) including a polymer comprising a structure having formula (IIIa) or (IIIb):

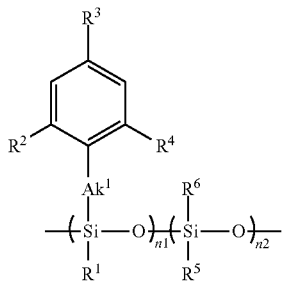

(IIIa)

or

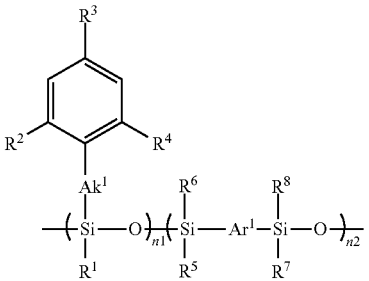

(IIIb)

or a salt thereof, wherein:

each of $R^1$, $R^5$, $R^6$, $R^7$, and $R^8$ is, independently, H, optionally substituted alkyl, optionally substituted alkoxy, optionally substituted alkoxyalkyl, optionally substituted aryl, optionally substituted alkaryl, optionally substituted alkenyl, halo, or optionally substituted haloalkyl;

$Ak^1$ is a bond, optionally substituted alkylene, oxy, or optionally substituted heteroalkylene;

$Ar^1$ is optionally substituted alkylene, optionally substituted arylene, oxy, or optionally substituted heteroalkylene;

each of $R^2$, $R^3$, and $R^4$ is, independently, H, optionally substituted alkyl, optionally substituted alkoxy, optionally substituted alkoxyalkyl, optionally substituted aryl, hydroxyl, optionally substituted hydroxyalkyl, optionally substituted hydroxyaryl, halo, or optionally substituted haloalkyl, wherein at least one of $R^2$, $R^3$, and $R^4$ comprises a hydroxyl; and each of n1 and n2 is, independently, a number of from about 0.5 to about 50.

In some embodiments, methods and compositions (e.g., a coating solution) including a polymer comprising a structure having formula (VIIIa) or (VIIIb):

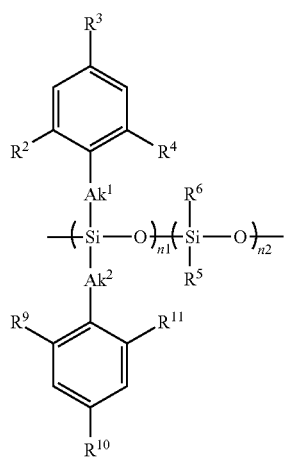

(VIIIa)

or

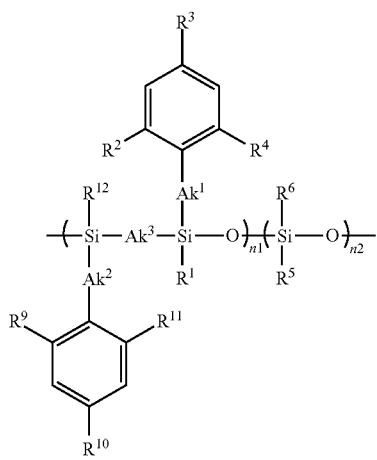

(VIIIb)

or a salt thereof, wherein:

each of $R^1$, $R^5$, $R^6$, and $R^{12}$ is, independently H, optionally substituted alkyl, optionally substituted alkoxy, optionally substituted alkoxyalkyl, optionally substituted aryl, optionally substituted alkaryl, optionally substituted alkenyl, halo, or optionally substituted haloalkyl;

each of $Ak^1$, $Ak^2$, and $Ak^3$ is, independently, a bond, optionally substituted alkylene, optionally substituted arylene, oxy, or optionally substituted heteroalkylene;

each of $R^2$, $R^3$, $R^4$, $R^9$, $R^{10}$, and $R^{11}$ is, independently, H, optionally substituted alkyl, optionally substituted alkoxy, optionally substituted alkoxyalkyl, optionally substituted aryl, hydroxyl, optionally substituted hydroxyalkyl, optionally substituted hydroxyaryl, halo, or optionally substituted haloalkyl, wherein at least one of $R^2$, $R^3$, $R^4$, $R^{10}$, $R^{11}$ and comprises a hydroxyl; and each of n1 and n2 is, independently, a number of from about 0.5 to 50.

In some embodiments, methods and compositions (e.g., a coating solution) including a polymer comprising a structure having formula (IXa) or (IXb):

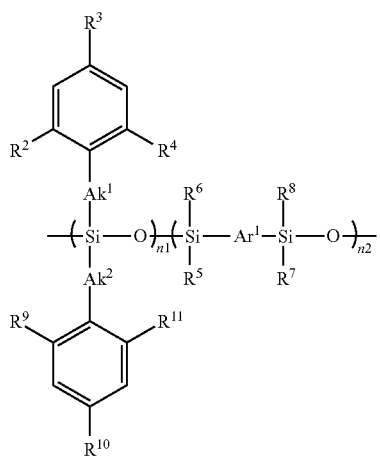

(IXa)

or

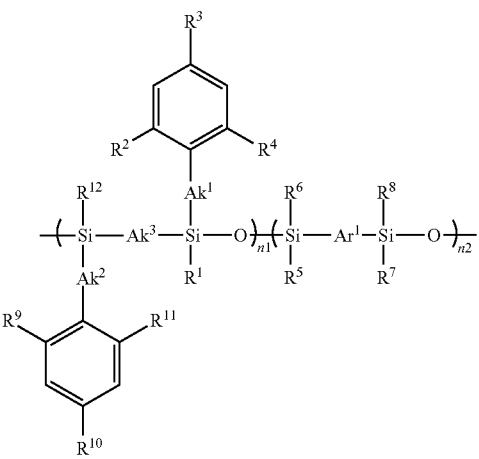

(IXb)

or a salt thereof, wherein:

each of $R^1$, $R^5$, $R^6$, $R^7$, $R^8$, and $R^{12}$ is, independently H, optionally substituted alkyl, optionally substituted alkoxy, optionally substituted alkoxyalkyl, optionally substituted aryl, optionally substituted alkaryl, optionally substituted alkenyl, halo, or optionally substituted haloalkyl;

each of $Ak^1$, $Ak^2$, and $Ak^3$ is, independently, a bond, optionally substituted alkylene, optionally substituted arylene, oxy, or optionally substituted heteroalkylene;

$Ar^1$ is optionally substituted alkylene, optionally substituted arylene, oxy, or optionally substituted heteroalkylene;

each of $R^2$, $R^3$, $R^4$, $R^9$, $R^{10}$, and $R^{11}$ is, independently, H, optionally substituted alkyl, optionally substituted alkoxy, optionally substituted alkoxyalkyl, optionally substituted aryl, hydroxyl, optionally substituted hydroxyalkyl, optionally substituted hydroxyaryl, halo, or optionally substituted haloalkyl, wherein at least one of $R^2$, $R^3$, $R^4$, $R^9$, $R^{10}$, and $R^{11}$, comprises a hydroxyl; and each of n1 and n2 is, independently, a number of from about 0.5 to 50.

In some embodiments (e.g., of any formula described herein), at least one of $R^2$, $R^3$, $R^4$, $R^9$, $R^{10}$, and $R^{11}$ includes a hydroxyl. In some embodiments, at least one of $R^2$, $R^3$, $R^4$, $R^9$, $R^{10}$, and $R^{11}$ is hydroxyl, optionally substituted hydroxyalkyl, or optionally substituted hydroxyaryl. In other embodiments, at least one of $R^2$, $R^3$, $R^4$, $R^9$, $R^{10}$, and $R^{11}$ is halo or optionally substituted haloalkyl. In yet other embodiments, $R^4$ and $R^{11}$ includes a hydroxyl, and each of $R^2$, $R^3$, $R^9$, and $R^{10}$ independently, is halo or optionally substituted haloalkyl.

In some embodiments (e.g., of any formula described herein), $R^2$ and/or $R^4$ and/or $R^9$ and/or $R^{11}$ is hydroxyl or optionally substituted hydroxyalkyl or optionally substituted hydroxyaryl. In other embodiments, $R^2$ and/or $R^3$ and/or $R^9$ and/or $R^{11}$ is halo or optionally substituted haloalkyl.

In some embodiments (e.g., of any formula described herein), the polymer includes a structure having DKAP or Hot DKAP.

In some embodiments (e.g., of any formula described herein), the ratio of n1 to n2 is of from about 1:5 to about 5:1.

In a fourth aspect, the present invention features a coating solution including: (i) about 0.01% (w/v) to about 5% (w/v) of a polymer (e.g., any described herein, such as a polymer including a structure having formula (I), (II), (IIIa), (IIIb), (VI), (VII), (VIIIa), (VIIIb), (IXa), or (IXb)) and (ii) about 0.00001% (w/v) to about 1% (w/v) of a thermally activated initiator (e.g., any described herein).

In some embodiments, the coating solution any useful amount of polymer, such as about 0.005% (w/v) to about 10% (w/v), including about 0.005% (w/v) to 0.01% (w/v), 0.005% (w/v) to 0.1% (w/v), 0.005% (w/v) to 0.5% (w/v), 0.005% (w/v) to 1% (w/v), 0.005% (w/v) to 2% (w/v), 0.005% (w/v) to 3% (w/v), 0.005% (w/v) to 4% (w/v), 0.005% (w/v) to 5% (w/v), 0.005% (w/v) to 7% (w/v), 0.01% (w/v) to 0.1% (w/v), 0.01% (w/v) to 0.5% (w/v), 0.01% (w/v) to 1% (w/v), 0.01% (w/v) to 2% (w/v), 0.01% (w/v) to 3% (w/v), 0.01% (w/v) to 4% (w/v), 0.01% (w/v) to 5% (w/v), 0.01% (w/v) to 7% (w/v), 0.01% (w/v) to 10% (w/v), 0.1% (w/v) to 0.5% (w/v), 0.1% (w/v) to 1% (w/v), 0.1% (w/v) to 2% (w/v), 0.1% (w/v) to 3% (w/v), 0.1% (w/v) to 4% (w/v), 0.1% (w/v) to 5% (w/v), 0.1% (w/v) to 7% (w/v), 0.1% (w/v) to 10% (w/v), 0.2% (w/v) to 0.5% (w/v), 0.2% (w/v) to 1% (w/v), 0.2% (w/v) to 2% (w/v), 0.2% (w/v) to 3% (w/v), 0.2% (w/v) to 4% (w/v), 0.2% (w/v) to 5% (w/v), 0.2% (w/v) to 7% (w/v), 0.2% (w/v) to 10% (w/v), 0.3% (w/v) to 0.5% (w/v), 0.3% (w/v) to 1% (w/v), 0.3% (w/v) to 2% (w/v), 0.3% (w/v) to 3% (w/v), 0.3% (w/v) to 4% (w/v), 0.3% (w/v) to 5% (w/v), 0.3% (w/v) to 7% (w/v), 0.3% (w/v) to 10% (w/v), 0.4% (w/v) to 0.5% (w/v), 0.4% (w/v) to 1% (w/v), 0.4% (w/v) to 2% (w/v), 0.4% (w/v) to 3% (w/v), 0.4% (w/v) to 4% (w/v), 0.4% (w/v) to 5% (w/v), 0.4% (w/v) to 7% (w/v), 0.4% (w/v) to 10% (w/v), 0.5% (w/v) to 1% (w/v), 0.5% (w/v) to 2% (w/v), 0.5% (w/v) to 3% (w/v), 0.5% (w/v) to 4% (w/v), 0.5% (w/v) to 5% (w/v), 0.5% (w/v) to 7% (w/v), 0.5% (w/v) to 10% (w/v), 1% (w/v) to 2% (w/v), 1% (w/v) to 3% (w/v), 1% (w/v) to 4% (w/v), 1% (w/v) to 5% (w/v), 01% (w/v) to 7% (w/v), 1% (w/v) to 10% (w/v), 2% (w/v) to 5% (w/v), 2% (w/v) to 7% (w/v), or 2% (w/v) to 10% (w/v).

In some embodiments, the coating solution any useful amount of thermally activated initiator (e.g., any described herein), such as about 0.00001% (w/v) to about 1% (w/v), including about 0.00001% (w/v) to 0.001% (w/v), 0.00001% (w/v) to 0.01% (w/v), 0.00001% (w/v) to 0.1% (w/v), 0.00001% (w/v) to 0.2% (w/v), 0.00001% (w/v) to 0.5% (w/v), 0.00001% (w/v) to 0.7% (w/v), 0.00005% (w/v) to 0.001% (w/v), 0.00005% (w/v) to 0.01% (w/v), 0.00005% (w/v) to 0.1% (w/v), 0.00005% (w/v) to 0.2% (w/v), 0.00005% (w/v) to 0.5% (w/v), 0.00005% (w/v) to 0.7% (w/v), 0.0001% (w/v) to 0.001% (w/v), 0.0001% (w/v) to 0.01% (w/v), 0.0001% (w/v) to 0.1% (w/v), 0.0001% (w/v) to 0.2% (w/v), 0.0001% (w/v) to 0.5% (w/v), 0.0001% (w/v) to 0.7% (w/v), 0.0001% (w/v) to 1% (w/v), 0.0005% (w/v) to 0.001% (w/v), 0.0005% (w/v) to 0.01% (w/v), 0.0005% (w/v) to 0.1% (w/v), 0.0005% (w/v) to 0.2% (w/v), 0.0005% (w/v) to 0.5% (w/v), 0.0005% (w/v) to 0.7% (w/v), 0.0005% (w/v) to 1% (w/v), 0.001% (w/v) to 0.01% (w/v), 0.001% (w/v) to 0.1% (w/v), 0.001% (w/v) to 0.2% (w/v), 0.001% (w/v) to 0.5% (w/v), 0.001% (w/v) to 0.7% (w/v), 0.001% (w/v) to 1% (w/v), 0.005% (w/v) to 0.01% (w/v), 0.005% (w/v) to 0.1% (w/v), 0.005% (w/v) to 0.2% (w/v), 0.005% (w/v) to 0.5% (w/v), 0.005% (w/v) to 0.7% (w/v), 0.005% (w/v) to 1% (w/v), 0.01% (w/v) to 0.1% (w/v), 0.01% (w/v) to 0.2% (w/v), 0.01% (w/v) to 0.5% (w/v), 0.01% (w/v) to 0.7% (w/v), 0.01% (w/v) to 1% (w/v), 0.05% (w/v) to 0.1% (w/v), 0.05% (w/v) to 0.2% (w/v), 0.05% (w/v) to 0.5% (w/v), 0.05% (w/v) to 0.7% (w/v), 0.05% (w/v) to 1% (w/v), 0.1% (w/v) to 0.2% (w/v), 0.1% (w/v) to 0.5% (w/v), 0.1% (w/v) to 0.7% (w/v), 0.1% (w/v) to 1% (w/v), 0.5% (w/v) to 0.7% (w/v), or 0.5% (w/v) to 1% (w/v).

In a fifth aspect, the present invention features a method including:

(i) introducing a coating solution to an internal bore of a column, the coating solution including a polymer (e.g., any described herein, such as a polymer having a structure of formula (I), (II), (IIIa), (IIIb), (VI), (VII), (VIIIa), (VIIIb), (IXa), or (IXb) or a salt thereof), a thermally activated initiator (e.g., any described herein, such as an initiator having a structure of formula (X) or a salt thereof), and a solvent (e.g., any described herein);

(ii) heating the column to a first temperature above a thermal initiation temperature characteristic of the thermally activated initiator, thereby crosslinking the polymer in the presence of the thermally activated initiator to provide a film.

In some embodiments, the thermal initiation temperature is of from about 30° C. to about 120° C. (e.g., from about 30° C. to 50° C., 30° C. to 80° C., 30° C. to 100° C., 40° C. to 50° C., 40° C. to 80° C., 40° C. to 100° C., 40° C. to 120° C., 50° C., 50° C. to 80° C., 50° C. to 100° C., 50° C. to 120° C., 60° C. to 80° C., 60° C. to 100° C., 60° C. to 120° C., 80° C. to 100° C., 80° C. to 120° C., or 100° C. to 120° C.). In other embodiments, the first temperature is of from about 40° C. to 130° C. (e.g., from about 40° C. to 50° C., 40° C. to 80° C., 40° C. to 100° C., 40° C. to 120° C., 50° C. to 80° C., 50° C. to 100° C., 50° C. to 120° C., 50° C. to 130° C., 60° C. to 80° C., 60° C. to 100° C., 60° C. to 120° C., 60° C. to 130° C., 80° C. to 100° C., 80° C. to 120° C., 80° C. to 130° C., 100° C. to 120° C., or 100° C. to 130° C.).

In some embodiments, the method include (e.g., after step (i)): removing the solvent from the internal bore of the column, thereby providing a layer including the polymer and the thermally activated initiator disposed on a surface of the internal bore.

In some embodiments, the thermally activated initiator is an azo-based initiator (e.g., any described herein). In particular embodiments, the azo-based initiator is 2,2'-azobisisobutyronitrile, 2,2'-azobis(N-butyl-2-methylpropionamide), 1,1'-azobis(cyanocyclohexane), 1,1'-azobis(cyclohexane-1-carbonitrile), 2,2'-azobis(2-methylbutyronitrile), dimethyl 2,2'-azobis(2-methylpropionate), 2,2'-azobis(2,4-dimethylvaleronitrile), and/or 2,2'-azobis(4-methoxy-2,4-dimethylvaleronitrile).

In some embodiments, the solvent is a polar, aprotic solvent. In other embodiments, the solvent has a boiling point that is less than the thermal initiation temperature.

In some embodiments, the film has a thickness of from about 10 nm to about 10 µm (e.g., about 10 nm to 30 nm, 10 nm to 50 nm, 10 nm to 100 nm, 10 nm to 300 nm, 10 nm to 500 nm, 10 nm to 800 nm, 10 nm to 1 µm, 10 nm to 5 µm, 25 nm to 30 nm, 25 nm to 50 nm, 25 nm to 100 nm, 25 nm to 300 nm, 25 nm to 500 nm, 25 nm to 800 nm, 25 nm to 1 µm, 25 nm to 5 µm, 25 nm to 10 µm, 50 nm to 100 nm, 50 nm to 300 nm, 50 nm to 500 nm, 50 nm to 800 nm, 50 nm to 1 µm, 50 nm to 5 µm, 50 nm to 10 µm, 100 nm to 300 nm, 100 nm to 500 nm, 100 nm to 800 nm, 100 nm to 1 µm, 100 nm to 5 µm, 100 nm to 10 µm, 200 nm to 300 nm, 200 nm to 500 nm, 200 nm to 800 nm, 200 nm to 1 µm, 200 nm to 5 µm, 200 nm to 10 µm, 300 nm to 500 nm, 300 nm to 800 nm, 300 nm to 1 µm, 300 nm to 5 µm, 300 nm to 10 µm, 500 nm to 800 nm, 500 nm to 1 µm, 500 nm to 5 µm, 500 nm to 10 µm, 800 nm to 1 µm, 800 nm to 5 µm, 800 nm to 10 µm, 1 µm to 5 µm, 1 µm to 10 µm, or 5 µm to 10 µm.

In some embodiments, the method includes (e.g., before step (i)): exposing the internal bore of the column to a silanization agent (e.g., any described herein); and removing the silanization agent, thereby providing a silanized surface to be introduced to the coating solution.

In some embodiments, the method includes use of a coating solution including about 0.01% (w/v) to about 5% (w/v) of the polymer (e.g., any described herein) and about 0.00001% (w/v) to about 0.2% (w/v) of the thermally activated initiator (e.g., any described herein).

In a sixth aspect, the present invention features a method of detecting an organophosphorous agent (e.g., any described herein, such a structure having formula (IV) or (V)), the method including:

(i) providing a column having a film disposed within an internal bore of the column, the film including a polymer (e.g., any described herein, such as a polymer that includes a structure having formula (I), (II), (IIIa), (IIIb), (VI), (VII), (VIIIa), (VIIIb), (IXa), or (IXb) or a salt thereof); and (ii) injecting a test sample into the internal bore of the column, wherein the organophosphorous agent, if present, binds to the film.

In some embodiments, the method further includes (e.g., after step (ii)): purging the column with a fluid (e.g., a liquid, a gas, an inert gas, etc.) to remove the bound organophosphorous agent, if present, from the film.

Definitions

As used herein, the term "about" means +/−10% of any recited value. As used herein, this term modifies any recited value, range of values, or endpoints of one or more ranges.

By "fluidic communication," as used herein, refers to any duct, channel, tube, pipe, chamber, or pathway through which a substance, such as a liquid, gas, or solid may pass substantially unrestricted when the pathway is open. When the pathway is closed, the substance is substantially restricted from passing through. Typically, limited diffusion of a substance through the material of a plate, base, and/or a substrate, which may or may not occur depending on the compositions of the substance and materials, does not constitute fluidic communication.

By "microfluidic" or "micro" is meant having at least one dimension that is less than 1 mm and, optionally, equal to or larger than about 1 µm. For instance, a microfluidic structure (e.g., any structure described herein) can have a length, width, height, cross-sectional dimension, circumference, radius (e.g., external or internal radius), or diameter that is less than 1 mm.

By "nano" is meant having at least one dimension that is less than 1 µm but equal to or larger than about 1 nm. For instance, a nanostructure (e.g., any structure described herein, such as a nanoparticle) can have a length, width, height, cross-sectional dimension, circumference, radius (e.g., external or internal radius), or diameter that is less than 1 µm but equal to or larger than 1 nm. In other instances, the nanostructure has a dimension that is of from about 1 nm to about 1 µm.

As used herein, the terms "top," "bottom," "upper," "lower," "above," and "below" are used to provide a relative relationship between structures. The use of these terms does not indicate or require that a particular structure must be located at a particular location in the apparatus.

By "alkaryloxy" is meant —OR, where R is an optionally substituted alkaryl group, as described herein. In some embodiments, an unsubstituted alkaryloxy group is a $C_{1-6}$ alk-$C_{4-18}$ aryloxy or a $C_{1-6}$ alk-$C_{6-18}$ aryloxy group.

By "alkaryl" is meant an aryl group, as defined herein, attached to the parent molecular group through an alkylene group, as defined herein. Similarly, by the term "alkheteroaryl" is meant a heteroaryl group, as defined herein, attached to the parent molecular group through an alkylene group. Other groups preceded by the prefix "alk-" are defined in the same manner. The alkaryl group can be substituted or unsubstituted. For example, the alkaryl group can be substituted with one or more substitution groups, as described herein for alkyl and/or aryl. Exemplary unsubstituted alkaryl groups are of from 7 to 16 carbons ($C_{7-16}$ alkaryl), as well as those having an alkylene group with 1 to 6 carbons and an aryl group with 4 to 18 carbons (i.e., $C_{1-6}$ alk-$C_{4-18}$ aryl).

By "alkenyl" is meant an optionally substituted $C_{2-24}$ alkyl group having one or more double bonds. The alkenyl group can be cyclic (e.g., $C_{3-24}$ cycloalkenyl) or acyclic. The alkenyl group can also be substituted or unsubstituted. For example, the alkenyl group can be substituted with one or more substitution groups, as described herein for alkyl.

By "alkyl" and the prefix "alk" is meant a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic (e.g., $C_{3-24}$ cycloalkyl) or acyclic. The alkyl group can be branched or unbranched. The alkyl group can also be substituted or unsubstituted. For example, the alkyl group can be substituted with one, two, three or, in the case of alkyl groups of two carbons or more, four substituents independently selected from the group consisting of: (1) $C_{1-6}$ alkoxy (e.g., —OAk, in which Ak is an alkyl group, as defined herein); (2) $C_{1-6}$ alkylsulfinyl (e.g., —S(O)Ak, in which Ak is an alkyl group, as defined herein); (3) $C_{1-6}$ alkylsulfonyl (e.g., —SO$_2$Ak, in which Ak is an alkyl group, as defined herein); (4) amino (e.g., —NR$^{N1}$R$^{N2}$, where each of R$^{N1}$ and R$^{N2}$ is, independently, H or optionally substituted alkyl, or R$^{N1}$ and R$^{N2}$, taken together with the nitrogen atom to which each are attached, form a heterocyclyl group); (5) aryl; (6) arylalkoxy (e.g., —OA$^L$Ar, in which A$^L$ is an alkylene group and Ar is an aryl group, as defined herein); (7) aryloyl (e.g., —C(O)Ar, in which Ar is an aryl group, as defined herein); (8) azido (e.g., an —N$_3$ group); (9) cyano (e.g., a —CN group); (10) carboxyaldehyde (e.g., a —C(O)H group); (11) $C_{3-8}$ cycloalkyl; (12) halo; (13) heterocyclyl (e.g., a 5-, 6- or 7-membered ring, unless otherwise specified, containing one, two, three, or four non-carbon heteroatoms (e.g., independently selected from the group consisting of nitrogen, oxygen, phosphorous, sulfur, or halo)); (14) heterocyclyloxy (e.g., —OHet, in which Het is a heterocyclyl group); (15) heterocyclyloyl (e.g., —C(O)Het, in which Het is a heterocyclyl group); (16) hydroxyl (e.g., a —OH group); (17) N-protected amino; (18) nitro (e.g., an —NO$_2$ group); (19) oxo (e.g., an =O group); (20) $C_{3-8}$ spirocyclyl (e.g., an alkylene diradical, both ends of which are bonded to the same carbon atom of the parent group to form a spirocyclyl group); (21) $C_{1-6}$ thioalkoxy (e.g., —SAk, in which Ak is an alkyl group, as defined herein); (22) thiol (e.g., an —SH group); (23) —CO$_2$R$^A$, where R$^A$ is selected from the group consisting of (a) hydrogen, (b) $C_{1-6}$ alkyl, (c) $C_{4-18}$ aryl, and (d) $C_{1-6}$ alk-$C_{4-18}$ aryl; (24) —C(O)NR$^B$R$^C$, where each of R$^B$ and R$^C$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; (25) —SO$_2$R$^D$, where R$^D$ is selected from the group consisting of (a) $C_{1-6}$ alkyl, (b) $C_{4-18}$ aryl, and (c) $C_{1-6}$ alk-$C_{4-18}$ aryl; (26) —SO$_2$NR$^E$R$^F$, where each of R$^E$ and R$^F$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; and (27) —NR$^G$R$^H$, where each of R$^G$ and R$^H$ is, independently, selected from the group consisting of (a) hydrogen, (b) an N-protecting group, (c) $C_{1-6}$ alkyl, (d) $C_{2-6}$ alkenyl, (e) $C_{2-6}$ alkynyl, (f) $C_{4-18}$ aryl, (g) $C_{1-6}$ alk-$C_{4-18}$ aryl, (h) $C_{3-8}$ cycloalkyl, and (i) $C_{1-6}$ alk-$C_{3-8}$ cycloalkyl, wherein in one embodiment no two groups are bound to the nitrogen atom through a carbonyl group or a sulfonyl group. The alkyl group can be a primary, secondary, or tertiary alkyl group substituted with one or more substituents (e.g., one or more halo or alkoxy). In some embodiments, the unsubstituted alkyl group is a $C_{1-3}$, $C_{1-6}$, $C_{1-12}$, $C_{1-16}$, $C_{1-18}$, $C_{1-20}$, or $C_{1-24}$ alkyl group.

By "alkylene" is meant a multivalent (e.g., bivalent, trivalent, tetravalent, etc.) form of an alkyl group, as described herein. Exemplary alkylene groups include methylene, ethylene, propylene, butylene, etc. In some embodiments, the alkylene group is a $C_{1-3}$, $C_{1-6}$, $C_{1-12}$, $C_{1-16}$, $C_{1-18}$, $C_{1-20}$, $C_{1-24}$, $C_{2-3}$, $C_{2-6}$, $C_{2-12}$, $C_{2-16}$, $C_{2-18}$, $C_{2-20}$, or $C_{2-24}$ alkylene group. The alkylene group can be branched or unbranched. The alkylene group can also be substituted or unsubstituted. For example, the alkylene group can be substituted with one or more substitution groups, as described herein for alkyl.

By "alkoxy" is meant —OR, where R is an optionally substituted alkyl group, as described herein. Exemplary alkoxy groups include methoxy, ethoxy, butoxy, trihaloalkoxy, such as trifluoromethoxy, etc. The alkoxy group can be substituted or unsubstituted. For example, the alkoxy group can be substituted with one or more substitution groups, as described herein for alkyl. Exemplary unsubstituted alkoxy groups include $C_{1-3}$, $C_{1-6}$, $C_{1-12}$, $C_{1-16}$, $C_{1-18}$, $C_{1-20}$, or $C_{1-24}$ alkoxy groups.

By "alkoxyalkyl" is meant an alkyl group, as defined herein, which is substituted with an alkoxy group, as defined herein. Exemplary unsubstituted alkoxyalkyl groups include between 2 to 12 carbons ($C_{2-12}$ alkoxyalkyl), as well as those having an alkyl group with 1 to 6 carbons and an alkoxy group with 1 to 6 carbons (i.e., $C_{1-6}$ alkoxy-$C_{1-6}$ alkyl).

By "alkoxycarbonyl" is meant an alkoxy group, as defined herein, that is attached to the parent molecular group through a carbonyl group. In some embodiments, an unsubstituted alkoxycarbonyl group is a $C_{2-7}$ alkoxycarbonyl group.

By "amidino" is meant —C(NR$^{N3}$)NR$^{N1}$R$^{N2}$, where each of R$^{N1}$, R$^{N2}$, and R$^{N3}$ is, independently, H, optionally substituted alkyl, or optionally substituted aryl; or where a combination of R$^{N1}$ and R$^{N2}$, taken together with the nitrogen atom to which each are attached, form a heterocyclyl group, as defined herein.

By "amido" is meant —C(O)NR$^{N1}$R$^{N2}$, where each of R$^{N1}$ and R$^{N2}$ is, independently, H, optionally substituted alkyl, or optionally substituted aryl; or where a combination of R$^{N1}$ and R$^{N2}$, taken together with the nitrogen atom to which each are attached, form a heterocyclyl group, as defined herein.

By "amino" is meant —NR$^{N1}$R$^{N2}$, where each of R$^{N1}$ and R$^{N2}$ is, independently, H or optionally substituted alkyl, or R$^{N1}$ and R$^{N2}$, taken together with the nitrogen atom to which each are attached, form a heterocyclyl group, as defined herein.

By "aminoalkyl" is meant an alkyl group, as defined herein, substituted by an amino group, as defined herein.

By "aminoalkoxy" is meant an alkoxy group, as defined herein, substituted by an amino group, as defined herein.

By "aminothioalkoxy" is meant a thioalkoxy group, as defined herein, substituted by an amino group, as defined herein.

By "aryl" is meant a group that contains any carbon-based aromatic group including, but not limited to, benzyl, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one, two, three, four, or five substituents independently selected from the group consisting of: (1) $C_{1-6}$ alkanoyl (e.g., —C(O)Ak, in which Ak is an alkyl group, as defined herein); (2) $C_{1-6}$ alkyl; (3) $C_{1-6}$ alkoxy (e.g., —OAk, in which Ak is an alkyl group, as defined herein); (4) $C_{1-6}$ alkoxy-$C_{1-6}$ alkyl (e.g., an alkyl group, which is substituted with an alkoxy group —OAk, in which Ak is an alkyl group, as defined herein); (5) $C_{1-6}$ alkylsulfinyl (e.g., —S(O)Ak, in which Ak is an alkyl group, as defined herein); (6) $C_{1-6}$ alkylsulfinyl-$C_{1-6}$ alkyl (e.g., an alkyl group, which is substituted by an alkylsulfinyl group —S(O)Ak, in which Ak is an alkyl group, as defined herein); (7) $C_{1-6}$ alkylsulfonyl (e.g., —SO$_2$Ak, in which Ak is an alkyl group, as defined herein); (8) $C_{1-6}$ alkylsulfonyl-$C_{1-6}$ alkyl (e.g., an alkyl group, which is substituted by an alkylsulfonyl group —SO$_2$Ak, in which Ak is an alkyl group, as defined herein); (9) aryl; (10) amino (e.g., —NR$^{N1}$R$^{N2}$, where each of R$^{N1}$ and R$^{N2}$ is, independently, H or optionally substituted alkyl, or R$^{N1}$ and R$^{N2}$, taken together with the nitrogen atom to which each are attached, form a heterocyclyl group); (11) $C_{1-6}$ aminoalkyl (e.g., meant an alkyl group, as defined herein, substituted by an amino group); (12) heteroaryl; (13) $C_{1-6}$ alk-$C_{4-18}$ aryl (e.g., -A$^L$Ar, in which A$^L$ is an alkylene group and Ar is an aryl group, as defined herein); (14) aryloyl (e.g., —C(O)Ar, in which Ar is an aryl group, as defined herein); (15) azido (e.g., an —N$_3$ group); (16) cyano (e.g., a —CN group); (17) $C_{1-6}$ azidoalkyl (e.g., a —N$_3$ azido group attached to the parent molecular group through an alkyl group, as defined herein); (18) carboxyaldehyde (e.g., a —C(O)H group); (19) carboxyaldehyde-$C_{1-6}$ alkyl (e.g., -A$^L$C(O)H, in which A$^L$ is an alkylene group, as defined herein); (20) $C_{3-8}$ cycloalkyl; (21) $C_{1-6}$ alk-$C_{3-8}$ cycloalkyl (e.g., -$A^L$Cy, in which $A^L$ is an alkylene group and Cy is a cycloalkyl group, as defined herein); (22) halo (e.g., F, Cl, Br, or I); (23) $C_{1-6}$ haloalkyl (e.g., an alkyl group, as defined herein, substituted with one or more halo); (24) heterocyclyl; (25) heterocyclyloxy (e.g., OHet, in which Het is a heterocyclyl group); (26) heterocyclyloyl (e.g., —C(O)Het, in which Het is a heterocyclyl group); (27) hydroxyl (e.g., a —OH group); (28) $C_{1-6}$ hydroxyalkyl (e.g., an alkyl group, as defined herein, substituted by one to three hydroxyl groups, with the proviso that no more than one hydroxyl group may be attached to a single carbon atom of the alkyl group); (29) nitro (e.g., an —$NO_2$ group); (30) $C_{1-6}$ nitroalkyl (e.g., an alkyl group, as defined herein, substituted by one to three nitro groups); (31) N-protected amino; (32) N-protected amino-$C_{1-6}$ alkyl; (33) oxo (e.g., an =O group); (34) $C_{1-6}$ thioalkoxy (e.g., —SAk, in which Ak is an alkyl group, as defined herein); (35) thio-$C_{1-6}$ alkoxy-$C_{1-6}$ alkyl (e.g., an alkyl group, which is substituted by an thioalkoxy group —SAk, in which Ak is an alkyl group, as defined herein); (36) —$(CH_2)_r CO_2 R^A$, where r is an integer of from zero to four, and $R^A$ is selected from the group consisting of (a) hydrogen, (b) $C_{1-6}$ alkyl, (c) $C_{4-18}$ aryl, and (d) $C_{1-6}$ alk-$C_{4-18}$ aryl; (37) —$(CH_2)_r CONR^B R^C$, where r is an integer of from zero to four and where each $R^B$ and $R^C$ is independently selected from the group consisting of (a) hydrogen, (b) $C_{1-6}$ alkyl, (c) $C_{4-18}$ aryl, and (d) $C_{1-6}$ alk-$C_{4-18}$ aryl; (38) $(CH_2)_r SO_2 R^D$, where r is an integer of from zero to four and where $R^D$ is selected from the group consisting of (a) $C_{1-6}$ alkyl, (b) $C_{4-18}$ aryl, and (c) $C_{1-6}$ alk-$C_{4-18}$ aryl; (39) $(CH_2)_r SO_2 NR^E R^F$, where r is an integer of from zero to four and where each of $R^E$ and $R^F$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; (40) —$(CH_2)_r NR^G R^H$, where r is an integer of from zero to four and where each of $R^G$ and $R^H$ is, independently, selected from the group consisting of (a) hydrogen, (b) an N-protecting group, (c) $C_{1-6}$ alkyl, (d) $C_{2-6}$ alkenyl, (e) $C_{2-6}$ alkynyl, (f) $C_{4-18}$ aryl, (g) $C_{1-6}$ alk-$C_{4-18}$ aryl, (h) $C_{3-8}$ cycloalkyl, and (i) $C_{1-6}$ alk-$C_{3-8}$ cycloalkyl, wherein in one embodiment no two groups are bound to the nitrogen atom through a carbonyl group or a sulfonyl group; (41) thiol; (42) perfluoroalkyl (e.g., an alkyl group, as defined herein, having each hydrogen atom substituted with a fluorine atom); (43) perfluoroalkoxy (e.g., —ORf, in which Rf is an alkyl group, as defined herein, having each hydrogen atom substituted with a fluorine atom); (44) aryloxy (e.g., —OAr, where Ar is an optionally substituted aryl group, as described herein); (45) cycloalkoxy (e.g., —OCy, in which Cy is a cycloalkyl group, as defined herein); (46) cycloalkylalkoxy (e.g., —$OA^L$Cy, in which $A^L$ is an alkylene group and Cy is a cycloalkyl group, as defined herein); and (47) arylalkoxy (e.g., —$OA^L$Ar, in which $A^L$ is an alkylene group and Ar is an aryl group, as defined herein). In particular embodiments, an unsubstituted aryl group is a $C_{4-18}$, $C_{4-14}$, $C_{4-12}$, $C_{4-10}$, $C_{6-18}$, $C_{6-14}$, $C_{6-12}$, or $C_{6-10}$ aryl group.

By "arylalkoxy" is meant an alkaryl group, as defined herein, attached to the parent molecular group through an oxygen atom.

By "arylene" is meant a multivalent (e.g., bivalent, trivalent, tetravalent, etc.) form of an aryl group, as described herein. Exemplary arylene groups include phenylene, naphthylene, biphenylene, triphenylene, diphenyl ether, acenaphthenylene, anthrylene, or phenanthrylene. In some embodiments, the arylene group is a $C_{4-18}$, $C_{4-14}$, $C_{4-12}$, $C_{4-10}$, $C_{6-18}$, $C_{6-14}$, $C_{6-12}$, or $C_{6-10}$ arylene group. The arylene group can be branched or unbranched. The arylene group can also be substituted or unsubstituted. For example, the arylene group can be substituted with one or more substitution groups, as described herein for aryl.

By "aryloxy" is meant —OR, where R is an optionally substituted aryl group, as described herein. In some embodiments, an unsubstituted aryloxy group is a $C_{4-18}$ or $C_{6-18}$ aryloxy group.

By "azo" is meant an —N=N— group.

By "carbonyl" is meant a —C(O)— group, which can also be represented as >C=O.

By "carboxyl" is meant a —$CO_2$H group.

By "cyano" is meant a —CN group.

By "cycloalkyl" is meant a monovalent saturated or unsaturated non-aromatic cyclic hydrocarbon group of from three to eight carbons, unless otherwise specified, and is exemplified by cyclopropyl, cyclobutyl, cyclopentyl, cyclohexyl, cycloheptyl, bicyclo[2.2.1.]heptyl and the like. The cycloalkyl group can also be substituted or unsubstituted. For example, the cycloalkyl group can be substituted with one or more groups including those described herein for alkyl.

By "cycloalkoxy" is meant a cycloalkyl group, as defined herein, attached to the parent molecular group through an oxygen atom.

By "halo" is meant F, Cl, Br, or I.

By "haloalkyl" is meant an alkyl group, as defined herein, substituted with one or more halo.

By "heteroalkyl" is meant an alkyl group, as defined herein, containing one, two, three, or four non-carbon heteroatoms (e.g., independently selected from the group consisting of nitrogen, oxygen, phosphorous, sulfur, or halo).

By "heteroalkylene" is meant a divalent form of an alkylene group, as defined herein, containing one, two, three, or four non-carbon heteroatoms (e.g., independently selected from the group consisting of nitrogen, oxygen, phosphorous, sulfur, silicon, and/or halo).

By "heterocyclyl" is meant a 5-, 6- or 7-membered ring, unless otherwise specified, containing one, two, three, or four non-carbon heteroatoms (e.g., independently selected from the group consisting of nitrogen, oxygen, phosphorous, sulfur, or halo). The 5-membered ring has zero to two double bonds and the 6- and 7-membered rings have zero to three double bonds. The term "heterocyclyl" also includes bicyclic, tricyclic and tetracyclic groups in which any of the above heterocyclic rings is fused to one, two, or three rings independently selected from the group consisting of an aryl ring, a cyclohexane ring, a cyclohexene ring, a cyclopentane ring, a cyclopentene ring, and another monocyclic heterocyclic ring, such as indolyl, quinolyl, isoquinolyl, tetrahydroquinolyl, benzofuryl, benzothienyl and the like. Heterocyclics include thiiranyl, thietanyl, tetrahydrothienyl, thianyl, thiepanyl, aziridinyl, azetidinyl, pyrrolidinyl, piperidinyl, azepanyl, pyrrolyl, pyrrolinyl, pyrazolyl, pyrazolinyl, pyrazolidinyl, imidazolyl, imidazolinyl, imidazolidinyl, pyridyl, homopiperidinyl, pyrazinyl, piperazinyl, pyrimidinyl, pyridazinyl, oxazolyl, oxazolidinyl, isoxazolyl, isoxazolidiniyl, morpholinyl, thiomorpholinyl, thiazolyl, thiazolidinyl, isothiazolyl, isothiazolidinyl, indolyl, quinolinyl, isoquinolinyl, benzimidazolyl, benzothiazolyl, benzoxazolyl, benzodioxolyl, furyl, furanyl, thienyl, thiazolidinyl, isothiazolyl, isoindazoyl, triazolyl, tetrazolyl, tetrazolinyl, oxadiazolyl, uricyl, thiadiazolyl, pyrimidyl, tetrahydrofuranyl, dihydrofuranyl, tetrahydrothienyl, dihydrothienyl, dihydroindolyl, tetrahydroquinolyl, tetrahydroisoquinolyl, pyranyl, dihydropyranyl, dithiazolyl, benzofuranyl, benzothienyl, and the like. The heterocyclyl group can be substituted with one, two, three, four, or five substituents independently selected from the group consisting of: (1) $C_{1-6}$ alkanoyl; (2) $C_{1-6}$ alkyl; (3) $C_{1-6}$ alkoxy; (4) $C_{1-6}$ alkoxy-$C_{1-6}$ alkyl; (5) $C_{1-6}$ alkylsulfinyl; (6) $C_{1-6}$ alkylsulfinyl-$C_{1-6}$ alkyl; (7) $C_{1-6}$ alkylsulfonyl; (8) $C_{1-6}$ alkylsulfonyl-$C_{1-6}$ alkyl; (9) amino; (10) $C_{1-6}$ aminoalkyl; (12) heteroaryl; (13) $C_{1-6}$ alk-$C_{4-18}$ aryl; (14) aryloyl; (15) azido; (16) cyano; (17) $C_{1-6}$ azidoalkyl; (18) carboxyaldehyde; (19) carboxyaldehyde-$C_{1-6}$ alkyl; (20) $C_{3-8}$ cycloalkyl; (21) $C_{1-6}$ alk-$C_{3-8}$ cycloalkyl; (22) halo; (23) $C_{1-6}$ haloalkyl; (24) heterocyclyl; (25) heterocyclyloxy; (26) heterocyclyloyl; (27) hydroxyl; (28) $C_{1-6}$ hydroxyalkyl; (29) nitro; (30) $C_{1-6}$ nitroalkyl; (31) N-protected amino; (32) N-protected amino-$C_{1-6}$ alkyl; (33) oxo; (34) $C_{1-6}$ thioalkoxy; (35) thio-$C_{1-6}$ alkoxy-$C_{1-6}$ alkyl; (36) —(CH$_2$)$_r$CO$_2$R$^A$, where r is an integer of from zero to four, and R$^A$ is selected from the group consisting of (a) hydrogen, (b) $C_{1-6}$ alkyl, (c) $C_{4-18}$ aryl, and (d) $C_{1-6}$ alk-$C_{4-18}$ aryl; (37) —(CH$_2$)$_r$CONR$^B$R$^C$, where r is an integer of from zero to four and where each R$^B$ and R$^C$ is independently selected from the group consisting of (a) hydrogen, (b) $C_{1-6}$ alkyl, (c) $C_{4-18}$ aryl, and (d) $C_{1-6}$ alk-$C_{4-18}$ aryl; (38) —(CH$_2$)$_r$SO$_2$R$^D$, where r is an integer of from zero to four and where R$^D$ is selected from the group consisting of (a) $C_{1-6}$ alkyl, (b) $C_{4-18}$ aryl, and (c) $C_{1-6}$ alk-$C_{4-18}$ aryl; (39) —(CH$_2$)$_r$SO$_2$NR$^E$R$^F$, where r is an integer of from zero to four and where each of R$^E$ and R$^F$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; (40) —(CH$_2$)$_r$NR$^G$R$^H$, where r is an integer of from zero to four and where each of R$^G$ and R$^H$ is, independently, selected from the group consisting of (a) hydrogen, (b) an N-protecting group, (c) $C_{1-6}$ alkyl, (d) $C_{2-6}$ alkenyl, (e) $C_{2-6}$ alkynyl, (f) $C_{4-18}$ aryl, (g) $C_{1-6}$ alk-$C_{4-18}$ aryl, (h) $C_{3-8}$ cycloalkyl, and (i) $C_{1-6}$ alk-$C_{3-8}$ cycloalkyl, wherein in one embodiment no two groups are bound to the nitrogen atom through a carbonyl group or a sulfonyl group; (41) thiol; (42) perfluoroalkyl; (43) perfluoroalkoxy; (44) aryloxy; (45) cycloalkoxy; (46) cycloalkylalkoxy; and (47) arylalkoxy.

By "heterocyclyloxy" is meant a heterocyclyl group, as defined herein, attached to the parent molecular group through an oxygen atom.

By "hydroxyl" is meant —OH.

By "hydroxyalkyl" is meant an alkyl group, as defined herein, substituted by one to three hydroxyl groups, with the proviso that no more than one hydroxyl group may be attached to a single carbon atom of the alkyl group and is exemplified by hydroxymethyl, dihydroxypropyl, and the like.

By "hydroxyaryl" is meant an aryl group, as defined herein, substituted by one to four hydroxyl groups, with the proviso that no more than one hydroxyl group may be attached to a single carbon atom of the aryl group and is exemplified by hydroxyphenyl.

By "oxy" is meant —O—.

By "perfluoroalkyl" is meant an alkyl group, as defined herein, having each hydrogen atom substituted with a fluorine atom. Exemplary perfluoroalkyl groups include trifluoromethyl, pentafluoroethyl, etc.

By "spirocyclyl" is meant an alkylene diradical, both ends of which are bonded to the same carbon atom of the parent group to form a spirocyclyl group and also a heteroalkylene diradical, both ends of which are bonded to the same atom.

By "thio" is meant an —S— group.

By "thioalkaryl" is meant a thioalkoxy group, as defined herein, substituted with an aryl group, as defined herein.

By "thioalkheterocyclyl" is meant a thioalkoxy group, as defined herein, substituted with a heterocyclyl group, as defined herein.

By "thioalkoxy" is meant an alkyl group, as defined herein, attached to the parent molecular group through a sulfur atom. Exemplary unsubstituted thioalkoxy groups include $C_{1-6}$ thioalkoxy.

By "thioalkoxyalkyl" is meant an alkyl group, as defined herein, which is substituted with a thioalkoxy group, as defined herein. Exemplary unsubstituted thioalkoxyalkyl groups include between 2 to 12 carbons ($C_{2-12}$ thioalkoxyalkyl), as well as those having an alkyl group with 1 to 6 carbons and a thioalkoxy group with 1 to 6 carbons (i.e., $C_{1-6}$ thioalkoxy-$C_{1-6}$ alkyl).

By "protecting group" is meant any group intended to protect a reactive group against undesirable synthetic reactions. Commonly used protecting groups are disclosed in "Greene's Protective Groups in Organic Synthesis," John Wiley & Sons, New York, 2007 (4th ed., eds. P. G. M. Wuts and T. W. Greene), which is incorporated herein by reference. O-protecting groups include an optionally substituted alkyl group (e.g., forming an ether with reactive group O), such as methyl, methoxymethyl, methylthiomethyl, benzoyloxymethyl, t-butoxymethyl, etc.; an optionally substituted alkanoyl group (e.g., forming an ester with the reactive group O), such as formyl, acetyl, chloroacetyl, fluoroacetyl (e.g., perfluoroacetyl), methoxyacetyl, pivaloyl, t-butylacetyl, phenoxyacetyl, etc.; an optionally substituted aryloyl group (e.g., forming an ester with the reactive group O), such as —C(O)—Ar, including benzoyl; an optionally substituted alkylsulfonyl group (e.g., forming an alkylsulfonate with reactive group O), such as —SO$_2$—R$^{S1}$, where R$^{S1}$ is optionally substituted $C_{1-12}$ alkyl, such as mesyl or benzylsulfonyl; an optionally substituted arylsulfonyl group (e.g., forming an arylsulfonate with reactive group O), such as —SO$_2$—R$^{S4}$, where R$^{S4}$ is optionally substituted $C_{4-18}$ aryl, such as tosyl or phenylsulfonyl; an optionally substituted alkoxycarbonyl or aryloxycarbonyl group (e.g., forming a carbonate with reactive group O), such as —C(O)—OR$^{T1}$, where R$^{T1}$ is optionally substituted $C_{1-12}$ alkyl or optionally substituted $C_{4-18}$ aryl, such as methoxycarbonyl, methoxymethylcarbonyl, t-butyloxycarbonyl (Boc), or benzyloxycarbonyl (Cbz); or an optionally substituted silyl group (e.g., forming a silyl ether with reactive group O), such as —Si—(R$^{T2}$)$_3$, where each R$^{T2}$ is, independently, optionally substituted $C_{1-12}$ alkyl or optionally substituted $C_{4-18}$ aryl, such as trimethylsilyl, t-butyldimethylsilyl, or t-butyldiphenylsilyl. N-protecting groups include, e.g., formyl, acetyl, benzoyl, pivaloyl, t-butylacetyl, alanyl, phenylsulfonyl, benzyl, Boc, and Cbz. Such protecting groups can employ any useful agent to cleave the protecting group, thereby restoring the reactivity of the unprotected reactive group.

By "salt" is meant an ionic form of a compound or structure (e.g., any formulas, compounds, or compositions described herein), which includes a cation or anion compound to form an electrically neutral compound or structure. Salts (e.g., simple salts having binary compounds, double salts, triple salts, etc.) are well known in the art. For example, salts are described in Berge S M et al., "Pharmaceutical salts," J. Pharm. Sci. 1977 January; 66(1):1-19; International Union of Pure and Applied Chemistry, "Nomenclature of Inorganic Chemistry," Butterworth & Co. (Publishers) Ltd., London, England, 1971 (2nd ed.); and in "Handbook of Pharmaceutical Salts: Properties, Selection, and Use," Wiley-VCH, April 2011 (2nd rev. ed., eds. P. H. Stahl and C. G. Wermuth). The salts can be prepared in situ during the final isolation and purification of the compounds of the invention or separately by reacting the free base group with a suitable organic acid (thereby producing an anionic salt) or by reacting the acid group with a suitable metal or organic salt (thereby producing a cationic salt). Representative anionic salts include acetate, adipate, alginate, ascorbate, aspartate, benzenesulfonate, benzoate, bicarbonate, bisulfate, bitartrate, borate, bromide, butyrate, camphorate, camphorsulfonate, chloride, citrate, cyclopentanepropionate, digluconate, dihydrochloride, diphosphate, dodecyl sulfate, edetate, ethanesulfonate, fumarate, glucoheptonate, glucomate, glutamate, glycerophosphate, hemisulfate, heptonate, hexanoate, hydrobromide, hydrochloride, hydroiodide, hydroxyethanesulfonate, hydroxynaphthoate, iodide, lactate, lactobionate, laurate, lauryl sulfate, malate, maleate, malonate, mandelate, mesylate, methanesulfonate, methylbromide, methylnitrate, methylsulfate, mucate, 2-naphthalenesulfonate, nicotinate, nitrate, oleate, oxalate, palmitate, pamoate, pectinate, persulfate, 3-phenylpropionate, phosphate, picrate, pivalate, polygalacturonate, propionate, salicylate, stearate, subacetate, succinate, sulfate, tannate, tartrate, theophyllinate, thiocyanate, triethiodide, toluenesulfonate, undecanoate, valerate salts, and the like. Representative cationic salts include metal salts, such as alkali or alkaline earth salts, e.g., barium, calcium (e.g., calcium edetate), lithium, magnesium, potassium, sodium, and the like; other metal salts, such as aluminum, bismuth, iron, and zinc; as well as nontoxic ammonium, quaternary ammonium, and amine cations, including, but not limited to ammonium, tetramethylammonium, tetraethylammonium, methylamine, dimethylamine, trimethylamine, triethylamine, ethylamine, pyridinium, and the like. Other cationic salts include organic salts, such as chloroprocaine, choline, dibenzylethylenediamine, diethanolamine, ethylenediamine, methylglucamine, and procaine.

By "attaching," "attachment," or related word forms is meant any covalent or non-covalent bonding interaction between two components. Non-covalent bonding interactions include, without limitation, hydrogen bonding, ionic interactions, halogen bonding, electrostatic interactions, π bond interactions, hydrophobic interactions, inclusion complexes, clathration, van der Waals interactions, and combinations thereof.

Other features and advantages of the invention will be apparent from the following description and the claims.

DETAILED DESCRIPTION OF THE INVENTION

Figure 1A:
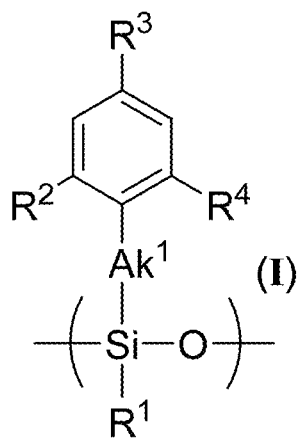
FIG. 1A-1E shows chemical structures of exemplary polymers. Provided are (A) polymers having a structure of formula (I) or a salt thereof; (B) DKAP; (C) surface-bound polymers having a structure of formula (II) or a salt thereof; (D) polymers (e.g., copolymers) having a structure of formula (IIIa) or a salt thereof; and (E) polymers (e.g., copolymers) having a structure of formula (IIIb) or a salt thereof.

The present invention relates, in part, to a polymer for use as a coating within a column (e.g., a gas chromatography column). Exemplary polymers are described herein and in FIG. 1A-1E and FIG. 8A-8G.

In one non-limiting instance, the polymer includes a structure having formula (I):

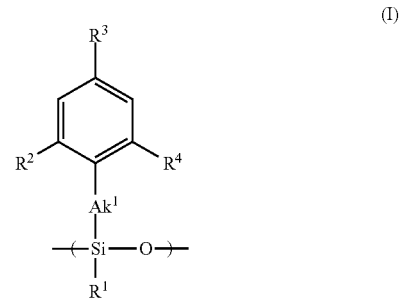

or a salt thereof, wherein:

$R^1$ is H, optionally substituted alkyl (e.g., $C_{1-6}$ alkyl), optionally substituted alkoxy (e.g., $C_{1-6}$ alkoxy), optionally substituted alkoxyalkyl (e.g., $C_{1-6}$ alkoxy-$C_{1-6}$ alkyl), optionally substituted aryl (e.g., $C_{4-18}$ aryl), optionally substituted alkaryl (e.g., $C_{1-6}$ alk-$C_{4-18}$ aryl), optionally substituted alkenyl (e.g., $C_{2-7}$ alkenyl), halo, or optionally substituted haloalkyl (e.g., halo-$C_{1-6}$ alkyl);

$Ak^1$ is a bond, optionally substituted alkylene (e.g., $C_{1-6}$ alkylene), oxy, optionally substituted arylene (e.g., $C_{4-24}$ arylene), or optionally substituted heteroalkylene (e.g., $C_{1-6}$ heteroalkylene); and each of $R^2$, $R^3$, and $R^4$ is, independently, H, optionally substituted alkyl (e.g., $C_{1-6}$ alkyl), optionally substituted alkoxy (e.g., $C_{1-6}$ alkoxy), optionally substituted alkoxyalkyl (e.g., $C_{1-6}$ alkoxy-$C_{1-6}$ alkyl), optionally substituted aryl (e.g., $C_{4-18}$ aryl), hydroxyl, optionally substituted hydroxyalkyl (e.g., hydroxy-$C_{1-6}$ alkyl), optionally substituted hydroxyaryl (e.g., hydroxy-$C_{4-18}$ aryl), halo, or optionally substituted haloalkyl (e.g., halo-$C_{1-6}$ alkyl), wherein at least one of $R^2$, $R^3$, and $R^4$ comprises a hydroxyl.

An exemplary polymer can also include two functionalized aryl groups. For instance, in some embodiments, the polymer includes a structure having formula (VI):

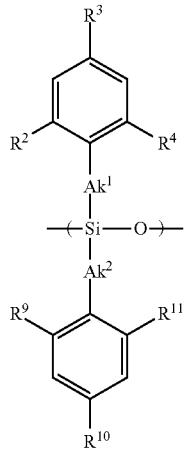

(VI)

or a salt thereof, wherein:

each $Ak^1$ and $Ak^2$ is, independently, a bond, optionally substituted alkylene (e.g., $C_{1-6}$ alkylene), optionally substituted arylene (e.g., $C_{4-24}$ arylene), oxy, or optionally substituted heteroalkylene (e.g., $C_{1-6}$ heteroalkylene); and each of $R^2$, $R^3$, $R^4$, $R^9$, $R^{10}$, and $R^{11}$ is, independently, H, optionally substituted alkyl (e.g., $C_{1-6}$ alkyl), optionally substituted alkoxy (e.g., $C_{1-6}$ alkoxy), optionally substituted alkoxyalkyl (e.g., $C_{1-6}$ alkoxy-$C_{1-6}$ alkyl), optionally substituted aryl (e.g., $C_{4-18}$ aryl), hydroxyl, optionally substituted hydroxyalkyl (e.g., hydroxy-$C_{1-6}$ alkyl), optionally substituted hydroxyaryl (e.g., hydroxy-$C_{4-18}$ aryl), halo, or optionally substituted haloalkyl (e.g., halo-$C_{1-6}$ alkyl), wherein at least one of $R^2$, $R^3$, $R^4$, $R^9$, $R^{10}$, and $R^{11}$ comprises a hydroxyl.

In other embodiments, the polymer includes a structure having formula (VII):

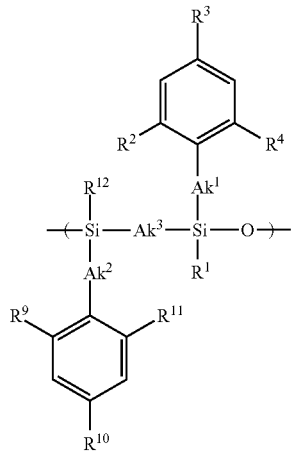

(VII)

a salt thereof, wherein:

each of $R^1$ and $R^{12}$ is, independently, H, optionally substituted alkyl (e.g., $C_{1-6}$ alkyl), optionally substituted alkoxy (e.g., $C_{1-6}$ alkoxy), optionally substituted alkoxyalkyl (e.g., $C_{1-6}$ alkoxy-$C_{1-6}$ alkyl), optionally substituted aryl (e.g., $C_{4-18}$ aryl), optionally substituted alkaryl (e.g., $C_{1-6}$ alk-$C_{4-18}$ aryl), optionally substituted alkenyl (e.g., $C_{2-7}$ alkenyl), halo, or optionally substituted haloalkyl (e.g., halo-$C_{1-6}$ alkyl);

each $Ak^1$, $Ak^2$, and $Ak^3$ is, independently, a bond, optionally substituted alkylene (e.g., $C_{1-6}$ alkylene), optionally substituted arylene (e.g., $C_{4-24}$ arylene), oxy, or optionally substituted heteroalkylene (e.g., $C_{1-6}$ heteroalkylene); and each of $R^2$, $R^3$, $R^4$, $R^9$, $R^{10}$, and $R^{11}$ is, independently, H, optionally substituted alkyl (e.g., $C_{1-6}$ alkyl), optionally substituted alkoxy (e.g., $C_{1-6}$ alkoxy), optionally substituted alkoxyalkyl (e.g., $C_{1-6}$ alkoxy-$C_{1-6}$ alkyl), optionally substituted aryl (e.g., $C_{4-18}$ aryl), hydroxyl, optionally substituted hydroxyalkyl (e.g., hydroxy-$C_{1-6}$ alkyl), optionally substituted hydroxyaryl (e.g., hydroxy-$C_{4-18}$ aryl), halo, or optionally substituted haloalkyl (e.g., halo-$C_{1-6}$ alkyl), wherein at least one of $R^2$, $R^3$, $R^4$, $R^9$, $R^{10}$, and $R^{11}$ comprises a hydroxyl.

The polymer can include a plurality of monomers (e.g., in which the monomer includes a structure having formula (I) or (VI) or (VII) or a salt thereof, as described herein), in which each monomer can be the same or different. Furthermore, the polymer can be a copolymer having a first monomer (e.g., in which the first monomer includes a structure having formula (I) or (VI) or (VII) or a salt thereof, as described herein) and a second monomer. The second monomer can be any useful chemical moiety, such as a siloxane, a polysiloxane, a silicone, a polysilicone, a silanol, —Si($R^{S1}$, $R^{S2}$)O—, —[Si($R^{S1}$, $R^{S2}$)O]$_n$—, —OSi($R^{S1}$, $R^{S2}$)—, —[OSi($R^{S1}$, $R^{S2}$)]$_n$—, -AkSi($R^{S1}$, $R^{S2}$)O—, -[AkSi($R^{S1}$, $R^{S2}$)O]$_n$—, —OSi($R^{S1}$, $R^{S2}$)Ak-, or —[OSi($R^{S1}$, $R^{S2}$)Ak]$_n$-, in which each of $R^{S1}$ and $R^{S2}$ is, independently, is any substituent disclosed herein for $R^1$, $R^2$, $R^3$, $R^4$, $R^5$, and $R^6$, such as H, optionally substituted alkyl, optionally substituted alkenyl, optionally substituted aryl, optionally substituted alkaryl, optionally substituted alkoxy, amino, optionally substituted aminoalkyl, etc.; in which each Ak is, independently, a bond, optionally substituted alkylene, optionally substituted arylene, or optionally substituted heteroalkylene; and in which n is any useful integer (e.g., of from about 1 to 50).

In some embodiments, the polymer is a copolymer including a structure having formula (IIIa) or (IIIb):

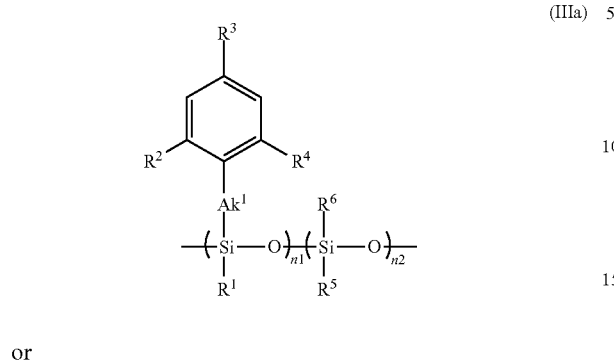
(IIIa)

or

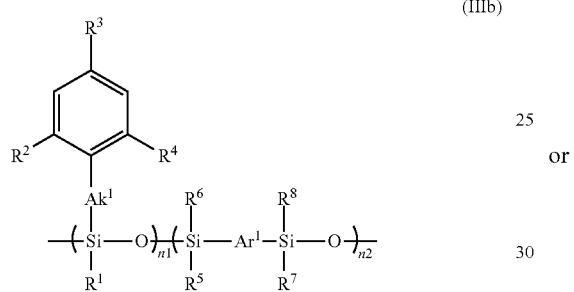
(IIIb)

or a salt thereof, wherein:

each of $R^1$, $R^5$, $R^6$, $R^7$, and $R^8$ is, independently, H, optionally substituted alkyl (e.g., $C_{1-6}$ alkyl), optionally substituted alkoxy (e.g., $C_{1-6}$ alkoxy), optionally substituted alkoxyalkyl (e.g., $C_{1-6}$ alkoxy-$C_{1-6}$ alkyl), optionally substituted aryl (e.g., $C_{4-18}$ aryl), optionally substituted alkaryl e.g., $C_{1-6}$ alk-$C_{4-18}$ aryl), optionally substituted alkenyl (e.g., $C_{2-7}$ alkenyl), halo, or optionally substituted haloalkyl (e.g., halo-$C_{1-6}$ alkyl);

$Ak^1$ is a bond, optionally substituted alkylene (e.g., $C_{1-6}$ alkylene), optionally substituted arylene (e.g., $C_{4-24}$ arylene), oxy, or optionally substituted heteroalkylene (e.g., $C_{1-6}$ heteroalkylene);

$Ar^1$ is optionally substituted alkylene (e.g., $C_{1-6}$ alkylene), optionally substituted arylene (e.g., $C_{4-24}$ arylene), oxy, or optionally substituted heteroalkylene (e.g., $C_{1-6}$ heteroalkylene);

each of $R^2$, $R^3$, and $R^4$ is, independently, H, optionally substituted alkyl (e.g., $C_{1-6}$ alkyl), optionally substituted alkoxy (e.g., $C_{1-6}$ alkoxy), optionally substituted alkoxyalkyl (e.g., $C_{1-6}$ alkoxy-$C_{1-6}$ alkyl), optionally substituted aryl (e.g., $C_{4-18}$ aryl), hydroxyl, optionally substituted hydroxyalkyl (e.g., hydroxy-$C_{1-6}$ alkyl), optionally substituted hydroxyaryl (e.g., hydroxy-$C_{4-18}$ aryl), halo, or optionally substituted haloalkyl (e.g., halo-$C_{1-6}$ alkyl), wherein at least one of $R^2$, $R^3$, and $R^4$ comprises a hydroxyl; and each of n1 and n2 is, independently, a number of from about 0.5 to about 50 (e.g., from about 0.5 to 10, 0.5 to 20, 0.5 to 25, 0.5 to 30, 0.5 to 40, 1 to 10, 1 to 20, 1 to 25, 1 to 30, 1 to 40, 1 to 50, 2 to 10, 2 to 20, 2 to 25, 2 to 30, 2 to 40, 2 to 50, 3 to 10, 3 to 20, 3 to 25, 3 to 30, 3 to 40, 3 to 50, 4 to 10, 4 to 20, 4 to 25, 4 to 30, 4 to 40, 4 to 50, 5 to 10, 5 to 20, 5 to 25, 5 to 30, 5 to 40, or 5 to 50).

Copolymers can also include a plurality of functionalized aryl groups on a monomer. In some embodiments, the polymer is a copolymer including a structure having formula (VIIIa) or (VIIIb):

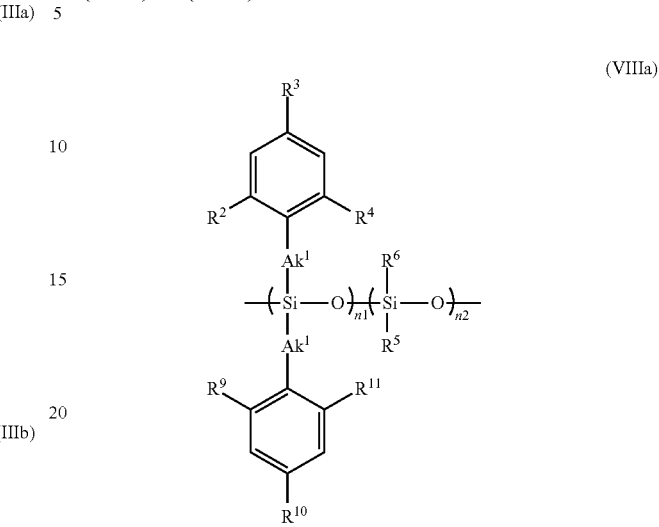
(VIIIa)

or

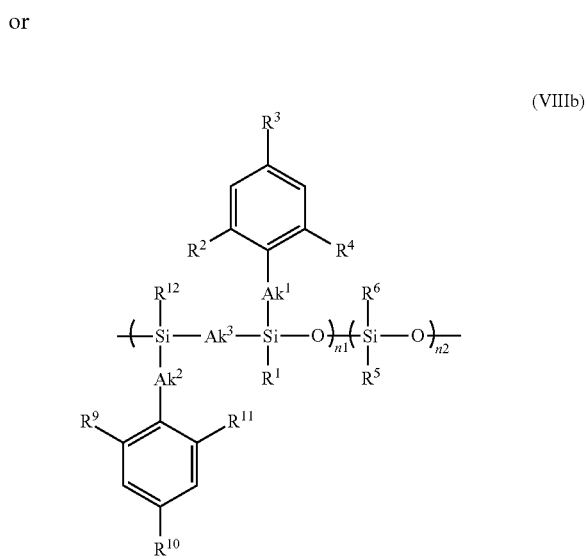
(VIIIb)

or a salt thereof, wherein:

each of $R^1$, $R^5$, $R^6$, and $R^{12}$ is, independently, H, optionally substituted alkyl (e.g., $C_{1-6}$ alkyl), optionally substituted alkoxy (e.g., $C_{1-6}$ alkoxy), optionally substituted alkoxyalkyl (e.g., $C_{1-6}$ alkoxy-$C_{1-6}$ alkyl), optionally substituted aryl (e.g., $C_{4-18}$ aryl), optionally substituted alkaryl e.g., $C_{1-6}$ alk-$C_{4-18}$ aryl), optionally substituted alkenyl (e.g., $C_{2-7}$ alkenyl), halo, or optionally substituted haloalkyl (e.g., halo-$C_{1-6}$ alkyl);

each $Ak^1$, $Ak^2$, and $Ak^3$ is, independently, a bond, optionally substituted alkylene (e.g., $C_{1-6}$ alkylene), optionally substituted arylene (e.g., $C_{4-24}$ arylene), oxy, or optionally substituted heteroalkylene (e.g., $C_{1-6}$ heteroalkylene);

each of $R^2$, $R^3$, $R^4$, $R^9$, $R^{10}$, and $R^{11}$ is, independently, h, optionally substituted alkyl (e.g., $C_{1-6}$ alkyl), optionally substituted alkoxy (e.g., $C_{1-6}$ alkoxy), optionally substituted alkoxyalkyl (e.g., $C_{1-6}$ alkoxy-$C_{1-6}$ alkyl), optionally substituted aryl (e.g., $C_{4-18}$ aryl), hydroxyl, optionally substituted hydroxyalkyl (e.g., hydroxy-$C_{1-6}$ alkyl), optionally substituted hydroxyaryl (e.g., hydroxy-$C_{4-18}$ aryl), halo, or optionally substituted haloalkyl (e.g., halo-$C_{1-6}$ alkyl), wherein at least one of $R^2$, $R^3$, $R^4$, $R^9$, $R^{10}$, and $R^{11}$ comprises a hydroxyl; and each of n1 and n2 is, independently, a number of from about 0.5 to about 50 (e.g., from about 0.5 to 10, 0.5 to 20, 0.5 to 25, 0.5 to 30, 0.5 to 40, 1 to 10, 1 to 20, 1 to 25, 1 to 30, 1 to 40, 1 to 50, 2 to 10, 2 to 20, 2 to 25, 2 to 30, 2 to 40, 2 to 50, 3 to 10, 3 to 20, 3 to 25, 3 to 30, 3 to 40, 3 to 50, 4 to 10, 4 to 20, 4 to 25, 4 to 30, 4 to 40, 4 to 50, 5 to 10, 5 to 20, 5 to 25, 5 to 30, 5 to 40, or 5 to 50).

In some embodiments, the polymer is a copolymer including a structure having formula (IXa) or (IXb):

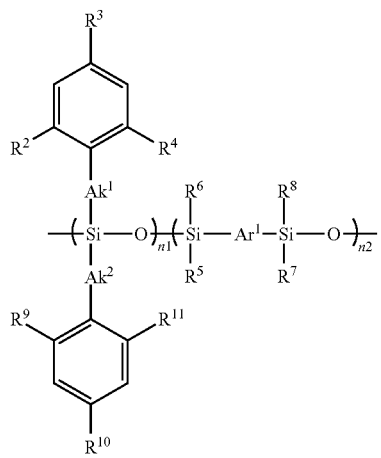

(IXa)

or

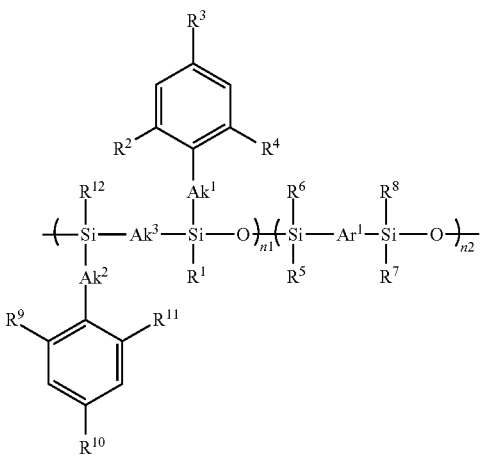

(IXb)

or a salt thereof, wherein:

each of $R^1$, $R^5$, $R^6$, $R^7$, $R^8$, and $R^{12}$ is, independently H, optionally substituted alkyl (e.g., $C_{1-6}$ alkyl), optionally substituted alkoxy (e.g., $C_{1-6}$ alkoxy), optionally substituted alkoxyalkyl (e.g., $C_{1-6}$ alkoxy-$C_{1-6}$ alkyl), optionally substituted aryl (e.g., $C_{4-18}$ aryl), optionally substituted alkaryl e.g., $C_{1-6}$ alk-$C_{4-18}$ aryl), optionally substituted alkenyl (e.g., $C_{2-7}$ alkenyl), halo, or optionally substituted haloalkyl (e.g., halo-$C_{1-6}$ alkyl);

each $Ak^1$, $Ak^2$, and $Ak^3$ is, independently, a bond, optionally substituted alkylene (e.g., $C_{1-6}$ alkylene), optionally substituted arylene (e.g., $C_{4-24}$ arylene), oxy, or optionally substituted heteroalkylene (e.g., $C_{1-6}$ heteroalkylene);

$Ar^1$ is optionally substituted alkylene (e.g., $C_{1-6}$ alkylene), optionally substituted arylene (e.g., $C_{4-24}$ arylene), oxy, or optionally substituted heteroalkylene (e.g., $C_{1-6}$ heteroalkylene);

each of $R^2$, $R^3$, $R^4$, $R^9$, $R^{10}$, and $R^{11}$ is, independently, H, optionally substituted alkyl (e.g., $C_{1-6}$ alkyl), optionally substituted alkoxy (e.g., $C_{1-6}$ alkoxy), optionally substituted alkoxyalkyl (e.g., $C_{1-6}$ alkoxy-$C_{1-6}$ alkyl), optionally substituted aryl (e.g., $C_{4-18}$ aryl), hydroxyl, optionally substituted hydroxyalkyl (e.g., hydroxy-$C_{1-6}$ alkyl), optionally substituted hydroxyaryl (e.g., hydroxy-$C_{4-18}$ aryl), halo, or optionally substituted haloalkyl (e.g., halo-$C_{1-6}$ alkyl), wherein at least one of $R^2$, $R^3$, $R^4$, $R^9$, $R^{10}$, and $R^{11}$ comprises a hydroxyl; and each of n1 and n2 is, independently, a number of from about 0.5 to about 50 (e.g., from about 0.5 to 10, 0.5 to 20, 0.5 to 25, 0.5 to 30, 0.5 to 40, 1 to 10, 1 to 20, 1 to 25, 1 to 30, 1 to 40, 1 to 50, 2 to 10, 2 to 20, 2 to 25, 2 to 30, 2 to 40, 2 to 50, 3 to 10, 3 to 20, 3 to 25, 3 to 30, 3 to 40, 3 to 50, 4 to 10, 4 to 20, 4 to 25, 4 to 30, 4 to 40, 4 to 50, 5 to 10, 5 to 20, 5 to 25, 5 to 30, 5 to 40, or 5 to 50).

In some embodiments, the ratio of n1 to n2 is of from about 1:5 to about 5:1 (e.g., 1:5 to 2:1, 1:5 to 4:1, 1:2 to 2:1, 1:1 to 5:1, 1:1 to 2:1, etc.).

The polymer can also include a chemical moiety functionalized on a surface. In some embodiments, the polymer includes a structure having formula (II):

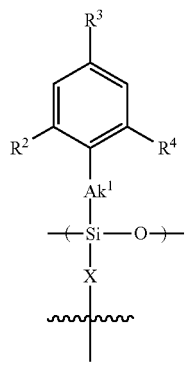

(II)

or a salt thereof, wherein:

each of $Ak^1$ and X is, independently, a bond, optionally substituted alkylene (e.g., $C_{1-6}$ alkylene), oxy, or optionally substituted heteroalkylene (e.g., $C_{1-6}$ alkylene); and each of $R^2$, $R^3$, and $R^4$ is, independently, H, optionally substituted alkyl (e.g., $C_{1-6}$ alkyl), optionally substituted alkoxy (e.g., $C_{1-6}$ alkoxy), optionally substituted alkoxyalkyl (e.g., $C_{1-6}$ alkoxy-$C_{1-6}$ alkyl), optionally substituted aryl (e.g., $C_{4-18}$ aryl), hydroxyl, optionally substituted hydroxyalkyl (e.g., hydroxy-$C_{1-6}$ alkyl), optionally substituted hydroxyaryl (e.g., hydroxy-$C_{4-18}$ aryl), halo, or optionally substituted haloalkyl (e.g., halo-$C_{1-6}$ alkyl), wherein at least one of $R^2$, $R^3$, and $R^4$ comprises a hydroxyl.

In particular embodiments, X is a siloxane, a polysiloxane, a silicone, a polysilicone, a silanol, —Si($R^{S1}$, $R^{S2}$)O—, —[Si($R^{S1}$, $R^{S2}$)O]$_n$—, —OSi($R^{S1}$, $R^{S2}$)—, —[OSi($R^{S1}$, $R^{S2}$)]$_n$—, -AkSi($R^{S1}$, $R^{S2}$)O—, -[AkSi($R^{S1}$, $R^{S2}$)O]$_n$—, —OSi($R^{S1}$, $R^{S2}$)Ak-, or —[OSi($R^{S1}$, $R^{S2}$)Ak]$_n$-, in which each of $R^{S1}$ and $R^{S2}$ is, independently, is any substituent disclosed herein for $R^1$, $R^2$, $R^3$, $R^4$, $R^5$, and $R^6$, such as H, optionally substituted alkyl (e.g., $C_{1-6}$ alkyl), optionally substituted alkenyl (e.g., $C_{2-7}$ alkenyl), optionally substituted aryl (e.g., $C_{4-18}$ aryl), optionally substituted alkaryl (e.g., $C_{1-6}$ alk-$C_{4-18}$ aryl), optionally substituted alkoxy (e.g., $C_{1-6}$ alkoxy), amino, optionally substituted aminoalkyl (e.g., amino-$C_{1-6}$ alkyl), etc.; in which each Ak is, independently, a bond, optionally substituted alkylene (e.g., $C_{1-6}$ alkylene), optionally substituted arylene (e.g., $C_{4-24}$ arylene), or optionally substituted heteroalkylene (e.g., $C_{1-6}$ heteroalkylene); and in which n is any useful integer (e.g., of from about 1 to 50).

In some embodiments (e.g., for formula (I), (II), (IIIa), (IIIb), (VI), (VII), (VIIIa), (VIIIb), (IXa), or (IXb)), $R^4$ is hydroxyl. In other embodiments, $R^4$ and/or $R^{11}$ is hydroxyalkyl. In other embodiments, $R^4$ and/or $R^{11}$ is hydroxyaryl.

In some embodiments (e.g., for formula (I), (II), (IIIa), (IIIb), (VI), (VII), (VIIIa), (VIIIb), (IXa), or (IXb)), each of $R^2$ and $R^3$ and $R^9$ and $R^{10}$ is, independently, optionally substituted haloalkyl. In further embodiments, the optionally substituted haloalkyl is perfluoroalkyl (e.g., perfluoro-$C_{1-6}$ alkyl).

In other embodiments (e.g., for formula (I), (II), (IIIa), (IIIb), (VI), (VII), (VIIIa), (VIIIb), (IXa), or (IXb)), each of $R^2$, $R^3$, $R^4$, $R^9$, $R^{10}$, and $R^{11}$ is, independently, hydroxyl, optionally substituted hydroxyalkyl, optionally substituted hydroxyaryl, halo, or optionally substituted haloalkyl (e.g., wherein at least one of $R^2$, $R^3$, $R^4$, $R^9$, $R^{10}$, and $R^{11}$ comprises a hydroxyl).

In some embodiments, the polymer is or includes DKAP (FIG. 1B), in which n is any useful number (e.g., an integer, such as of from about 1 to about 100, including 1 to 10, 1 to 25, 1 to 50, 2 to 10, 2 to 25, 2 to 50, 2 to 100, 5 to 25, 5 to 50, 5 to 100, 10 to 25, 10 to 50, or 10 to 100).

In some embodiments, the polymer is or includes Hot DKAP (FIG. 8C), in which n is any useful number (e.g., an integer, such as of from about 1 to about 100, including 1 to 10, 1 to 25, 1 to 50, 2 to 10, 2 to 25, 2 to 50, 2 to 100, 5 to 25, 5 to 50, 5 to 100, 10 to 25, 10 to 50, or 10 to 100) and m is, independently, any useful number (e.g., an integer, such as of from about 1 to about 100, including 1 to 10, 1 to 25, 1 to 50, 2 to 10, 2 to 25, 2 to 50, 2 to 100, 5 to 25, 5 to 50, 5 to 100, 10 to 25, 10 to 50, or 10 to 100).

Silanization Agents

One or more silanization agents can be employed on a surface of a column, prior to exposure to a polymer compound and a thermally activated initiator. Non-limiting silanization agents include, e.g., vinyltrimethoxysilane (VTMS), triethoxyvinylsilane, dimethoxymethylvinylsilane, 3-trimethoxysilylpropyl methacrylate (TMSPM), tetramethoxysilane (TEOS), methyltrimethoxysilane, tetraethyl orthosilicate, dimethylvinylsilane, etc. Yet additional silanization agents include, e.g., a siloxane, a polysiloxane, a silicone, a polysilicone, a silanol, $SiR^{S1}R^{S2}R^{S3}R^{S4}$, or $R^{S1}R^{S2}R^{S3}Si$-Ak-$SiR^{S4}R^{S5}R^{S6}$, in which each of $R^{S1}$, $R^{S2}$, $R^{S3}$, $R^{S4}$, $R^{S5}$, and $R^{S6}$, is any independently, is any substituent disclosed herein for $R^1$, $R^2$, $R^3$, $R^4$, $R^5$, and $R^6$, such as H, optionally substituted alkyl (e.g., $C_{1-6}$ alkyl), optionally substituted alkenyl (e.g., $C_{2-7}$ alkenyl), optionally substituted aryl (e.g., $C_{4-18}$ aryl), optionally substituted alkaryl (e.g., $C_{1-6}$ alk-$C_{4-18}$ aryl), optionally substituted alkoxy (e.g., $C_{1-6}$ alkoxy), optionally substituted aryloxy (e.g., $C_{4-18}$ aryloxy), optionally substituted arylalkoxy (e.g., $C_{4-18}$ aryl-$C_{1-6}$ alkoxy), amino, optionally substituted aminoalkyl (e.g., amino-$C_{1-6}$ alkyl), halo, optionally substituted haloalkyl (e.g., halo-$C_{1-6}$ alkyl); and in which each Ak is, independently, a bond, optionally substituted alkylene (e.g., $C_{1-6}$ alkylene), optionally substituted arylene (e.g., $C_{4-24}$ arylene), or optionally substituted heteroalkylene (e.g., $C_{1-6}$ heteroalkylene).

Thermally Activated Initiators

Any useful thermally activated initiator can be employed. In some instances, exposure of the initiator above a set temperature (e.g., a 10 hour half life temperature) provides a polymer for use as a stationary phase within a column (e.g., a gas chromatography column). In some embodiments, the initiator is one provided in Sheppard C S et al., "The selection and use of free radical initiators," *Polymer Eng. Sci.* 1979; 19:597-606, which is incorporated herein by reference in its entirety.

For some of the initiators, 10 hour half life temperatures and the measured solvent are provided parenthetically. In some embodiments, the thermal initiation temperature is the 10 hour half life temperature. Non-limiting thermally activated initiators include azo-based initiators, including 2,2'-azobisisobutyronitrile (AIBN, 65° C. (toluene)), VAm-110 (2,2'-azobis(N-butyl-2-methylpropionamide), 110° C. (ethylbenzene)), VAZO™ 88 (1,1'-azobis(cyanocyclohexane)), V-40 (1,1'-azobis(cyclohexane-1-carbonitrile), 88° C. (toluene)), VA-086 (2,2'-azobis[2-methyl-N-(2-hydroxyethyl) propionamide], 86° C. (water)), V-501 (4,4'-azobis(4-cyanovaleric acid), 69° C. (water, as Na salt)), V-59 or VAZO™ 67 or AIVN (2,2'-azobis(2-methylbutyronitrile), 67° C. (toluene)), V-601 (dimethyl 2,2'-azobis(2-methylpropionate), 66° C. (toluene)), VA-061 (2,2'-azobis[2-(2-imidazolin-2-yl)propane], 61° C. (methanol)), VA-057 (2,2'-azobis[N-(2-carboxyethyl)-2-methylpropionamidine] tetrahydrate, 57° C. (water)), V-50 or AIBA (2,2'-azobis(2-methylpropionamidine)dihydrochloride, 56° C. (water)), V-65 or VAZO™ 52 or ABVN (2,2'-azobis(2,4-dimethylvaleronitrile), 51° C. (toluene)), VA-044 or AIBI (2,2'-azobis [2-(2-imidazolin-2-yl)propane]dihydrochloride, 44° C. (water)), V-70 (2,2'-azobis(4-methoxy-2,4-dimethylvaleronitrile), 30° C. (toluene)), VPS-1001 (4,4-azobis(4-cyanovaleric acid), polymer with alpha, omega-bis (3-aminopropyl)polydimethylsiloxane, 65-70° C. (toluene)), VPE-0201 (4,4'-azobis(4-cyanopentanoic acid)•polyethyleneglycol polymer, 65-70° C. (toluene)), 2,2'-azobis(2-methylpropionitrile), etc.

Yet other non-limiting thermally activated initiators include peroxide-based initiators, such as benzoyl peroxide (BPO), dicumyl peroxide, di-tert-butyl peroxide, cumene hydroperoxide, cyclohexanone peroxide, lauroyl peroxide, tert-butyl hydroperoxide (TBHP), tert-butyl peroxide (TBP), tert-butyl peroxybenzoate, peracetic acid, 2,4-pentanedione peroxide, tert-butylperoxy isopropyl carbonate, tert-butyl peracetate, 2,2-bis(tert-butylperoxy)butane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, etc.

Other non-limiting thermally activated initiators include cationic initiators, such as dicyandiamide, cyclohexyl tosylate, diphenyl(methyl)sulfonium tetrafluoroborate, benzyl (4-hydroxyphenyl)-methylsulfonium hexafluoroantimonate, (4-hydroxyphenyl)methyl-(2-methylbenzyl)sulfonium hexafluoroantimonate, etc.

Yet other thermally activated initiators include a structure having formula (X):

(X)

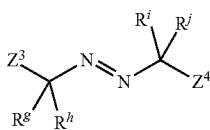

or a salt thereof, wherein:

each of $R^g$, $R^h$, $R^i$, and $R^j$ is, independently, H, optionally substituted alkyl (e.g., $C_{1-6}$ alkyl), optionally substituted cycloalkyl (e.g., $C_{3-8}$ cycloalkyl), optionally substituted alkoxyalkyl (e.g., $C_{1-6}$ alkoxy-$C_{1-6}$ alkyl), or optionally substituted heterocyclyl, wherein $R^g$ and $R^h$, taken together, or $R^i$ and $R^j$, taken together, for optionally substituted spirocyclyl (e.g., $C_{3-8}$ spirocyclyl); and each of $Z^3$ and $Z^4$ is, independently, cyano, optionally substituted alkoxycarbonyl (e.g., $C_{1-6}$ alkoxycarbonyl), optionally substituted amido, optionally substituted amidino, or optionally substituted heterocyclyl.

Organophosphorous Agents

The polymers herein, as well as films or other forms of such polymers, can be used to detect any useful agent. In one embodiment, the agent is an organophosphorous agent (e.g., including a structure having formula (IV) or (V) or a salt thereof). Further exemplary organophosphorous agents are described in FIG. 2A. Other organophosphorous agents include nerve agents, insecticides, Yet other organophosphorous agents include dimethyl methylphosphonate (DMMP), methylphosphonic acid (MPA), di-isopropyl methylphosphonate (DIMP), diethyl cyanophosphonate (DECP), diethyl chlorophosphonate (DCP), diethyl methylphosphonate (DEMP), diethyl ethylphosphonate (DEEP), diisopropyl fluorophosphonate (DIFP), diethyl isopropylphosphonate (DEIP), dibutyl butylphosphonate (DBBP), dimethyl 4-nitrophenylphosphate (DMNP), pinacolyl methylphosphonate (PMP), trimethyl phosphate (TMP), triethyl phosphate (TEP), tri-n-propyl phosphate (TnPP), tri-iso-propyl phosphate (TiPP), tri-n-butyl phosphate (TBP), G agents (e.g., tabun (GA), sarin (GB), chlorosarin (GC), soman (GD), ethylsarin (GE), cyclosarin (GF), GH, GJ, GK, GL, GM, GN, GO, GP, GQ, GR, GS, GT, GU, GV, and fluorotabun), V agents (e.g., VE, amiton/tetram (VG), VM, VP, VR, VS, VX, EA-3148, and EA-2192), GV agents (e.g., GP, EA 5488, GV1, GV2, GV3, GV4, GV5), demeton-S, paraoxon, echothiophate, parathion, Novichok agents, etc.

In some embodiments, the organophosphorous agent includes a structure having formula (IV) or (V):

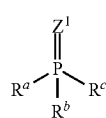

(IV)

or

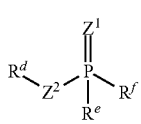

(V)

or a salt thereof, wherein:

$R^a$ is H, hydroxyl, optionally substituted alkoxy (e.g., $C_{1-6}$ alkoxy), optionally substituted cycloalkoxy (e.g., $C_{3-8}$ cycloalkoxy), optionally substituted aminoalkoxy (e.g., amino-$C_{1-6}$ alkoxy), optionally substituted thioalkoxy (e.g., thio-$C_{1-6}$ alkoxy), or optionally substituted aminothioalkoxy (e.g., amino-$C_{1-6}$ thioalkoxy);

each of $R^b$ and $R^e$ is, independently, optionally substituted alkyl (e.g., $C_{1-6}$ alkyl), optionally substituted alkoxy (e.g., $C_{1-6}$ alkoxy), hydroxyl, amino, cyano, or halo;

$R^c$ is optionally substituted alkyl (e.g., $C_{1-6}$ alkyl), optionally substituted alkoxy (e.g., $C_{1-6}$ alkoxy), amino, optionally substituted aminoalkyl (e.g., amino-$C_{1-6}$ alkyl), optionally substituted aminoalkoxy (e.g., amino-$C_{1-6}$ alkoxy), optionally substituted thioalkoxy (e.g., $C_{1-6}$ thioalkoxy), or optionally substituted aminothioalkoxy (e.g., amino-$C_{1-6}$ thioalkoxy);

each of $Z^1$ and $Z^2$ is, independently, O or S;

$R^d$ is H, optionally substituted alkyl (e.g., $C_{1-6}$ alkyl), optionally substituted cycloalkyl (e.g., $C_{3-8}$ cycloalkyl), optionally substituted aminoalkyl (e.g., amino-$C_{1-6}$ alkyl), optionally substituted heterocyclyl, optionally substituted alkoxyalkyl (e.g., $C_{1-6}$ alkoxy-$C_{1-6}$ alkyl), optionally substituted thioalkoxyalkyl (e.g., $C_{1-6}$ thioalkoxy-$C_{1-6}$ alkyl), optionally substituted aryl (e.g., $C_{4-18}$ aryl), or optionally substituted alkaryl (e.g., $C_{1-6}$ alk-$C_{4-18}$ aryl); and $R^f$ is optionally substituted alkyl (e.g., $C_{1-6}$ alkyl), optionally substituted cycloalkyl (e.g., $C_{3-8}$ cycloalkyl), optionally substituted alkoxy (e.g., $C_{1-6}$ alkoxy), optionally substituted cycloalkoxy (e.g., $C_{3-8}$ cycloalkoxy), amino, optionally substituted aminoalkyl (e.g., amino-$C_{1-6}$ alkyl), optionally substituted aminoalkoxy (e.g., amino-$C_{1-6}$ alkoxy), optionally substituted thioalkoxy (e.g., $C_{1-6}$ thioalkoxy), optionally substituted thioalkoxyalkyl (e.g., $C_{1-6}$ thioalkoxy-$C_{1-6}$ alkyl), optionally substituted aminothioalkoxy (e.g., amino-$C_{1-6}$ thioalkoxy), optionally substituted heterocyclyl, optionally substituted heterocyclyloxy, optionally substituted alkoxyalkyl (e.g., $C_{1-6}$ alkoxy-$C_{1-6}$ alkyl), optionally substituted thioalkoxyalkyl (e.g., $C_{1-6}$ thioalkoxy-$C_{1-6}$ alkyl), optionally substituted aryl (e.g., $C_{4-18}$ aryl), optionally substituted alkaryl (e.g., $C_{1-6}$ alk-$C_{4-18}$ aryl), optionally substituted aryloxy (e.g., $C_{4-18}$ aryloxy), optionally substituted alkaryloxy (e.g., $C_{1-6}$ alk-$C_{4-18}$ aryloxy), optionally substituted thioalkaryl (e.g., $C_{1-6}$ thioalk-$C_{4-18}$ aryl), or optionally substituted thioalkheterocyclyl (e.g., $C_{1-6}$ thioalk-heterocyclyl).

EXAMPLES

Example 1: Development of a Novel Stationary Phase for Gas Chromatography 3,5-bis(trifluoromethyl)phenol polysiloxane polymers were initially developed as a sensor coating material with exceptional sensitivity for organophosphorous such as chemical warfare agents and organophosphorous pesticides. We developed further methodologies to coat the inside of a column (e.g., a commercial fused silica capillary column used for gas chromatography (GC)) with this polymer to evaluate its thermodynamic properties. It was unexpectedly discovered that the polymer possessed novel and unique retention characteristics for use as a highly selective stationary in gas chromatography.

The polysiloxane backbone offers superior diffusion characteristics relative to other materials in the literature with comparable polar affinity (e.g., BSP3, such as described in Grate J W, "Hydrogen-bond acidic polymers for chemical vapor sensing," *Chem. Rev.* 2008; 108:726-45). This improved diffusion makes it an ideal candidate for use as a stationary phase in GC. The development of new polar stationary phases for GC has taken on a new priority recently because of the advance of multidimensional GC. This material has strong value for the separation of phosphonate-based chemical warfare agents, but also has potential commercially in the detection and analysis of pesticides and as an attractive option as a complimentary phase for multidimensional gas chromatography. Further potential developments include polymer precursors having an increased thermal stability, which would expand the range of compounds that this material could be used to help separate.

The polymers herein can be employed in any useful manner. In one non-limiting instance, a static coating technique for deposition is employed. In other embodiments, a dynamic coating technique can be used. In particular embodiments, a mixture (e.g., a coating solution) of the DKAP (e.g., about 0.01% (w/v) to about 2% (w/v)) with a thermally activated free radical initiator at catalytic concentrations. In some embodiments, the initiator is AIBN (azobisisobutyronitrile) (e.g., at a concentration of about 0% (w/v) to about 0.1% (w/v)) in any useful solvent (e.g., a polar solvent or a polar aprotic solvent, such as dichloromethane). In other embodiments, the solvent is selected which dissolves the polymer and/or possesses a relatively low boiling point (e.g., a boiling point that is less than the thermal initiation temperature of the initiator or less than the 10 hour half life temperature of the initiator).

Deposition can be conducted in any useful manner. In one embodiment, the method include introducing the coating solution into the internal bore of a column and sealing on one end of the column, while applying a vacuum to the open end. The column is held at an initial temperature (e.g., a constant temperature) below the boiling point of the solvent and the thermal initiation temperature of initiator. In one embodiment, the initiator is AIBN, and the initial temperature is of from about 30° C. to about 50° C. As would be appreciated by a skilled artisan, the use of different solvents and initiators may require use of different temperatures for the initial temperature. After the stationary phase is deposited and the solvent evaporated, method includes heating the column under an optional inert gas flow (typically helium or nitrogen) at a first temperature, in which the temperature is an elevated temperature above the thermal initiation temperature of the initiator. In the case of AIBN, the first temperature (or elevated temperature) is of from about 60° C. of about 90° C. Then, column can be evaluated for performance.

Example 2: Thermodynamic Studies on a Hydrogen Bonded Acidic (HBA) 3,5-bis(trifluoromethyl)phenol-functionalized Polymer as a Gas Chromatography Stationary Phase for Selectively Speciating Chemical Warfare Agents Certain organophosphates (OPs) have been used as chemical warfare agents (CWA) (see, e.g., Wang J et al., "Microfluidic device for coulemetric detection of organophosphate pesticides," *Anal. Sci.* 2015; 31:591-5). Sarin was used in the 1995 terrorist attack on Tokyo subway (see, e.g., Tu A T, "Basic information on nerve gas and the use of sarin by Aum Shinrikyo," *J. Mass Spectrom. Soc. Jpn.* 1996; 44:293-320), a deadly reminder of CWAs continued threat. On-site detection of CWAs benefits from miniaturized systems combining portability, analytical speed, sensitivity, and selectivity (see, e.g., Nakane K et al., "High-temperature separations on a polymer-coated fibrous stationary phase in microcolumn liquid chromatography," *Anal. Sci.* 2011; 27:811-6).

A micro gas chromatography (μGC) system with CWA-selective stationary phase columns could meet such requirements (see, e.g., Nakane K et al., *Anal. Sci.* 2011; 27:811-6; Lewis P R et al., "Recent advancements in the gas-phase MicroChemLab," *IEEE Sensors J.* 2006; 6:784-95; and Manginell R P et al., "Mass-sensitive microfabricated preconcentrator," *J. Microelectromech. Syst.* 2008; 17:1396-407). We describe for the first time a hydrogen-bonded acid (HBA) polymer, 3,5-bis(trifluoromethyl)phenol functionalized polymer, poly{methyl[3-(2-hydroxyl, 4,6-bistrifluoromethyl)phenyl]propylsiloxane}, (named, "DKAP"), as a GC stationary phase for the selective absorption and rapid separation of OPs, CWA surrogates, dimethyl methylphosphonate (DMMP), diethylmethyl phosphonate (DEMP) diisopropyl methylphosphonate (DIMP), and trimethyl phosphate (TMP) with high selectivity. Sorption properties of DKAP for CWA surrogates were compared to several polar, mid-polar, and nonpolar stationary phases.

We also describe, for the first time, rejection of interferents using DKAP, and quantitative thermodynamic data on the binding energies of these interactions. This work helps to identify the best pair of hetero-polar columns for two-dimensional GC systems employing nonpolar stationary phase as GC1 to reject interfering molecules and DKAP as GC2 stationary phase for the selective, sensitive, rapid, and field detection of CWAs. Additional details follow.

Example 3: Experimental

Reagents, chemicals, and DKAP polymer: All chemicals including OPs, DEMP (152.13 g/mol, b.p. ~192° C.), TMP (140.08 g/mol, b.p. 197° C.), and DMMP (124.08 g/mol, b.p. 181° C.), along with "control" n-hexadecane (226.41 g/mol), were from commercial vendors such as Sigma-Aldrich (St. Louis, Mo.) and used as received. The OP DIMP (180.18 g/mol, b.p. 215° C.) was purchased from Alfa Aesar (Haverhill, Mass.). Methane gas (16.04 g/mol) was obtained from Matheson Tri-Gas Co. (Albuquerque, N. Mex.). All chemicals were of analytical reagent quality.

The DKAP polymer (FIG. 1B) was synthesized as described previously (see, e.g., Du X et al., "A new polysiloxane coating on QCM sensor for DMMP vapor detection," *J. Mater. Sci.* 2009; 44:5872-6). Briefly, 3,5-bistrifluoromethylphenol was reacted with allyl bromide under basic conditions to provide 1-(allyloxy)-3,5-bis(trifluoromethyl)benzene, which was heated to 250° C. to facilitate a Claisen rearrangement to generate 2-allyl-3,5-bis(trifluoromethyl)phenol. This intermediate underwent hydrosilylation with polymethylhydrosiloxane in toluene with Karstedt's catalyst. Heating at 100° C. for several hours yielded the DKAP polymer, and its identity was confirmed by $^{1}$H-NMR and $^{13}$C-NMR.

DKAP GC column fabrication: A 10 m long commercial intermediate polarity guard capillary column from Restek (Bellefonte, Pa.) with an internal diameter (i.d.) of 530 μm was coated with DKAP under static conditions as described below. The column was rinsed with isopropanol and dried completely under vacuum. This was followed by filling the column with 10% (v/v) dimethylvinylsilane in $CH_2Cl_2$ solution, sealing the end, and heating the sealed column for one hour at 60° C. The liquid was then expelled using 30 psi $N_2$. A coating solution of ~0.1% (w/v) DKAP and a thermally-activated free radical initiator (~0.3% of polymer mass)

were prepared in $CH_2Cl_2$. The solution was transferred to a column-rinsing apparatus (Supelco, Sigma/Millipore, Bellefonte, Pa.). A 30 psi head pressure of $N_2$ was used to fill the column with the polymer solution. The column exit was sealed taking care to avoid bubbles, and a vacuum was pulled on the open end at a constant temperature of 40° C., to evaporate the solvent, leaving a thin uniform film of DKAP on the surface. The column was then purged with $H_2$ at 60° C. to promote crosslinking.

The final DKAP-coated GC column had a nominal stationary phase film thickness ($d_f$) of 0.113 μm. The phase volume ratio ($V_r$, polymer volume/gas phase volume) was estimated by the reciprocal of the phase ratio (β), which in turn equaled the internal capillary GC column radius divided by $2d_f$. The calculated β and $V_r$ values for DKAP polymer-coated GC column were ~1176 and $8.5 \times 10^{-4}$, respectively. Approximately 1 m of column was cut from each end to avoid end effects of the coating process, yielding a final column length of 8 m.

Commercial GC columns: Commercial columns are listed in Table 1. Abbreviations include polydimethyl siloxane (PDMS); trifluoropropylmethyl polysiloxane (TFPMPS); 50% phenyl polysilphenylene siloxane (50% PPSPS); 50% cyanopropyl-50% phenylmethyl polysiloxane (50% CPPMPS); polyethylene glycol (PEG); 90% cyanopropyl polysilphenyl siloxane (90% CPPSPS); and 1,12-di(tripropylphosphonium) dodecane bis(trifluoromethane sulfonyl) amide (1,12-TPPDBTFMSI).

Variables include the time ($t_{ri}$) required for an unretained species to traverse the column length and the retention factor (k) for analyte i, which can be calculated by using methane as an unretained species to measure void time and isothermal retention time of a compound by rearranging equation 1:

$$k=(t_{ri}/t_m)-1. \quad (2)$$

The partition coefficient (K) for an analyte in the polymer is provided as follows:

$$K=k/V_r. \quad (3)$$

The value of $V_r$ for a column is calculated from $d_f$ and the inner radius (r) as follows:

$$V_r=2rd_f-d_f^2/(r-d_f)^2. \quad (4)$$

Phase volume can be calculated from the coating volume, polymer mass, and polymer density. For known $V_r$, $d_f$ can be calculated by rearranging Eq. 4 into quadratic Eq. 5 as follows:

$$V_r r^2-(V_r+1)2rd_f+(V_r+1)d_f^2=0. \quad (5)$$

The Gibbs free energy of solvation for an ideal solution ($\Delta G_{solv}$) is related to K by Eq. 6, where T is the temperature (K), ln is the natural logarithm, and R is the gas constant:

$$\Delta G_{solv}=-RT \ln K. \quad (6)$$

TABLE 1

Properties of commercial GC columns

| Name | Length (m) | i.d. (μm) | $d_f$ (μm) | β (r/2$d_f$) (μm) | $V_r$ (1/β) | Film type | Polarity | Vendor |
|---|---|---|---|---|---|---|---|---|
| RTX-1 | 10 | 530 | 0.25 | 530 | 0.001887 | PDMS | Nonpolar | Restek |
| RTX-200 | 30 | 250 | 0.25 | 250 | 0.004000 | TFPMPS | Mid-polar | Restek |
| Rxi-17sil MS | 30 | 250 | 0.25 | 250 | 0.004000 | 50% PPSPS | Mid-polar | Restek |
| RTX-225 | 15 | 530 | 0.10 | 1325 | 0.000755 | 50% CPPMPS | Polar | Restek |
| RTX-Wax | 30 | 250 | 0.25 | 250 | 0.004000 | PEG | Polar | Restek |
| BPX-90 | 15 | 250 | 0.25 | 250 | 0.004000 | 90% CPPSPS | Highly-polar | SGE* |
| SLB-IL59 | 30 | 250 | 0.25 | 250 | 0.004000 | 1,12-TPPDBTFMSI | Highly-polar | Supelco |

*SGE Analytical, Trajan Scientific Americas, Austin, TX

GC operation: All column testing was conducted with an Agilent 7890A system (Santa Clara, Calif.). The split/splitless inlet temperature was 250° C., and detection was by a flame ionization detector (FID) with signal output recorded as picoamps (pA). Column operation was in split mode with a 25:1 split ratio. Ultra-High-Purity (UHP) $N_2$ was used as the makeup gas at a flow of 30 mL/min, and the detector temperature was 300° C. The carrier gas was UHP-$H_2$ at a flow rate of 1.75 mL/min. Septum purge was 3 mL/min. A 5 μL injection of methane was used to measure the system's transport time ($t_m$). Analytes were prepared at a concentration of 1 μL/mL in $CS_2$, and 0.2 μL was injected using a 7693 Agilent autosampler. Columns were operated at 80° C. (353.15 K); 90° C. (363.15 K); 100° C. (373.15 K); 110° C. (383.15 K); 120° C. (393.15 K); 130° C. (403.15 K); 140° C. (413.15 K); 150° C. (423.15 K); and 170° C. (443.15 K), for calculating thermodynamic parameters.

Thermodynamics: The free energy of solvation for an analyte in a polymer, coating the walls of capillary GC columns, can be determined from van't Hoff plots (see, e.g., Nakane K et al., *Anal. Sci.* 2011; 27:811-6). GC elution is given by Eq. 1, where $t_{ri}$ is the retention time of an analyte i and $t_m$ is the column void time:

$$t_{ri}=t_m(k+1). \quad (1)$$

$\Delta G_{solv}$ is related to enthalpy ($\Delta H_{solv}$) and entropy ($\Delta S_{solv}$) of solvation as follows:

$$\Delta G_{solv}=\Delta H_{solv}-T\Delta S_{solv}. \quad (7)$$

Eqs. 6 and 7 can be combined into the van't Hoff equation as follows:

$$\ln K=-\Delta H_{solv}/RT+\Delta S_{solv}/R. \quad (8)$$

Isothermal GC data can then be used to calculate K, and plots of ln K versus 1/T can yield a slope and intercept equal to $-\Delta H_{solv}/R$ and $\Delta S_{solv}/R$, respectively (see, e.g., Nakane K et al., *Anal. Sci.* 2011; 27:811-6).

Data analysis: Each analyte was run at least thrice for 5 minutes at each temperature for statistical rigor. The initial isothermal temperature (30° C.) was increased in 10° C. increments. Samples were analyzed at each temperature until a calculated k value was derived and data from a minimum of three temperatures had been collected. Standard errors of slope and y-intercept were calculated from residuals (difference between measured and calculated y values) of the equation y=bx+a, where b is the regression line slope and a is the y-intercept, based on least squares method. Average and standard deviation values were also calculated. Linearity correlation coefficient ($r^2$) were generated using KaleidaGraph (Synergy Software, Reading, Pa.).

Example 4: Development of GC Materials

We are developing μGC systems for sensitive, selective, and rapid analysis of chem/bio threat agents (see, e.g., Manginell R P et al., "A monolithically-integrated μGC chemical sensor system," *Sensors* 2011; 11:6517-32; and Manginell R P et al., "Development of a mesoscale pulsed discharge helium ionization detector for portable gas chromatography," *Anal. Sci.* 2015; 31:1183-8). Here, we used non-lethal OPs (see, e.g., FIG. 2A) as surrogate for nerve agents.

Figure 1B:
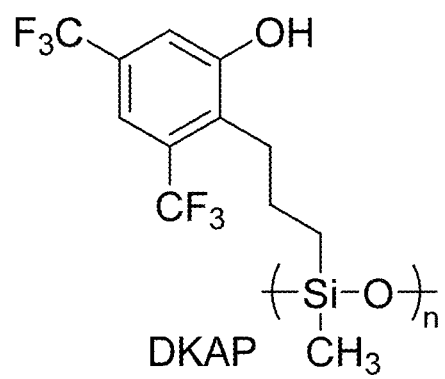
Figure 1C:
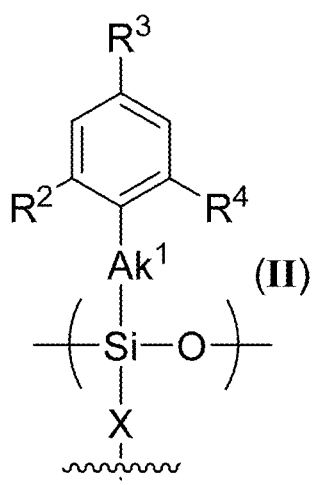
Figure 1D:
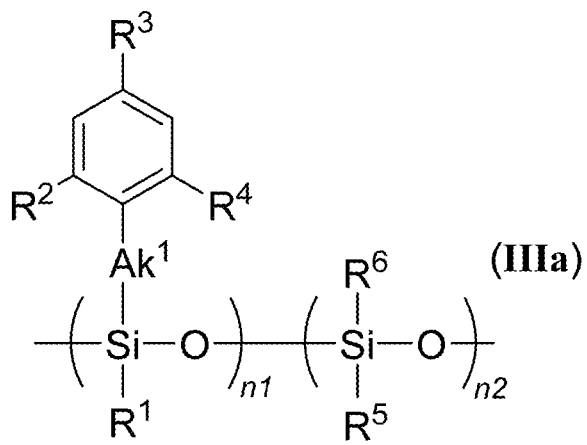
Figure 1E:
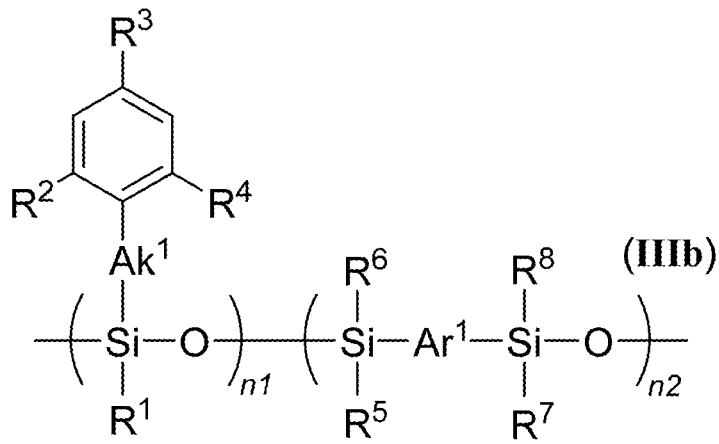
Figure 2A:
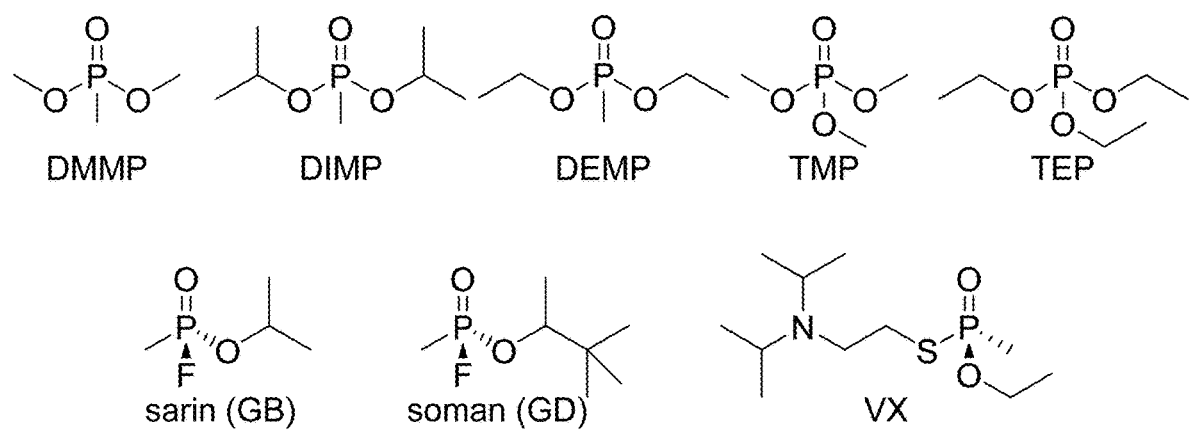
FIG. 2A-2B shows exemplary organophosphorous agents. Provided are (A) dimethyl methylphosphonate (DMMP), di-isopropyl methylphosphonate (DIMP), diethyl methylphosphonate (DEMP), trimethyl phosphate (TMP), triethyl phosphate (TEP), sarin (GB), soman (GD), and ethyl N-2-diisopropylaminoethyl methylphosphonothiolate (VX) organophosphorous agents; and (B) other exemplary organophosphorous agents having a structure of formula (IV) or (V) or salts thereof.
Figure 2B:
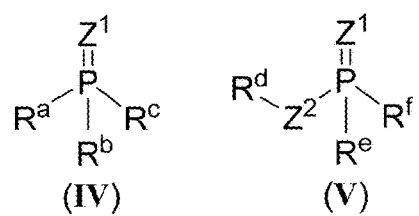

Using non-lethal surrogates for system optimization is acceptable, since OPs are CWA model compounds (see, e.g., Murakami T et al., "Highly sensitive detection of organophosphorus pesticides using 5,10,15,20-tetrakis(4-hydroxyphenyl)porphyrin," *Anal. Sci.* 2015; 31:1325-8). Indeed, DMMP is used as a simulant during sarin training exercises. DMMP is similar to sarin in polarity, volatility, and chemistry (FIG. 2A). With a vapor pressure of 2.31-112 Pa at 25° C., surrogate OPs, like DMMP, enabled low vapor concentration testing. The double-bonded oxygen atom of DMMP or sarin has higher electronegativity than phosphorus, which provides a dense electron cloud around the oxygen. The electron-rich oxygen acts as a base and hydrogen bonding occurs between DKAP's pendant phenol and the oxygen of OPs (FIG. 1B) (see, e.g., Long Y et al., "Hydrogen-bonded acidic polymers coated SAW sensors for 2,4-dinitrotoluene detection," *RSC Adv.* 2014; 4:59643-9).

Solute-solvent interactions of HBA polymers involve van der Waals forces and hydrogen bonding (see, e.g., Grate J W, "Hydrogen-bond acidic polymers for chemical vapor sensing," *Chem. Rev.* 2008; 108:726-45). Organophosphates being strongly hydrogen-bonded bases (HBB), bond formation occurs between CWA/surrogate and phenol. Terminal hydroxyl groups offer moderate acidity for interactions with target HBB. Without wishing to be limited by mechanism, the phenolic-functionalized DKAP is a strong HBA due to electron withdrawing trifluoromethyl groups (FIG. 1B). In part, electron withdrawal likely increases the acidity of hydroxyl group, thus activating it as electron acceptors, leading to hydrogen bonding, as confirmed by IR data (see, e.g., Grate J W, *Chem. Rev.* 2008; 108:726-45). Bonding is enhanced, whilst minimizing basicity of hydroxyl oxygen, thereby eliminating self-association (see, e.g., Long Y et al., *RSC Adv.* 2014; 4:59643-9). Thus, the phenolic pendant has hydrogen bonding capability on the polydimethylsiloxane (PDMS) backbone.

Phenolic-polymers, such as DKAP, can benefit from possessing low glass-to-rubber transition temperature ($T_g$) for GC applications. Solute absorption is rapid above $T_g$ due to segmental chain motion for rapid equilibrium between solute and solvent (vapors diffuse slowly in glassy polymers). PDMS has low $T_g$, high porosity, and freely rotating Si—O—Si bonds, which in turn can facilitate rapid vapor diffusion (see, e.g., Grate J W, *Chem. Rev.* 2008; 108:726-45). Sandia's DKAP (see, e.g., Lewis P R et al., *IEEE Sensors J.* 2006; 6:784-95; Manginell R P et al., *J. Microelectromech. Syst.* 2008; 17:1396-407; and Li M et al., "Nanoelectromechanical resonator arrays for ultrafast, gas-phase chromatographic chemical analysis," *Nano Lett.* 2010; 10:3899-903) employs HBA functionality that is limited as a 3,5-bis(trifluoromethyl)phenolic pendant to the PDMS backbone (FIG. 1B). The most acidic of such phenols, with a solvation parameter ($\Sigma\alpha_2^H$) of 0.82, low $T_g$ of ~20° C., likely confers high analyte diffusivity and thermal stability (see, e.g., Wang Y et al., "The response comparison of a hydrogen-bond acidic polymer to sarin, soman and dimethyl methyl phosphonate based on a surface acoustic wave sensor," *Anal. Methods* 2014; 6:1951-5).

Figure 3:
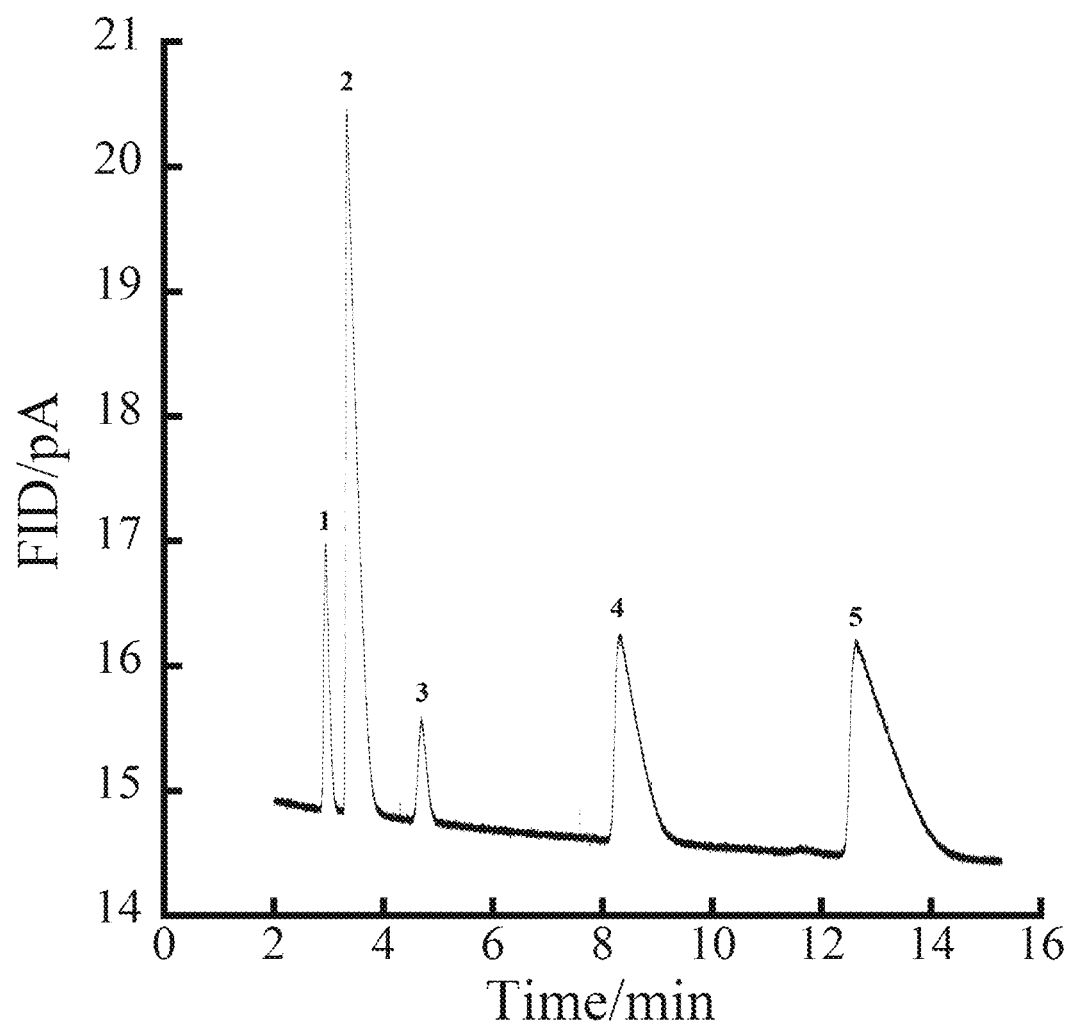
FIG. 3 shows a gas chromatogram of various organophosphorous agents with a DKAP-coated column (1=TMP; 2=DMMP; 3=TEP; 4=DEMP; 5=DIMP). The column separation temperature was 90° C.

Prior to GC of OPs, the effect of carrier gas velocity on height equivalent theoretical plate (HETP) was established using phosphonates, hydrocarbons, and various stationary phases (Table 1). To illustrate, for the DKAP-DMMP pair, HETP was 0.267 cm; and for the RTX-1-DMMP pair, it was 0.107 cm. Phosphonate concentration on retention time and FID amplitude were also standardized. The data in FIG. 3 is the first demonstration of DKAP GC capillary stationary phase clearly separating CWA surrogates. It may be possible to substitute FID with miniaturized pulsed discharge helium ionization detector (see, e.g., Manginell R P et al., *Anal. Sci.* 2015; 31:1183-8) for field analysis.

Chromatographic separation depends on the differences in retention strengths of analytes at the interface of stationary and mobile phases (see, e.g., Miyabe K, "Thermodynamic interpretation of retention equilibrium in reversed-phase liquid chromatography," *Anal. Sci.* 2009; 25:219-27). Film diffusion is a rate limiting step, and the optimum $d_f$ of DKAP provided clean separations (FIG. 3). Inadequate $d_f$ results in insufficient capillary wall coating, with interfacial absorption of analytes. While larger $d_f$ enables greater retention and better separation, a $d_f$ that is too thick can lead to poor efficiency. Generally, a doubling of $d_f$ increases the elution temperature by 15-20° C. under isothermal conditions. The $d_f$ affects β (Table 1), which is important when deciding column i.d. When i.d. increases, $d_f$ must also increase to provide similar retention and resolution. The 530 μm column i.d. provided a lower surface contact angle increasing the probability of surface wetting with the polar DKAP stationary phase, thereby providing a good balance of efficiency, resolution, and analysis time (FIG. 3).

The DKAP column length (8 m) was well-suited for resolution (resolution is proportional to square root of column efficiency). Doubling the column length would have only increased resolving power by ~40%, which was unnecessary based on observed performance (FIG. 3). Shorter columns can lead to reduced peak capacity. Sample concentration exceeding column capacity, leads to resolution loss, decreased reproducibility, and peak distortion. The higher resolving power of longer columns is offset by a doubling of analysis time under isothermal ramp conditions. Column downsizing offers other benefits such as temperature programmed elution (due to smaller heat capacity), reducing chemical concentrations, and testing a limited-availability material such as DKAP, as a GC stationary phase (see, e.g., Nakane K et al., *Anal. Sci.* 2011; 27:811-6). The minor peak asymmetry (FIG. 3) is a known challenge with OPs for commercial columns as well as the DKAP column tested here, due to OPs strong affinity for active silanol sites. The peak asymmetry on DKAP column was as good or better than commercial columns tested.

Example 5: Selectivity of Coated Columns

Figure 4A:
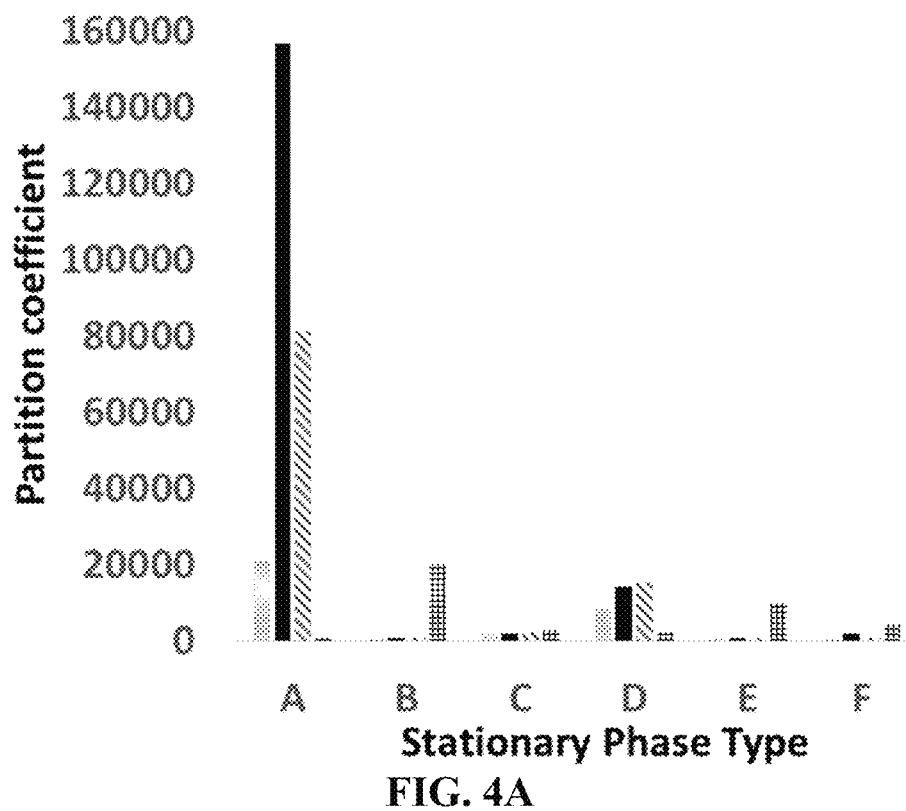
FIG. 4A-4B shows the selectivity of DKAP and commercial stationary phases. Stationary phases listed on the abscissa are: A, DKAP; B, RTX-1; C, RTX-Wax; D, SLB-IL59; E, Rxi-17Sil-MS; and F, RTX-200. Provided are (A) partition coefficient data for different stationary phase and organophosphorous agents, including DMMP (dotted); DIMP (black); DEMP (diagonal strip); and hexadecane (grid); and (B) normalized retention time $R_t$ for different stationary phases with DIMP (black) or hexadecane (white).
Figure 4B:
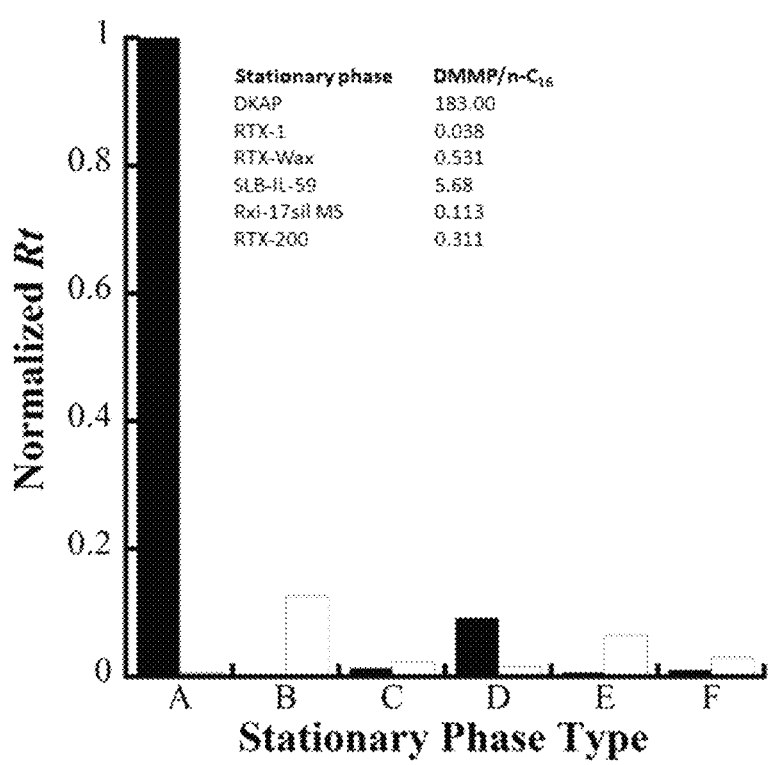

The DKAP polymer showed exceptional selectivity toward CWA surrogates (FIG. 4). Relative to commercial stationary phases, DKAP showed high retention of G-agent surrogate DIMP and correspondingly low retention for the hexadecane interferent. The ratio of 183 for DIMP/hexadecane (FIG. 4, inset) demonstrated the high selectivity of DKAP for CWA surrogates by excluding hydrocarbon vapors. Differences in the affinity of analytes relative to interferents contributes to better rejection properties of DKAP. We and others (see, e.g., Du X et al., *J. Mater. Sci.* 2009; 44:5872-6) have shown no effect of a broad range of interferents including acetone, ethanol, dichloroethane, n-hexane, and toluene on DKAP-DMMP interactions. It is seen that RTX-1 (FIG. 4) has poor retention for DIMP but high retention for hexadecane. This retention reversal suggested that DKAP/RTX-1 will make a good µGC×µGC pair for CWAs by excluding interferents. Amongst columns tested, only SLB-IL59 showed some discrimination between OPs and hydrocarbons (FIG. 4), and SLB-IL-59 was selected for comparative thermodynamic analysis vis-à-vis DKAP.

Example 6: Thermodynamic Studies of Coated GC Columns Interacting with OP Agents Investigating phase equilibrium and thermodynamics helps to understand analyte absorption/retention behavior on stationary phases and to study changes in enthalpy ($\Delta H^0$) and entropy ($\Delta S^0$) accompanying analyte transfer from mobile to stationary phase (see, e.g., Miyabe K, *Anal. Sci.* 2009; 25:219-27). The Gibbs free energy change ($\Delta G^0$) describes the partition of a solute between mobile and stationary phases. Using $\Delta H^0$, solvation thermodynamics can be determined. We analyzed the temperature dependence on the retention factor (k), retention equilibrium/partition coefficient (K), and selectivity ($\alpha$). We used the van't Hoff equation for deriving changes in enthalpy, entropy, and free energy to understand the influence of stationary phase chemistry on retention behavior from a thermodynamic standpoint (see, e.g., Miyabe K, *Anal. Sci.* 2009; 25:219-27).

Figure 5:
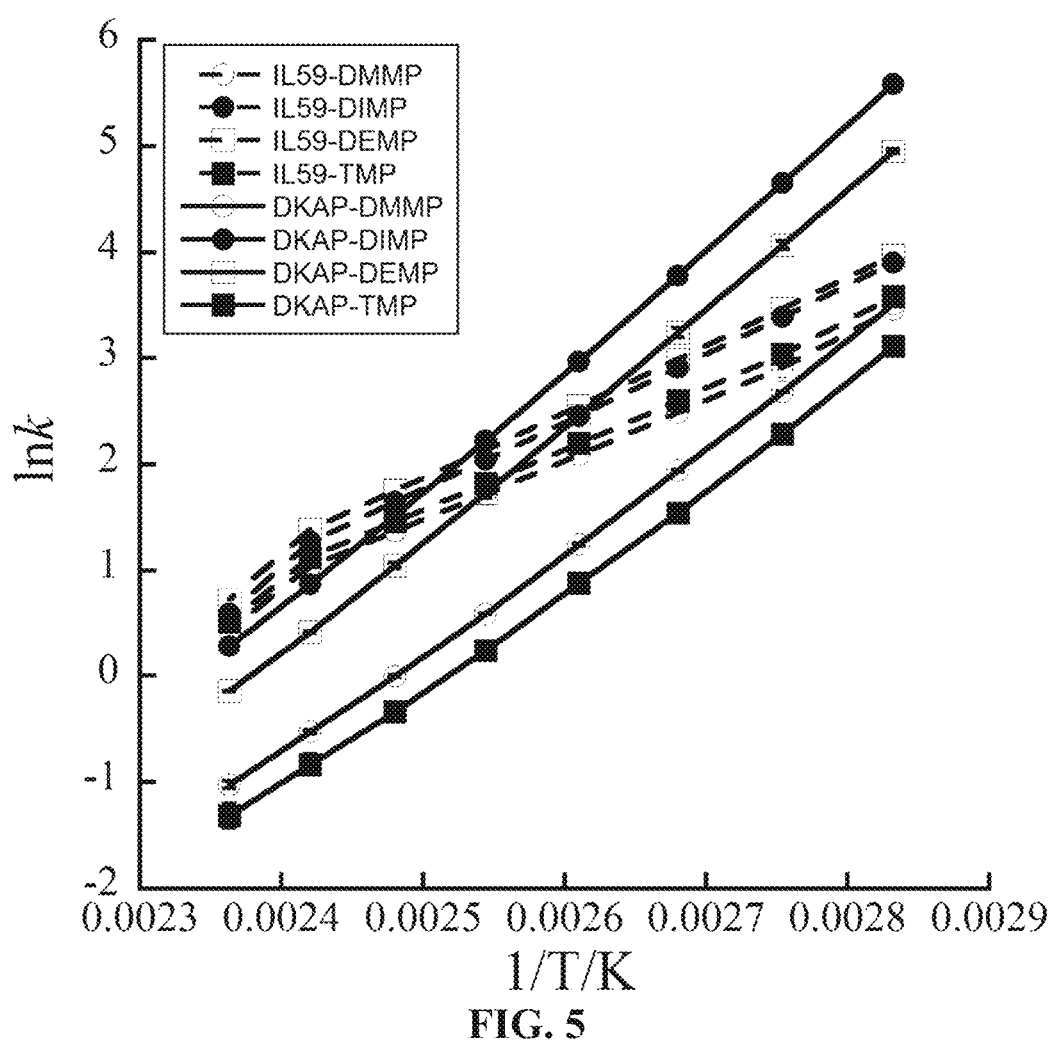
FIG. 5 shows retention factors of OPs with DKAP and SLB-IL59.

Retention factor is the ratio of the amount of time an analyte spends in the stationary phase relative to its time in mobile phase and defines the rate of analyte migration through a column. The retention profiles of OPs in DKAP and SLB-IL59 stationary phases are shown in FIG. 5. Data were also obtained with the remaining stationary phases (Table 1). Retention profiles were more linear with DKAP compared to SLB-IL59. Temperature clearly influenced retention behavior; however, when analyzing compounds with different polarities, determining elution order based on boiling point of analytes might not be straightforward due to chemical interactions between the analytes and the stationary phase. The DKAP retentivity based on FIG. 5 was DIMP>DEMP>DMMP>TMP (higher the profile, greater the retention), with TMP being the least adsorbed to DKAP and DIMP most strongly retained. The same behavior was seen in FIG. 3.

Figure 6:
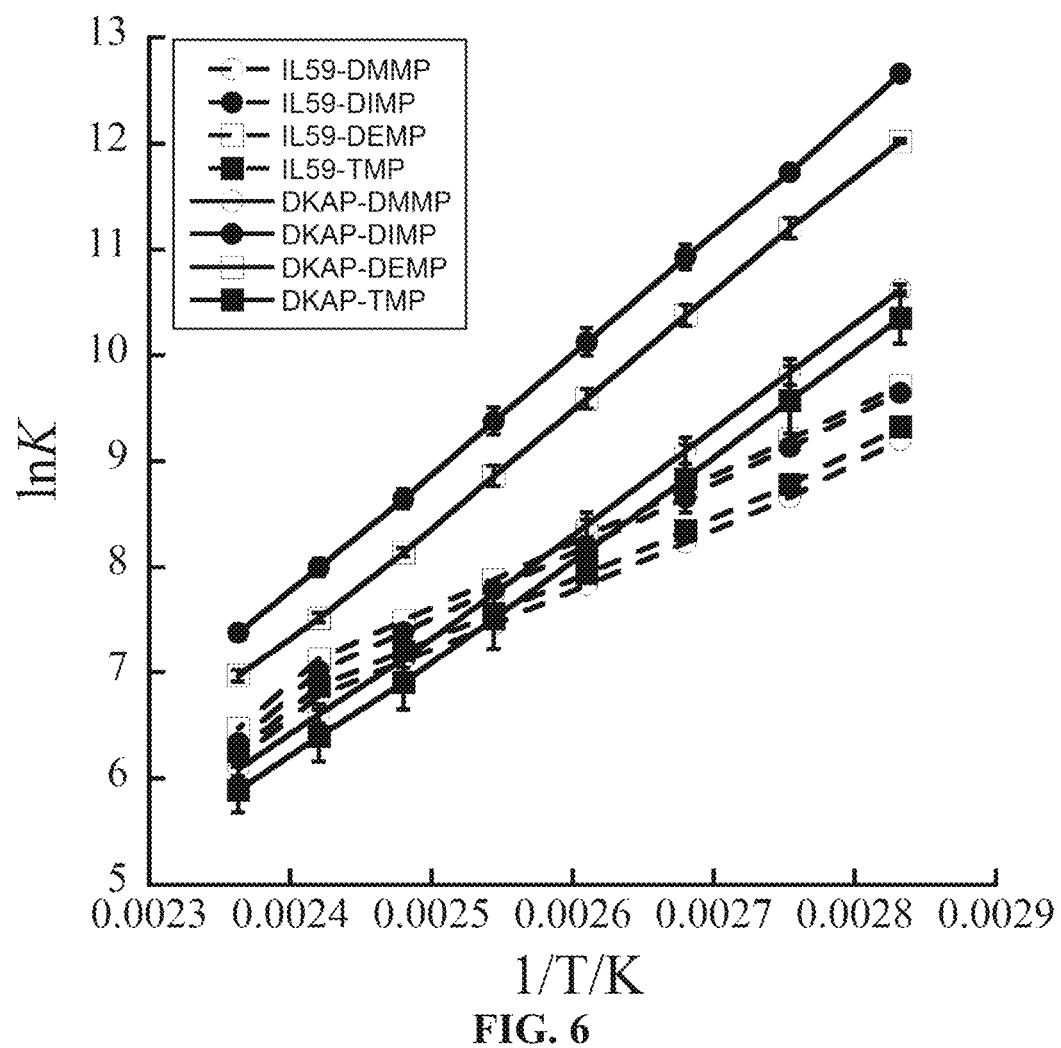
FIG. 6 shows van't Hoff plots of OPs with DKAP and SLB-IL59.

Retention data (FIG. 5) showed a closer relationship between DIMP/DEMP pair and DMMP/TMP pair. Each pair of analytes is closer to each other but separated from the other pair. This trend is also reflected in the elution profile, based on separation distance for these pairs (FIG. 3). At higher temperatures, retention behavior of analytes on SLB-IL59 was closer to DKAP (FIG. 5). There was a noticeable bending of the SLB-IL59 retention factor profiles (FIG. 5) as well as the van't Hoff profiles (FIG. 6) at higher temperatures (140° C. to 150° C.). This behavior might indicate a phase transition taking place with SLB-IL59 at elevated temperatures. Investigating this phenomenon further was beyond the scope of the present work, which is focused on the novel GC stationary phase DKAP and its interactions with CWA surrogates. The retention profiles of OPs on other stationary phases overlapped with DKAP as follows: SLB-IL59>RTX-Wax>RTX-200=RTX-225=BPX-90>Rxi-Sil-MS>RTX-1 (SLB-IL59 demonstrating most overlap with DKAP and RTX-1, the least).

A van't Hoff analysis yields thermodynamic data of analytes and their retention on a particular stationary phase to describe absorption and desorption (see, e.g., Reid V R et al., "Characterization and utilization of a novel triflate ionic liquid stationary phase for use in comprehensive two-dimensional gas chromatography," *J. Sep. Sci.* 2008; 31:3429-36). The positive profiles with no deviations from simple linear van't Hoff relationship, and negative $\Delta H^0$ values (Table 2), confirmed the exothermic nature of the absorption process, consistent with hydrogen bond formation and van der Waals interactions (see, e.g., Miyabe K, *Anal. Sci.* 2009; 25:219-27). Retention time usually decreases with increasing temperature, and enthalpy values $\Delta H^0$) will be negative (Table 2).

TABLE 2

Thermodynamics of OPs absorption to DKAP and SLB-IL59

| | DKAP | | | SLB-IL59 | | |
|---|---|---|---|---|---|---|
| Analyte | $\Delta H^0$ (kJ/mol) | $\Delta S^0$ (kJ/mol · K) | $r^2$ | $\Delta H^0$ (kJ/mol) | $\Delta S^0$ (kJ/mol · K) | $r^2$ |
| DIMP | −94.6 | −0.16 | 0.99962 | −56.0 | −0.078 | 0.99352 |
| DEMP | −91.1 | −0.16 | 0.99945 | −55.0 | −0.075 | 0.99374 |
| DMMP | −80.6 | −0.14 | 0.99920 | −50.6 | −0.067 | 0.99386 |
| TMP | −79.3 | −0.14 | 0.99887 | −51.5 | −0.068 | 0.99393 |

Linear van't Hoff plots with DKAP (FIG. 6, Table 2) suggested a constant retention mechanism and constant thermodynamic behavior over the temperature range studied. The higher negative $\Delta H^0$ values with DKAP relative to SLB-IL59 (Table 2) indicated stronger interactions of OPs with DKAP (see, e.g., Miyabe K, *Anal. Sci.* 2009; 25:219-27). Increased spacing between van't Hoff lines for DIMP and DEMP on DKAP relative to SLB-IL59 demonstrated greater retentivity (see, e.g., Nakane K et al., *Anal. Sci.* 2011; 27:811-6) and selectivity (see, e.g., Reid V R et al., *J. Sep. Sci.* 2008; 31:3429-36) (FIG. 6), matching the elution profile (FIG. 3).

At lower temperatures, slight separation of DMMP and TMP profiles was observed on DKAP compared to SLB-IL59. However, at no temperature did the profiles intersect (FIG. 6), confirming no coelution (FIG. 3). In contrast, the close spacing between the profiles with SLB-IL59 (FIG. 6), suggested coelution and poorer resolution of OPs with this stationary phase. The $\Delta H^0$ ranking was DIMP>DEMP>DMMP>TMP (Table 2). Based on the degree of overlap between CWA simulants with DKAP relative to other stationary phases, the interactions could be rank-ordered as SLB-IL59>RTX-Wax=RTX-1=RTX-200=Rxi-Sil-MS=BPX-90=RTX-225 (most to least overlap with DKAP).

TABLE 3

$\Delta G^0$ change with increasing temperature for OPs (DKAP versus SLB-IL59)

| Temp. | DKAP, $\Delta G^0$ | | | | SLB-IL59, $\Delta G^0$ | | | |
|---|---|---|---|---|---|---|---|---|
| (° C.) | DMMP | DIMP | DEMP | TMP | DMMP | DIMP | DEMP | TMP |
| 80 | −31.2 | −38.1 | −34.6 | −29.9 | −26.9 | −28.5 | −28.5 | −27.5 |
| 90 | −29.8 | −36.5 | −33.0 | −28.5 | −26.3 | −27.7 | −27.8 | −26.8 |
| 100 | −28.4 | −34.9 | −31.4 | −27.1 | −25.6 | −26.9 | −27.0 | −26.1 |
| 110 | −27.0 | −33.3 | −29.8 | −25.7 | −24.9 | −26.1 | −26.3 | −25.4 |

TABLE 3-continued $\Delta G^0$ change with increasing temperature for OPs (DKAP versus SLB-IL59)

| Temp. | DKAP, $\Delta G^0$ | | | | SLB-IL59, $\Delta G^0$ | | | |
|---|---|---|---|---|---|---|---|---|
| (° C.) | DMMP | DIMP | DEMP | TMP | DMMP | DIMP | DEMP | TMP |
| 120 | −25.6 | −31.7 | −28.2 | −24.3 | −24.3 | −25.3 | −25.5 | −24.8 |
| 130 | −24.2 | −30.1 | −26.6 | −22.9 | −23.6 | −24.6 | −24.8 | −24.1 |
| 140 | −22.8 | −28.5 | −25.0 | −21.5 | −22.9 | −23.8 | −24.0 | −23.4 |
| 150 | −21.4 | −26.9 | −23.4 | −20.1 | −22.2 | −23.0 | −23.3 | −22.7 |
| 170 | −18.6 | −23.7 | −20.2 | −17.3 | −20.9 | −21.4 | −21.8 | −21.4 |

Decrease in free energy ($\Delta G^0$) (Table 3) demonstrated that absorption was less favorable at elevated temperatures, leading to the transfer of analytes from the stationary phase back into the mobile phase, and eventually to the detector (see, e.g., Venkatesha T G et al., "Kinetics and thermodynamics of reactive and vat dyes adsorption on MgO nanoparticles," Chem. Eng. J. 2012; 198-199:1-10). Due to enthalpy change being negative, solubility of gases decreases with increasing temperature. At very high temperatures, vapor pressures and diffusion coefficients of analytes increase, resulting in poor focusing and broad peaks, and at limit, there will be no separation of analytes due to very high temperatures (see, e.g., Venkatesha T G et al., Chem. Eng. J. 2012; 198-199:1-10). Slopes from the van't Hoff plots depend on the type of polymer coating (see, e.g., Nakane K et al., Anal. Sci. 2011; 27:811-6). The negative entropy change ($\Delta S^0$) (Table 2) corresponds to a decrease in the degrees of freedom of adsorbed molecules (see, e.g., Venkatesha T G et al., Chem. Eng. J. 2012; 198-199:1-10). Thus, the concentration of OPs in the stationary-mobile interface decreases and their concentrations in DKAP phase increases (tighter sorption) due to intermolecular forces (see, e.g., Venkatesha T G et al., Chem. Eng. J. 2012; 198-199: 1-10).

Figure 7:
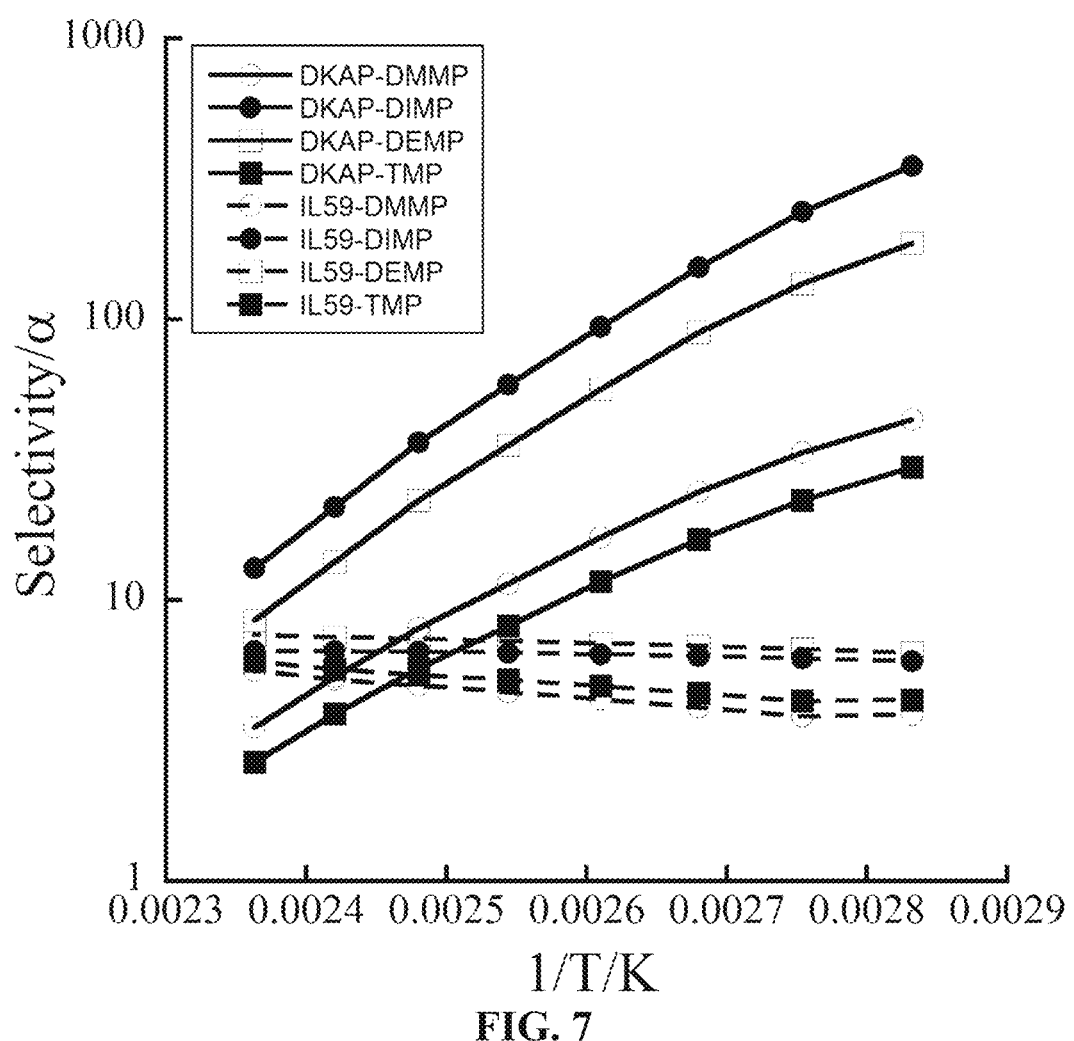
FIG. 7 shows selectivity of OPs with DKAP and SLB-IL59.
Figure 8A:
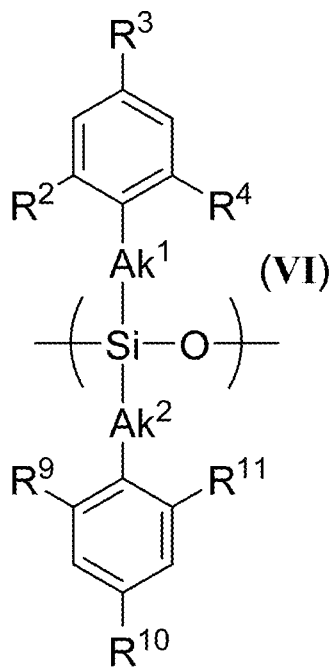
FIG. 8A-8G shows chemical structures of exemplary polymers. Provided are (A) polymers having a structure of formula (VI) or a salt thereof; (B) polymers having a structure of formula (VII) or a salt thereof; (C) Hot DKAP; (D) polymers (e.g., copolymers) having a structure of formula (VIIIa) or a salt thereof; (E) polymers (e.g., copolymers) having a structure of formula (VIIIb) or a salt thereof; (F) polymers (e.g., copolymers) having a structure of formula (IXa) or a salt thereof; and (G) polymers (e.g., copolymers) having a structure of formula (IXb) or a salt thereof.
Figure 8B:
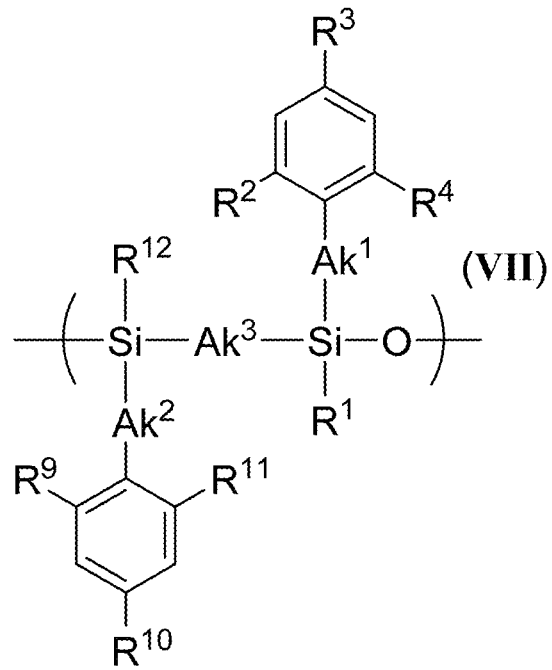
Figure 8C:
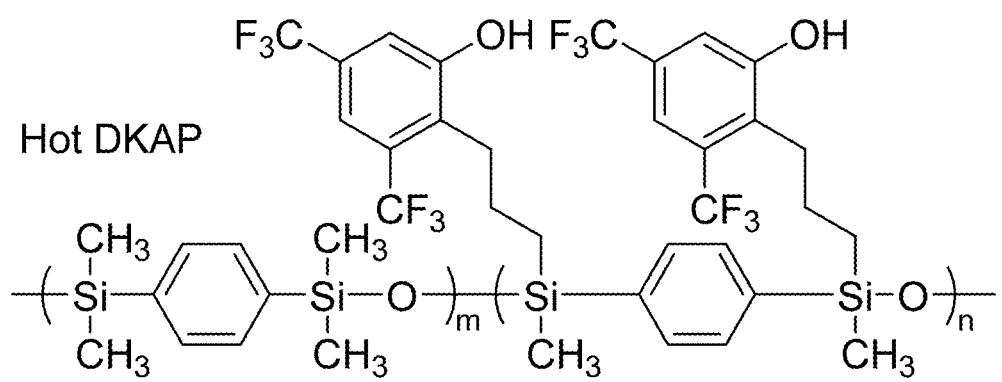
Figure 8D:
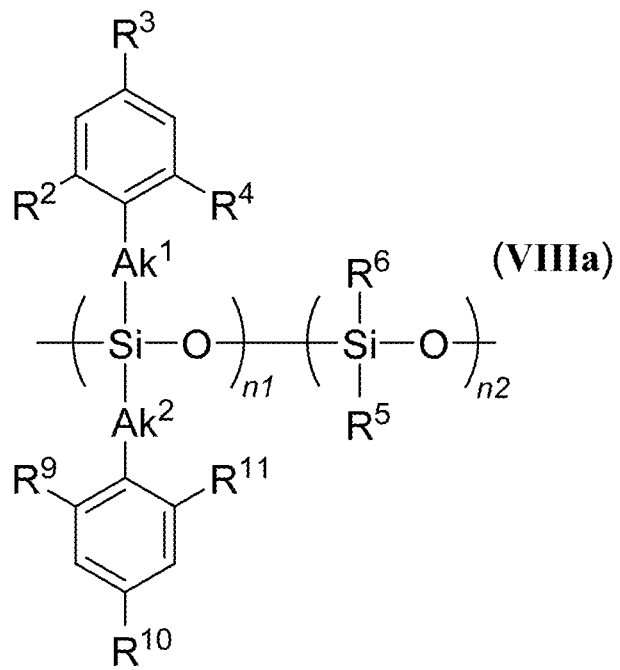
Figure 8E:
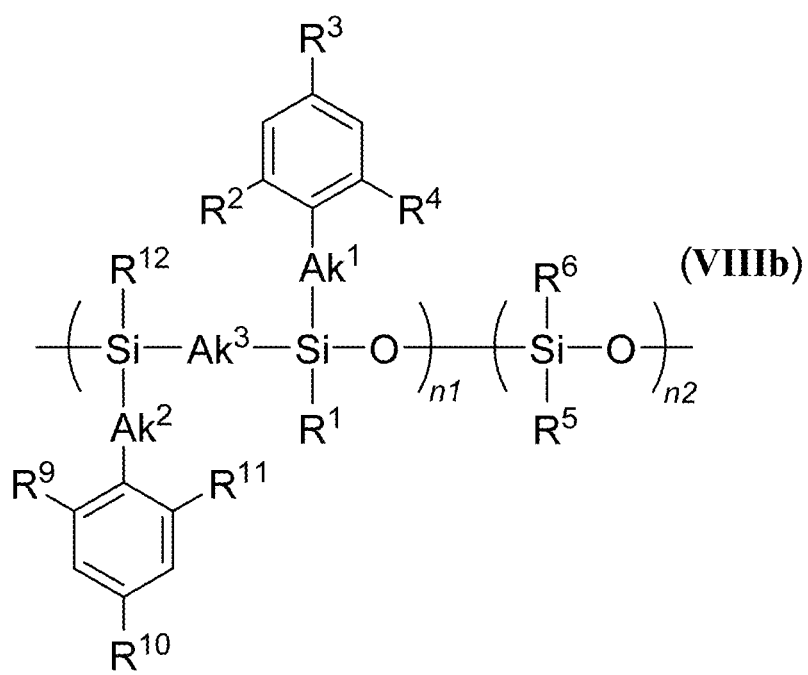
Figure 8F:
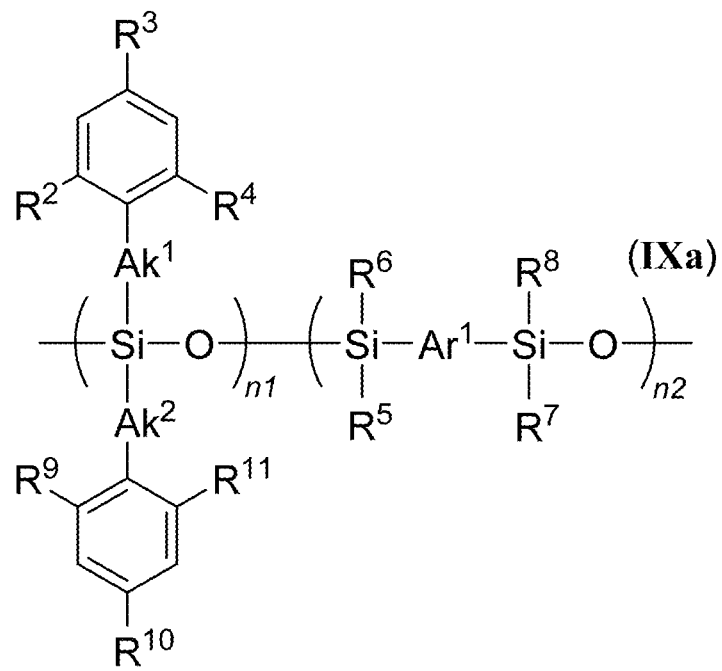
Figure 8G:
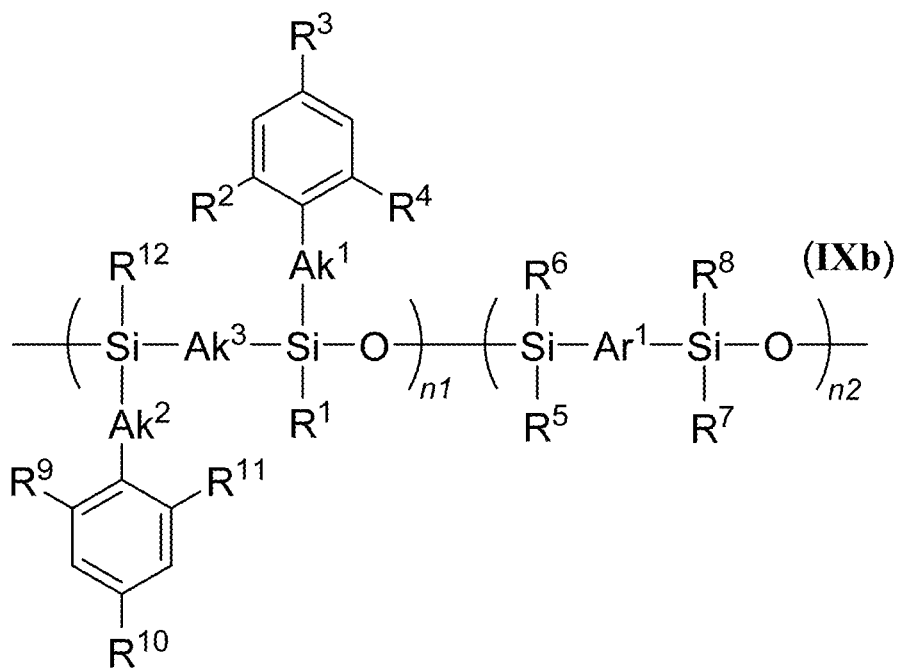
Figure 9A:
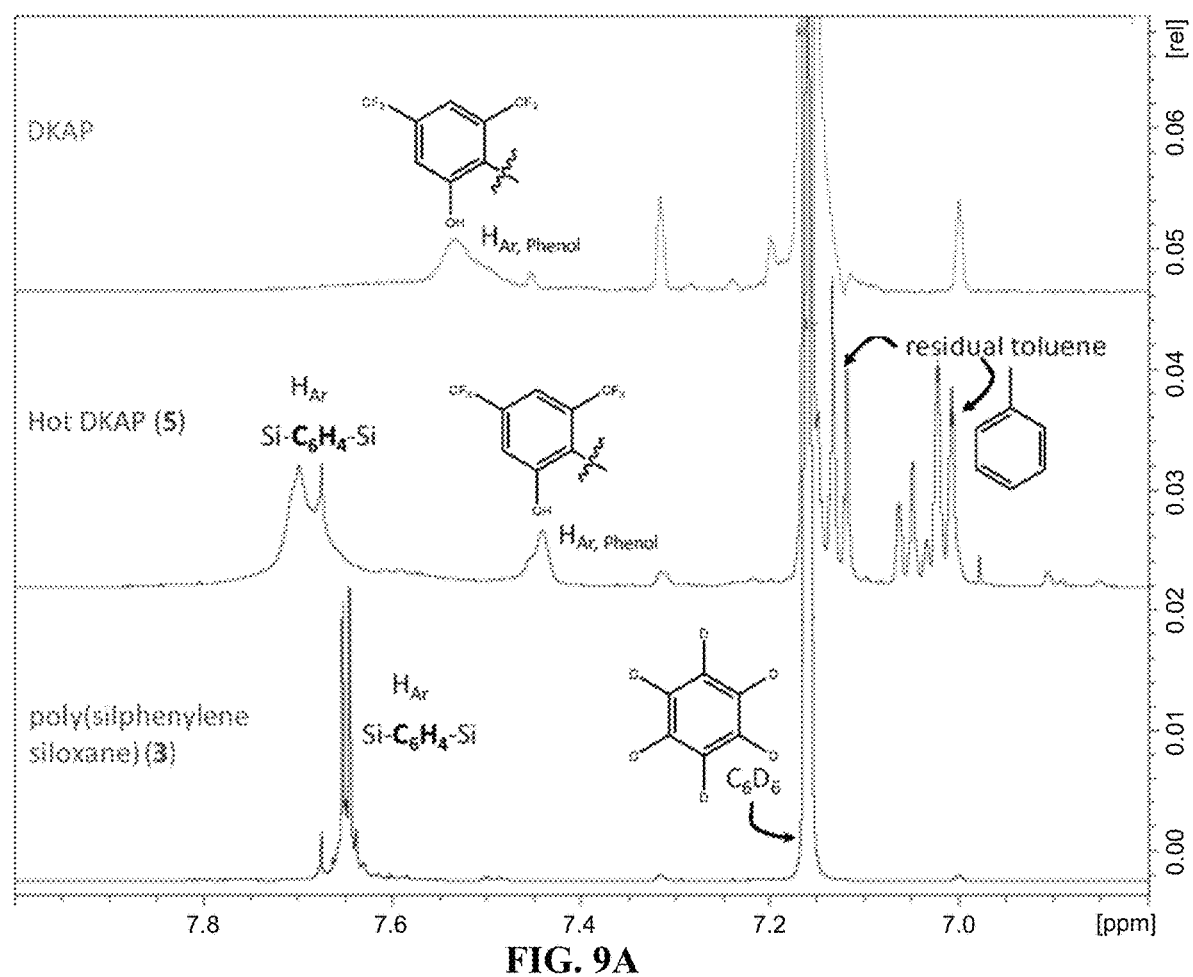
FIG. 9A-9D shows (A-C) expanded $^1$H NMR and (D) $^{19}$F NMR spectra for DKAP, HotDKAP (5), and precursors.
Figure 9B:
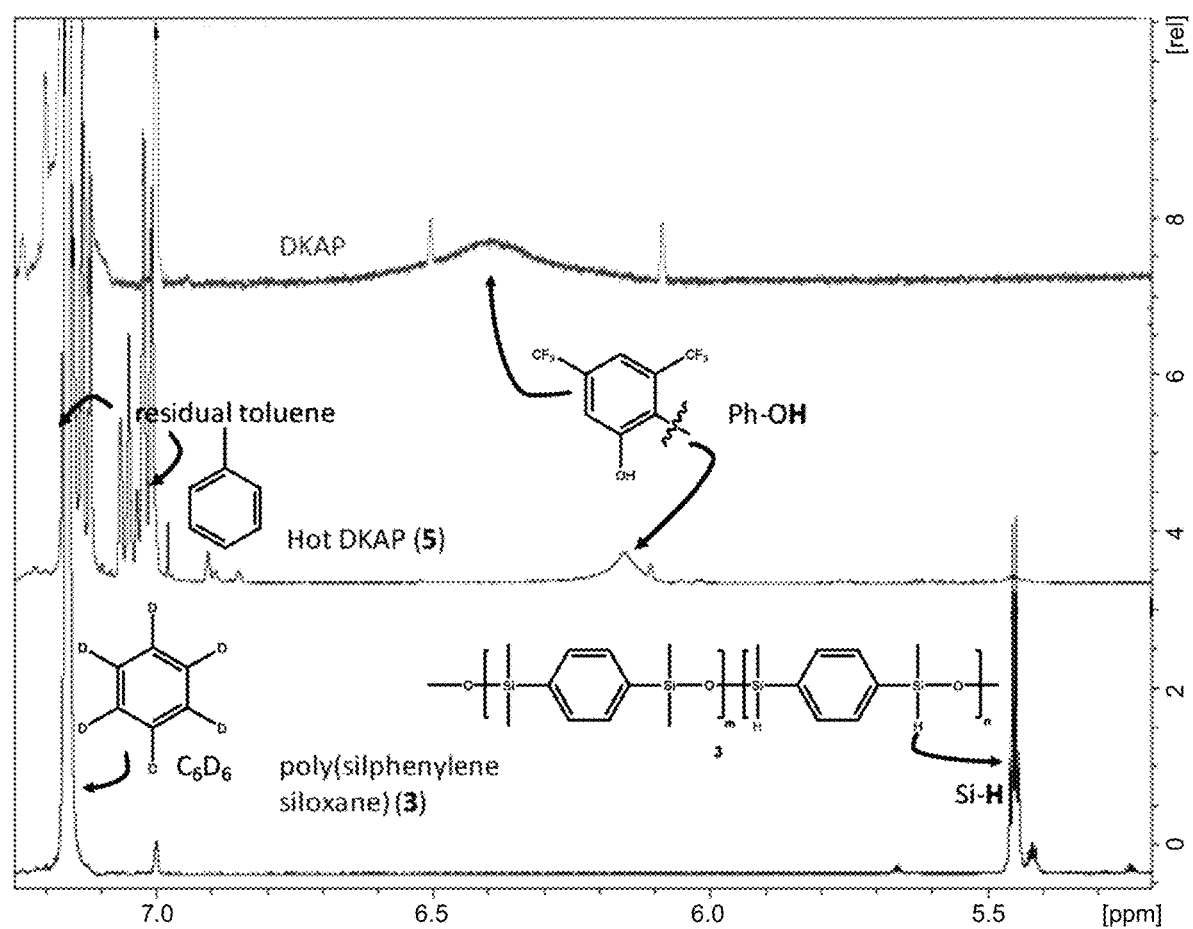
Figure 9C:
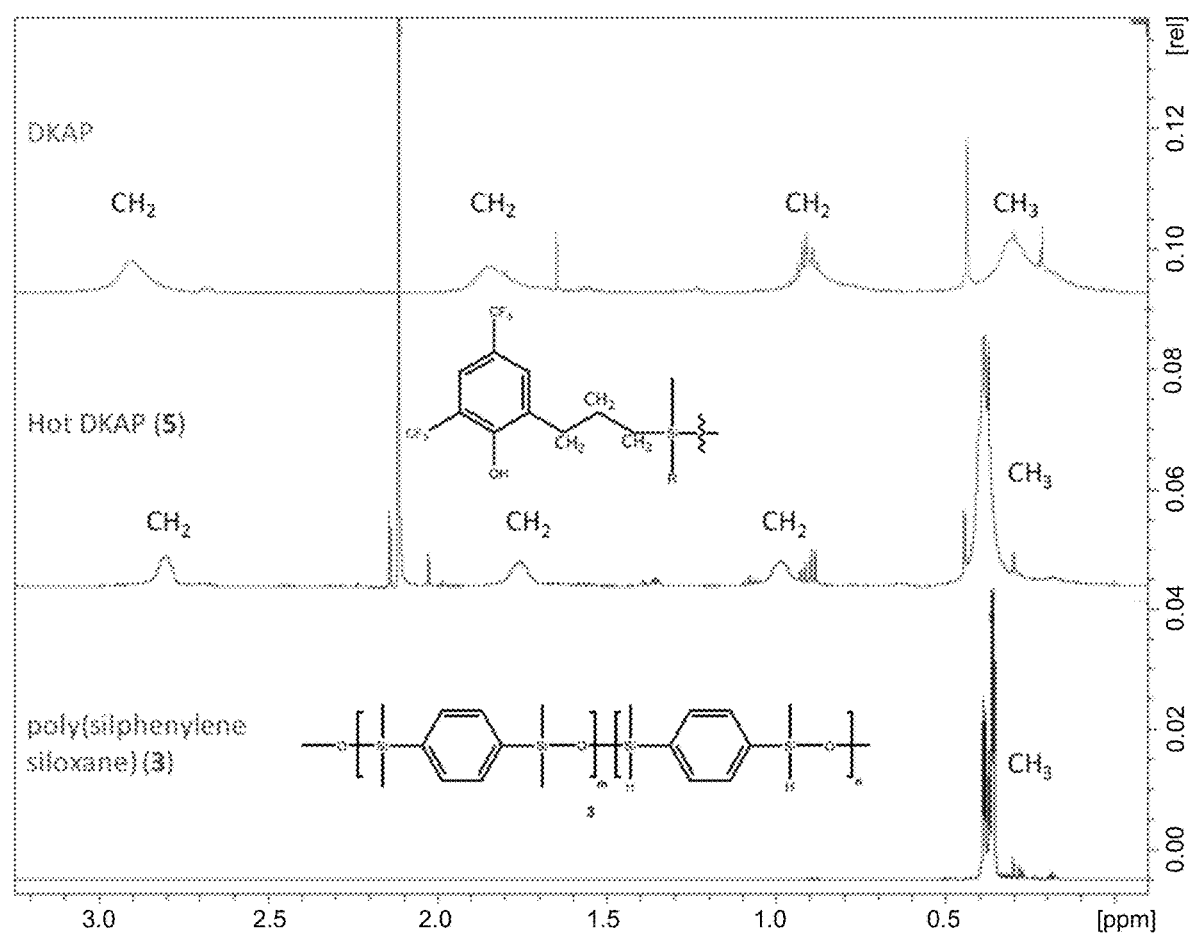
Figure 9D:
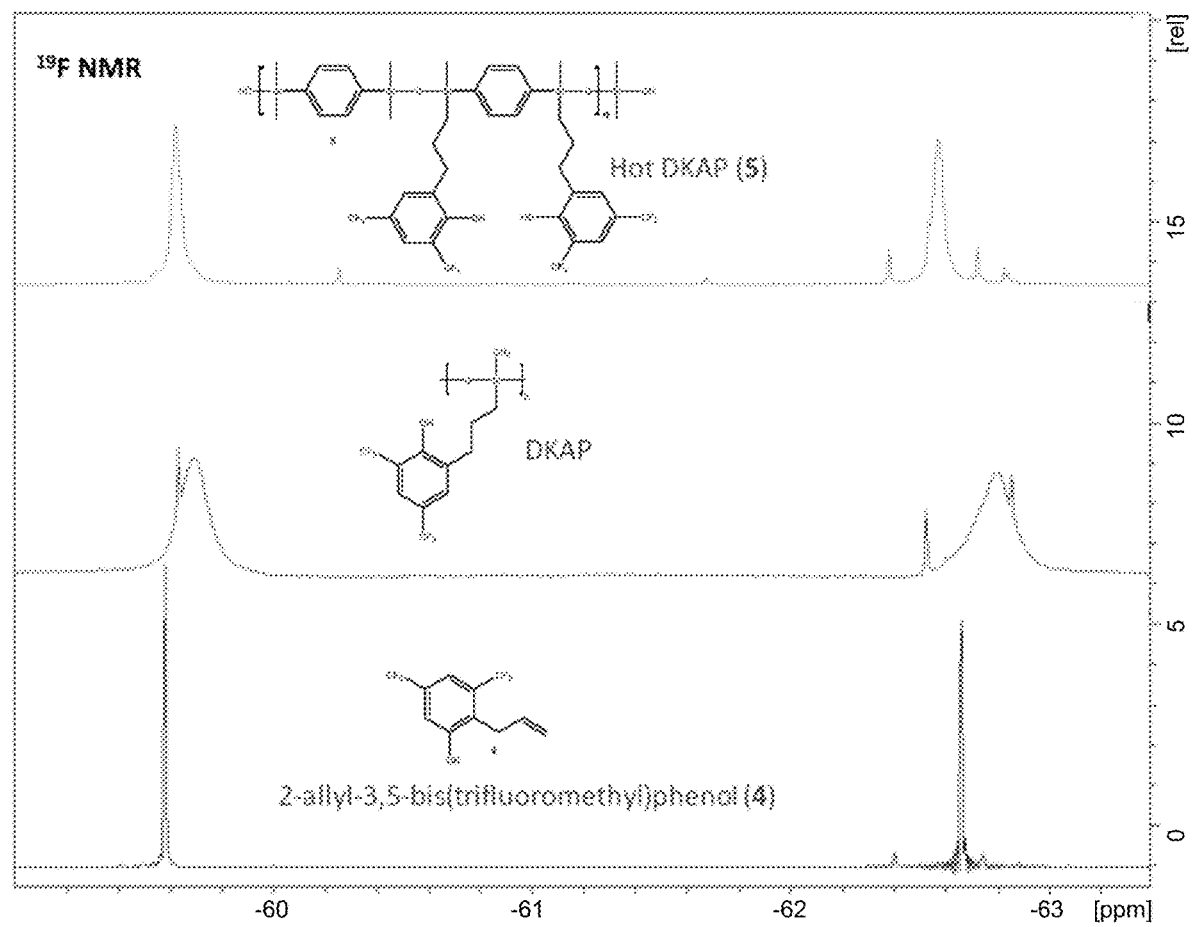

Another technique to compare DKAP and SLB-IL59 is to plot selectivity ($\alpha$) as a function of 1/T. This method is immune to $d_f$ differences amongst stationary phases (see, e.g., Reid V R et al., J. Sep. Sci. 2008; 31:3429-36). Selectivity relates to a stationary phase preferentially adsorbing an analyte over other(s), based on solute-stationary phase interactions due to van der Waals and dispersion forces, and hydrogen bonding. Selectivity was calculated by the retention factor (k) ratio for two different compounds, an OP and hexadecane: $\alpha=k_1/k_2$, where $k_1$ is the OP retention factor and $k_2$ is the retention factor for hexadecane at each temperature (FIG. 7). It is important to note the logarithmic ordinate of the selectivity chart. All commercial stationary phases (Table 1) were less selective for CWA surrogates relative to DKAP (FIG. 7).

Between 80° C. and 100° C., there was one to three orders of magnitude offset between DKAP selectivity for OPs compared to SLB-IL59. This offset of selectivity profiles, especially for DIMP and DEMP with DKAP compared to SLB-IL59, was remarkable (FIG. 7). It demonstrated that DKAP had higher selectivity compared to SLB-IL59. Other polar, mid-polar, and nonpolar stationary phases (Table 1) displayed even greater offset compared to DKAP than SLB-IL59 (data not shown). RTX-1 and Rxi-Sil-MS were the least selective, while the rest had lower selectivity compared to DKAP. Thus, DKAP offered better resolution between CWA simulants and hydrocarbon interferents at all temperatures, and relative to all other stationary phases (Table 1).

Selectivity of a capillary GC column is directly related to the interaction of analytes with the stationary phase, with strong interactions arising from strong intermolecular forces. Selectivity is determined by the stationary phase chemical functionalities. With an increase in temperature, the differences between retention factors for various analytes decrease, $\alpha$ approaches unity with ($\alpha-1/\alpha$) nearing zero. When temperatures become too high, no separation may occur. Thus, knowledge of the structures of the analytes and of the stationary phase is crucial for optimizing GC performance.

Example 7: Stability and Shelf Life

Traditional polar polymer stationary phases are appropriate for CWA separation. However, typical polar polymers necessary for hetero-polar μGC×μGC stationary phases often suffer degradation due to oxidation, moisture, and heat. DKAP is a stable polymer, and its interactions with OPs are reversible simply by purging with $N_2$ to restore its former pristine state. In addition, the regenerated DKAP polymer is reusable multiple times (see, e.g., Du X et al., J. Mater. Sci. 2009; 44:5872-6). DKAP is resistant to humidity, since the lone pairs of the phenolic oxygen are not basic. Water molecules, with acidic hydrogen atoms, do not bind well to DKAP, mitigating background humidity effects.

Thermal resistance was confirmed by an absence of change in $R_t$ (or k) after using DKAP at elevated temperatures over several months. Linear thermodynamic charts (FIGS. 5-7) between 30° C. to 170° C. was consistent with excellent heat-resistance of DKAP (see, e.g., Nakane K et al., Anal. Sci. 2011; 27:811-6). Constant thermodynamic behavior and thermal stability (FIGS. 5-7) permit temperature-programmed elution (see, e.g., Nakane K et al., Anal. Sci. 2011; 27:811-6). Furthermore, van't Hoff approximation suggests reaction rate increases by 2-4-fold as temperature increases by 10 K; therefore, separation times can be shortened by increasing the oven temperature, owing to DKAP's thermal stability.

DKAP-coated columns were stored at ~25° C. for ~2 years without performance degradation. Without wishing to be limited by mechanism, shelf life was attributed to C—F bond stability relative to C—H bonded polymers. Reproducible DKAP-GC analyses were conducted more than two months apart. The same analysis by two different investigators, conducted on two separate days, all yielded similar results. Thermodynamic analyses done two months apart also yielded nearly identical values with small standard deviations (≤1.4%). Considered collectively, the DKAP polymer GC coating demonstrated stability, sensitivity, selectivity, repeatability, and reproducibility, as defined previously (see, e.g., Achyuthan K E et al., "Design considerations for high-throughput screening and in vitro diagnostic assays," Comb. Chem. High Throughput Screen. 2007; 10:399-412).

Overall, rapid, sensitive, and selective detection of CWAs are critical during a terrorist event or to the warfighter. We describe for the first time DKAP polymer as a stationary phase in capillary GC of CWA surrogates. Thermodynamics of surrogates' interactions with DKAP are also described for the first time along with quantitative data on binding energies. These data help to select hetero-pair columns for 2D systems for rejecting interferents and identifying CWAs using μGC×μGC, with nonpolar GC1 stationary phase and DKAP as GC2 stationary phase.

Example 8: Novel Chemistry to Support the Detection of Advanced Chemical Agents Building on Sandia's extensive analytical chemistry work in this field, a polysilphenylene analog of the DKAP polymer coatings was synthesized and evaluated for high temperature operation. Initial test results indicate a lower glass transition temperature ($T_g$) for the new "Hot DKAP" material and a similar to slightly lower start to mass loss for "Hot DKAP", but slower degradation rate in clean dry air.

Hot DKAP is a poly(silphenylenesiloxane) polymer backbone (FIG. 8C) functionalized with the same bis(trifluoromethyl)phenol moiety found in DKAP (FIG. 1B). The backbone was synthesized as reported by Liu Y et al., "Synthesis and characterization of poly(silphenylenesiloxane)s containing functional side groups, a study to high-temperature elastomer," *Sci. Technol. Adv. Mater.* 2003; 4:27-34.

Figure 10A:
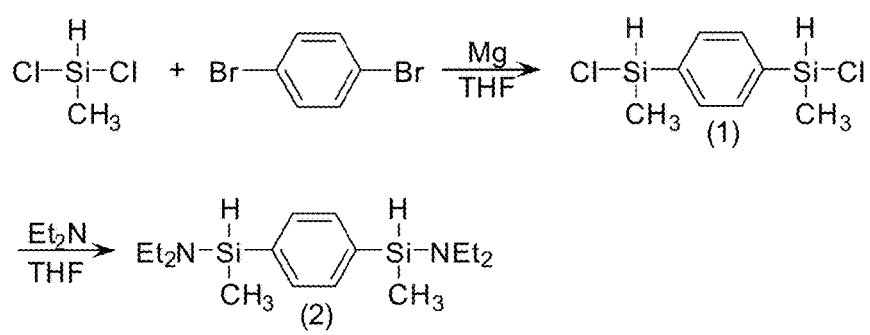
FIG. 10A-10B shows (A) an exemplary scheme for synthesizing a bis(aminosilane) monomer (compound 2) from commercial starting materials and (B) an exemplary scheme for synthesizing HotDKAP backbone from bis(aminosilane) and disilanol monomers followed by functionalization with the bis(trifluoromethyl)phenol active groups via a Pt-catalyzed hydrosilylation.

Briefly, the bis(aminosilane) monomer (compound 2) was synthesized (FIG. 10A) and reacted with a commercial disilanol (compound 1). NMR showed that the reaction proceeded cleanly, although with some homopolymerization of the disilanol, resulting in a 1:1.2 ratio of the monomethylsilphenylene to dimethylsilphenylene moieties in the polymer (compound 3).

Figure 10B:
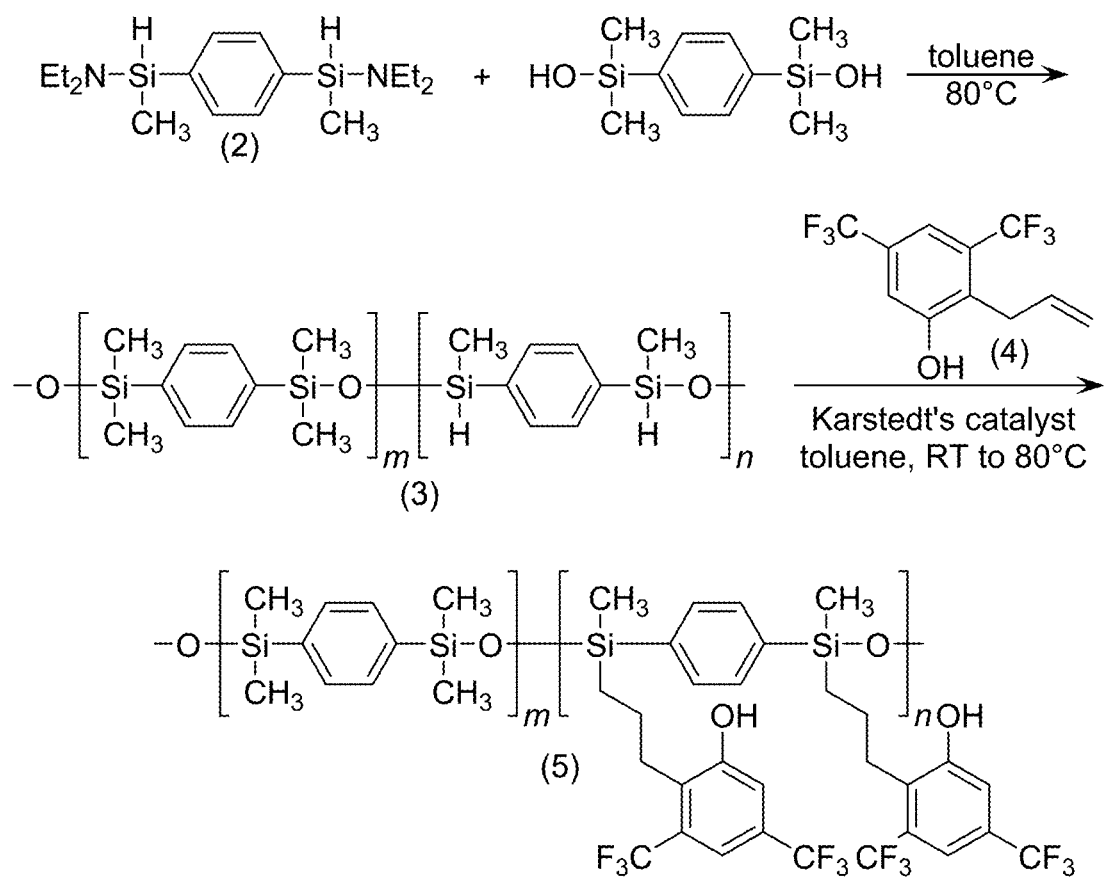

After purification of the polymer by repeated precipitation from toluene/methanol, the polymer (compound 3) was functionalized with 2-allyl-3,5-bis(trifluoromethyl)phenol (compound 4) via a Pt-catalyzed hydrosilylation reaction (FIG. 10B). This reaction is highly exothermic. Upon addition of the Pt catalyst at an elevated temperature, crosslinking occurs, likely between the reactive Si—H groups, and yields an insoluble gel. However, dropwise addition of the catalyst at room temperature followed by heating to 80° C. yields a soluble polymer (compound 5).

NMR analysis of the final polymer (5) clearly shows incorporation of the bis(trifluoromethyl)phenol moiety (FIG. 9A-9D). The almost complete disappearance of the Si—H peak (FIG. 9B) and integration of the aromatic and methylene protons in the product (compound 5) show that the hydrosilylation reaction proceeded to high conversion with one bis(trifluoromethyl)phenol group incorporated per Si—H in the starting material (compound 3). Note that in the spectra for DKAP and HotDKAP (5), one of the HAr peaks of the 3,5-bis(trifluoromethyl)phenol moiety is obscured under the residual solvent peak of the benzene. The final polymer (5) was light brown and glassy at room temperature. The $T_g$ was measured by DSC and found to be ~32° C.

Figure 11:
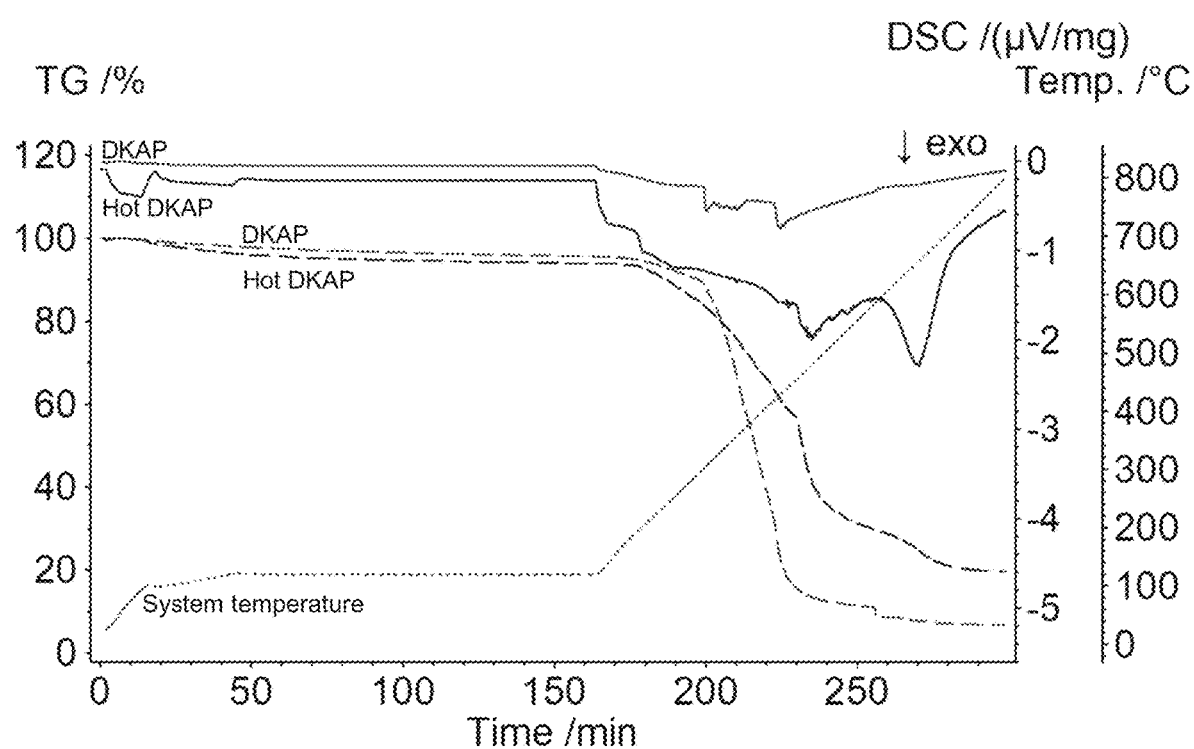
FIG. 11 shows thermogravimetric analysis (dashed lines), correlating differential scanning calorimetry analysis (solid lines) of DKAP and HotDKAP, and the temperature of the system (dotted line).
Figure 12A:
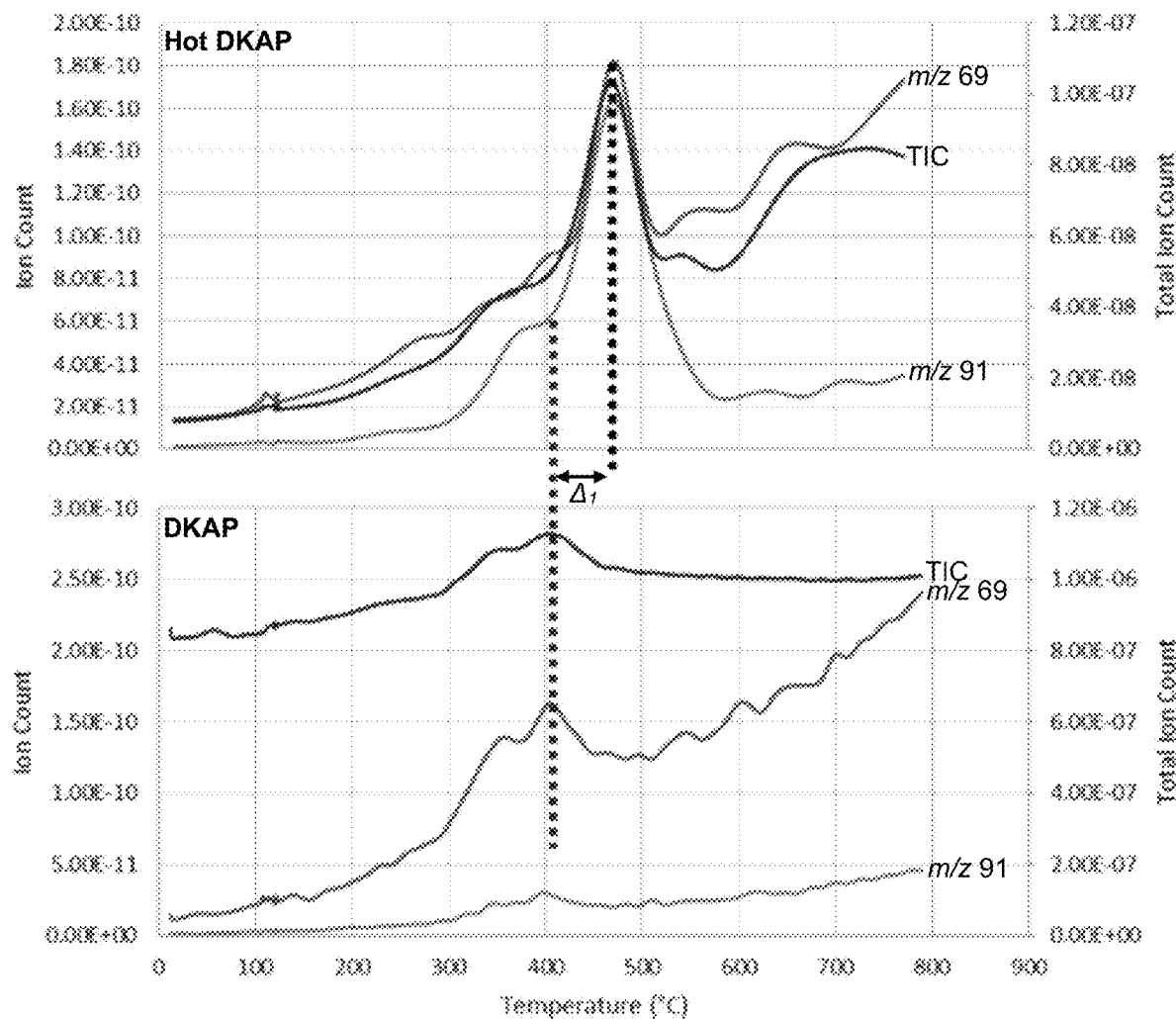
FIG. 12A-12C shows thermogravimetric analysis-mass spectrometry (TGA-MS) data, including (A) plots of ion counts for common fragments having a m/z ratio of 69 and 91 and the total ion count (TIC) for Hot DKAP (top) and DKAP (bottom); (B) plots of ion counts for common fragments having a m/z ratio of 229, 243, 304, 313, and 332 and TIC for Hot DKAP (top) and DKAP (bottom); and (C) possible chemical structures for m/z fragments 69, 91, 229, 243, 304, 313, and 332. Both $\Delta_1$ and $\Delta_2$ are about 65° C.
Figure 12B:
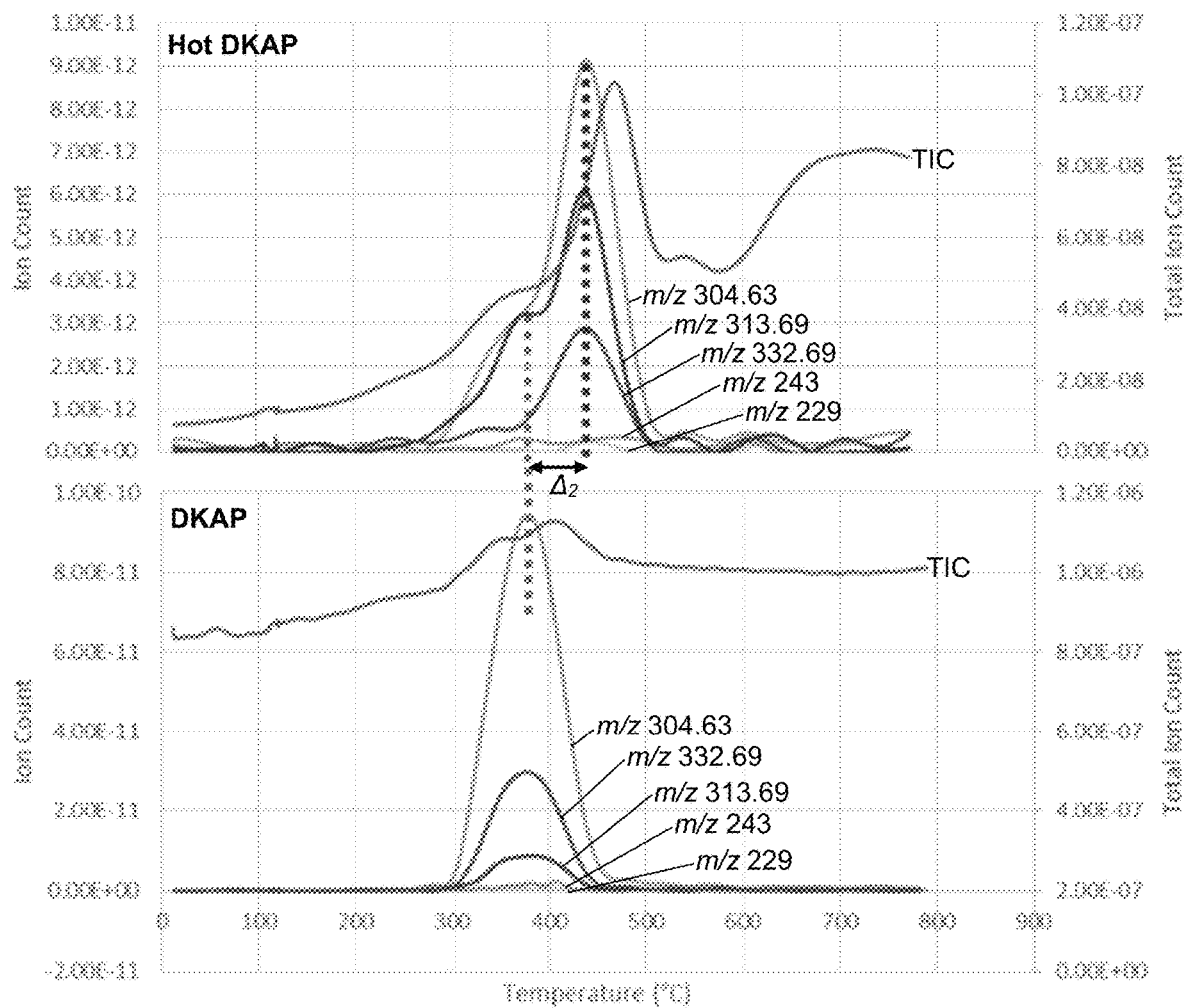
Figure 12C:
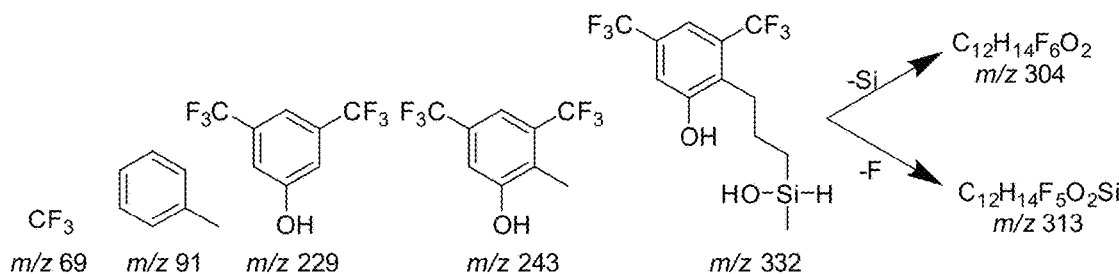

Initial thermal stability testing via thermogravimetric analysis (TGA) in air is shown in FIG. 11. The TGA plot for DKAP and Hot DKAP are shown as dashed lines. The correlating solid lines are the DSC data, which may be difficult to interpret as the samples were exceptionally viscous. Initial evaluations indicated that thermal decomposition started at the same temperature, or slightly earlier for the HotDKAP, however the decomposition appeared to take longer for the Hot DKAP relative to DKAP. This led to repeating the analysis with a TGA-MS system to monitor fragments formed during decomposition. FIG. 12A-12B shows plots of the total ion count (TIC) and common ion fragments [m/z: 69, 91, 229, 243, 304, 313, and 332] formed by both Hot DKAP (top) and DKAP (bottom). FIG. 12C shows possible structures for each of the mass fragments.

The TGA-MS plots show that the key mass fragments for the thermal decomposition of DKAP appear in the Hot DKAP plots as well and at nearly the same starting point. The data analysis is still preliminary, but it appears the Hot DKAP structure increases the stability as indicated by the ~65 C shift in the apex of the common mass fragments. Further confirmation with thermodynamic testing and GC coating lifetime testing may be helpful.

Future work can include coating components (e.g., capillary columns and preconcentrators) and evaluating these results. Columns can be used to evaluate the thermodynamics of the film relative to DKAP and conduct long-term aging in air studies at slowly elevated temperatures.

Other Embodiments

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. A method comprising:
   (i) introducing a coating solution to an internal bore of a column, the coating solution comprising a polymer, a thermally activated initiator, and a solvent, wherein the polymer comprises a structure having formula (I) or (VI) or (VII):

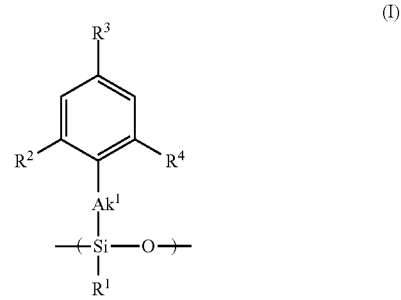

or

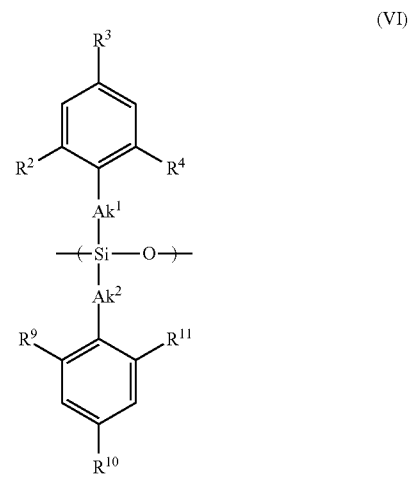

or

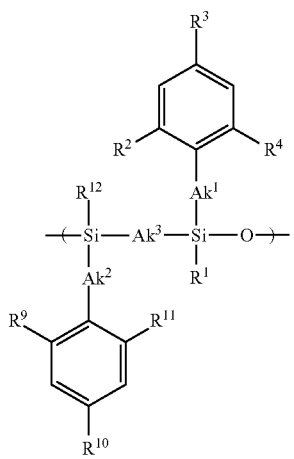

(VII)

or a salt thereof, wherein:
each of $R^1$ and $R^{12}$ is, independently, H, optionally substituted alkyl, optionally substituted alkoxy, optionally substituted alkoxyalkyl, optionally substituted aryl, optionally substituted alkaryl, optionally substituted alkenyl, halo, or optionally substituted haloalkyl;
each $Ak^1$, $Ak^2$, and $Ak^3$ is, independently, a bond, optionally substituted alkylene, optionally substituted arylene, oxy, or optionally substituted heteroalkylene; and
each of $R^2$, $R^3$, $R^4$, $R^9$, $R^{10}$, and $R^{11}$ is, independently, H, optionally substituted alkyl, optionally substituted alkoxy, optionally substituted alkoxyalkyl, optionally substituted aryl, hydroxyl, optionally substituted hydroxyalkyl, optionally substituted hydroxyaryl, halo, or optionally substituted haloalkyl, wherein at least one of $R^2$, $R^3$, $R^4$, $R^9$, $R^{10}$, and $R^{11}$ comprises a hydroxyl; and
(ii) heating the column to a first temperature above a thermal initiation temperature characteristic of the thermally activated initiator, thereby crosslinking the polymer in the presence of the thermally activated initiator to provide a film.

2. The method of claim 1, wherein the thermal initiation temperature is of from about 30° C. to about 120° C.

3. The method of claim 2, wherein the first temperature is of from about 40° C. to 130° C.

4. The method of claim 1, further comprising, after step (i):
removing the solvent from the internal bore of the column, thereby providing a layer comprising the polymer and the thermally activated initiator disposed on a surface of the internal bore.

5. The method of claim 1, wherein the thermally activated initiator is an azo-based initiator.

6. The method of claim 5, wherein the azo-based initiator is 2,2'-azobisisobutyronitrile, 2,2'-azobis(N-butyl-2-methylpropionamide), 1,1'-azobis(cyanocyclohexane), 1,1'-azobis(cyclohexane-1-carbonitrile), 2,2'-azobis(2-methylbutyronitrile), dimethyl 2,2'-azobis(2-methylpropionate), 2,2'-azobis(2,4-dimethylvaleronitrile), and/or 2,2'-azobis(4-methoxy-2,4-dimethylvaleronitrile.

7. The method of claim 1, wherein the solvent is a polar, aprotic solvent.

8. The method of claim 1, wherein the solvent has a boiling point that is less than the thermal initiation temperature.

9. The method of claim 1, wherein the film has a thickness of from about 50 nm to about 1 μm.

10. The method of claim 1, further comprising, before step (i):
exposing the internal bore of the column to a silanization agent; and
removing the silanization agent, thereby providing a silanized surface to be introduced to the coating solution.

11. The method of claim 1, wherein the coating solution comprises about 0.01% (w/v) to about 5% (w/v) of the polymer and about 0.00001% (w/v) to about 0.2% (w/v) of the thermally activated initiator.

12. The method of claim 1, wherein $R^2$, $R^4$, $R^9$, and/or $R^{11}$ is hydroxyl or optionally substituted hydroxyalkyl; and/or wherein $R^2$, $R^3$, $R^9$, and/or $R^{10}$ is halo or optionally substituted haloalkyl.

13. The method of claim 1, wherein the polymer comprises a structure having formula (IIIa) or (IIIb):

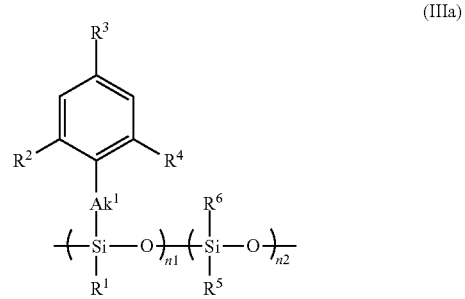

(IIIa)

or

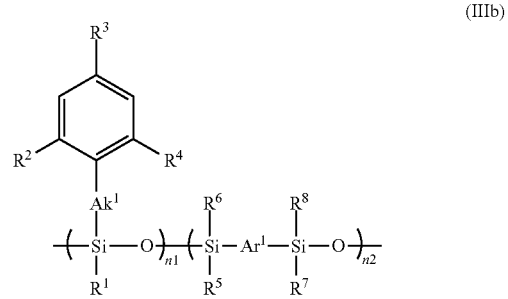

(IIIb)

or a salt thereof, wherein:
each of $R^1$, $R^5$, $R^6$, $R^7$, and $R^8$ is, independently H, optionally substituted alkyl, optionally substituted alkoxy, optionally substituted alkoxyalkyl, optionally substituted aryl, optionally substituted alkaryl, optionally substituted alkenyl, halo, or optionally substituted haloalkyl;
$Ak^1$ is a bond, optionally substituted alkylene, optionally substituted arylene, oxy, or optionally substituted heteroalkylene;
$Ar^1$ is optionally substituted alkylene, optionally substituted arylene, oxy, or optionally substituted heteroalkylene;

each of R², R³, and R⁴ is, independently, H, optionally substituted alkyl, optionally substituted alkoxy, optionally substituted alkoxyalkyl, optionally substituted aryl, hydroxyl, optionally substituted hydroxyalkyl, optionally substituted hydroxyaryl, halo, or optionally substituted haloalkyl, wherein at least one of R², R³, and R⁴ comprises a hydroxyl; and each of n1 and n2 is, independently, a number of from about 0.5 to 50.

14. The method of claim 13, wherein the ratio of n1 to n2 is of from about 1:5 to 5:1.

15. The method of claim 1, wherein the polymer comprises a structure having formula (VIIIa) or (VIIIb) or (IXa) or (IXb):

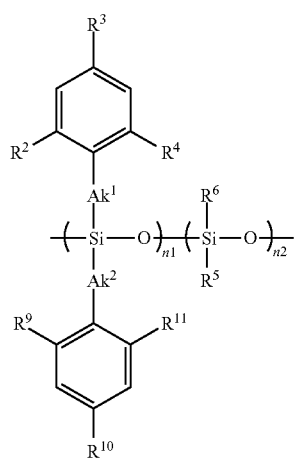

(VIIIa)

or

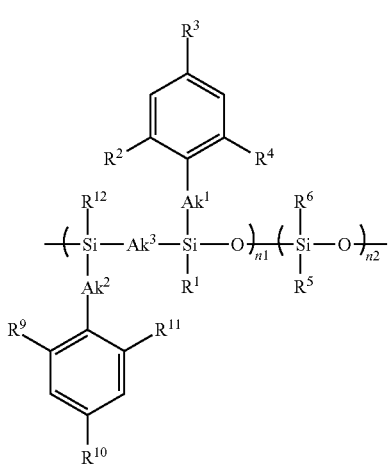

(VIIIb)

or

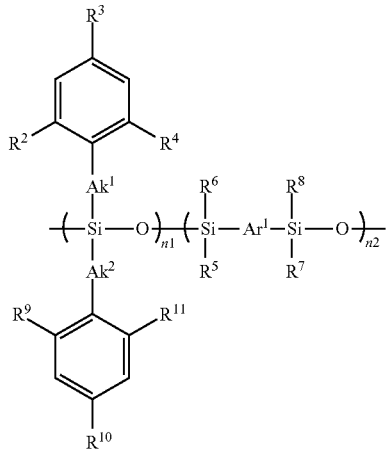

(IXa)

or

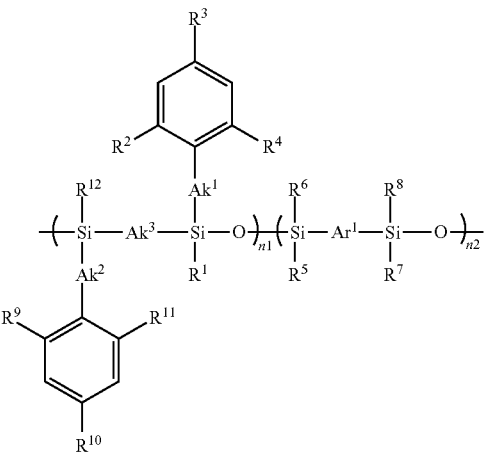

(IXb)

or a salt thereof, wherein:

each of R¹, R⁵, R⁶, R⁷, R⁸, and R¹² is, independently H, optionally substituted alkyl, optionally substituted alkoxy, optionally substituted alkoxyalkyl, optionally substituted aryl, optionally substituted alkaryl, optionally substituted alkenyl, halo, or optionally substituted haloalkyl;

each of Ak¹, Ak², and Ak³ is, independently, a bond, optionally substituted alkylene, optionally substituted arylene, oxy, or optionally substituted heteroalkylene;

Ar¹ is optionally substituted alkylene, optionally substituted arylene, oxy, or optionally substituted heteroalkylene;

each of $R^2$, $R^3$, $R^4$, $R^9$, $R^{10}$, and $R^{11}$ is, independently, H, optionally substituted alkyl, optionally substituted alkoxy, optionally substituted alkoxyalkyl, optionally substituted aryl, hydroxyl, optionally substituted hydroxyalkyl, optionally substituted hydroxyaryl, halo, or optionally substituted haloalkyl, wherein at least one of $R^2$, $R^3$, $R^4$, $R^9$, $R^{10}$, and $R^{11}$ comprises a hydroxyl; and each of n1 and n2 is, independently, a number of from about 0.5 to 50.

16. A method of detecting an organophosphorous agent, the method comprising:

(i) providing a column having a film disposed within an internal bore of the column, the film comprising a polymer that comprises a structure having formula (I) or (II):

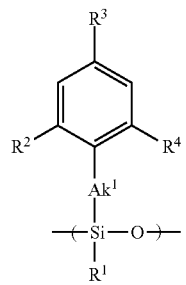
(I)

or

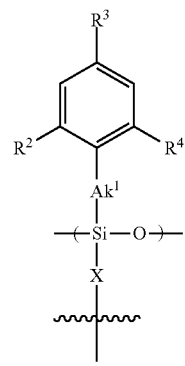
(II)

or a salt thereof, wherein:

$R^1$ is H, optionally substituted alkyl, optionally substituted alkoxy, optionally substituted alkoxyalkyl, optionally substituted aryl, optionally substituted alkaryl, optionally substituted alkenyl, halo, or optionally substituted haloalkyl;

each of $Ak^1$ and X is, independently, a bond, optionally substituted alkylene, oxy, or optionally substituted heteroalkylene; and each of $R^2$, $R^3$, and $R^4$ is, independently, H, optionally substituted alkyl, optionally substituted alkoxy, optionally substituted alkoxyalkyl, optionally substituted aryl, hydroxyl, optionally substituted hydroxyalkyl, optionally substituted hydroxyaryl, halo, or optionally substituted haloalkyl, wherein at least one of $R^2$, $R^3$, and $R^4$ comprises a hydroxyl; and (ii) injecting a test sample into the internal bore of the column, wherein the organophosphorous agent, if present, binds to the film.

* * * * *